(12) United States Patent
Hirose

(10) Patent No.: US 11,435,021 B2
(45) Date of Patent: Sep. 6, 2022

(54) IN-PIPE MOVING DEVICE

(71) Applicant: HiBot Corp., Tokyo (JP)

(72) Inventor: Shigeo Hirose, Tokyo (JP)

(73) Assignee: HiBot Corp., Tokyo (JP)

( * ) Notice: Subject to any disclaimer, the term of this patent is extended or adjusted under 35 U.S.C. 154(b) by 661 days.

(21) Appl. No.: 16/334,713

(22) PCT Filed: Sep. 19, 2017

(86) PCT No.: PCT/JP2017/033643
§ 371 (c)(1),
(2) Date: Mar. 19, 2019

(87) PCT Pub. No.: WO2018/056241
PCT Pub. Date: Mar. 29, 2018

(65) Prior Publication Data
US 2019/0264856 A1 Aug. 29, 2019

(30) Foreign Application Priority Data

Sep. 21, 2016 (JP) .............................. JP2016-183946

(51) Int. Cl.
*B61B 13/10* (2006.01)
*F16L 55/28* (2006.01)
(Continued)

(52) U.S. Cl.
CPC .............. *F16L 55/28* (2013.01); *B61B 13/10* (2013.01); *B62D 55/065* (2013.01); *B62D 57/02* (2013.01); *B62D 61/10* (2013.01)

(58) Field of Classification Search
CPC ........... F16L 55/28; F16L 55/32; F16L 55/44; B62D 61/10; B62D 55/065; B62D 57/02; B61B 13/10
(Continued)

(56) References Cited

U.S. PATENT DOCUMENTS 4,601,204 A * 7/1986 Fournot .................. B08B 9/049
73/866.5
4,770,105 A * 9/1988 Takagi ................. G21C 17/017
104/138.2
(Continued)

FOREIGN PATENT DOCUMENTS

DE 19528952 A1 2/1997
EP 3025922 A1 6/2016
(Continued)

OTHER PUBLICATIONS

Edwin Dertien et al: "Development of an inspection robot for small diameter gas distribution mains", Robotics and Automation (ICRA), 2011 IEEE International Conference On, Tefe, May 9, 2011 (May 9, 2011), pp. 5044-5049, XP032033900, DOI: 10.1109/1CRA.2011. 5980077 ISBN: 978-1-61284-3 86-5 *the whole document*.
(Continued)

*Primary Examiner* — Mark T Le
(74) *Attorney, Agent, or Firm* — Masuvalley & Partners; Peter R. Martinez

(57) ABSTRACT

An in-pipe moving apparatus that can freely and smoothly move in a pipe having a bent portion and a branching portion, is not stuck in the pipe even if a drive motor of a movement mechanism fails or otherwise experiences a problem, and can be readily taken out of the pipe. The in-pipe moving apparatus includes two sets of wheel-based traveling elements (2A) and (2B), which each have two driving wheels (8A) and (8B) linearly arranged, and a variable bag, which is expanded and contracted in accordance with the pressure of a fluid supplied to the variable bag, and the two sets of wheel-based traveling elements (2A) and (2B) are so disposed as to sandwich the variable bag (3) and are fixed to the outer surface of the variable bag (3).

5 Claims, 44 Drawing Sheets

(51) Int. Cl.
    *B62D 57/02* (2006.01)
    *B62D 61/10* (2006.01)
    *B62D 55/065* (2006.01)

(58) Field of Classification Search
    USPC ................................................ 104/138.2
    See application file for complete search history.

(56) References Cited

U.S. PATENT DOCUMENTS

| | | | |
|---|---|---|---|
| 4,852,391 A * | 8/1989 | Ruch | F16L 55/1283 73/40.5 R |
| 4,862,808 A | 9/1989 | Hedgcoxe et al. | |
| 6,123,027 A * | 9/2000 | Suyama | F16L 55/28 104/138.2 |
| 2008/0289421 A1 * | 11/2008 | Brignac | F16L 55/30 73/596 |
| 2016/0123517 A1 | 5/2016 | Hirose et al. | |

FOREIGN PATENT DOCUMENTS

| | | | | |
|---|---|---|---|---|
| JP | 03153457 A | * | 7/1991 | ............ F16L 55/18 |
| JP | H05-213241 A | | 8/1993 | |
| JP | H05-294234 A | | 11/1993 | |
| JP | H06-072359 A | | 3/1994 | |
| JP | H08-230666 A | | 9/1996 | |
| JP | 2011-24603 3 | | 12/2011 | |
| JP | 2014-034299 A | | 2/2014 | |
| JP | 2015-221635 A | | 12/2015 | |
| WO | WO-2011009420 A2 | * | 1/2011 | ........... B62D 55/084 |

OTHER PUBLICATIONS

Search Report issued by the Intellectual Property Office of the Singapore dated May 14, 2020 filed in Application No. 11201902195W.
European Search Report dated Apr. 8, 2020 filed in Application No. EP17853013.
ISA/Japan Patent Office, International Search Report dated Nov. 21, 2017 in International Application No. PCT/JP2017/033643, total 2 pages with English translation.

* cited by examiner

IN-PIPE MOVING DEVICE

RELATED APPLICATIONS

This application is the U.S. National Phase of and claims priority to International Patent Application No. PCT/JP2017/033643, International Filing Date Sep. 19, 2017, entitled In-Pipe Moving Device; which claims benefit of Japanese Patent Application No. 2016-183946 filed Sep. 21, 2016; both of which are incorporated herein by reference in their entireties.

TECHNICAL FIELD

The present invention relates to an in-pipe moving apparatus capable of freely moving in a pipe having a bent portion and a branching portion and used to inspect, maintain, and otherwise treating the inside of the pipe.

BACKGROUND ART

There is in general a great demand for a technology that allows inspection and repair of the inside of a pipe, such as a gas pipe, a water supply pipe, a sewer pipe, and other public facility pipes, and pipes in a chemical plant, without cutting operation of the pipe. To achieve this, it is necessary to insert a work device into a pipe via an opening thereof and provide an in-pipe moving apparatus capable of moving through a bent portion and a branching portion of the pipe and transporting the work device to a desired position.

For example, PTLs 1 and 2 describe in-pipe moving apparatuses of this type of related art.

PTL 1 describes a technology for an in-pipe traveling carriage that can be used in a wide range of pipe diameter, has improved traveling stability, and is used to inspect and repair the inside of a pipe. PTL 2 describes a technology for an in-pipe moving apparatus capable of smoothly moving even in a pipe having an inner diameter that changes over a wide range, a curved pipe, an elbow-shaped pipe bent at right angles, and other complicated pipes.

The traveling carriage described in PTL 1 is characterized in that it includes a traveling carriage main body including a drive motor, a pair of upper drive arms and lower drive arms pivotably supported by horizontal shafts on the traveling carriage main body, a pair of upper and lower driving wheels attached to one-side ends of the upper drive arm and the lower drive arm, a drive transmission mechanism that transmits drive force from the drive motor to the pair of upper and lower driving wheels, a pair of upper and lower first driven wheels attached to the other-side ends of the upper drive arm and the lower drive arm, a pair of upper driven arms and lower driven arms that are pivotably supported by vertical shafts on the traveling vehicle main body and operate in synchronization with the upper drive arms and the lower drive arms, a pair of right and left second driven wheels installed to ends of the upper driven arms and the lower driven arms, a drive cylinder detachably installed in a portion between the upper and lower driving wheels, an arcuate guide arm so provided in a front portion of the traveling carriage main body as to be swingable upward and downward, and a tool attachment portion so provided as to be movable along the longitudinal direction of the guide arm.

The in-pipe moving apparatus described in PTL 2 is an in-pipe moving apparatus that moves in a pipe and is characterized in that it includes a wheel mount including wheels, a main body mount supported on the wheel mount, a driving wheel rotationally driven by a motor, a drive mount which is so disposed as to face the main body mount and on which the driving wheel is rotatably disposed, and an adjustment mechanism that is interposed between the main body mount and the drive mount and adjusts the distance between the main body mount and the drive mount, and the adjustment mechanism keeps urging the wheels and the driving wheel against the inner wall of the pipe when the in-pipe moving apparatus travels in the pipe in such a way that the distance between the main body mount and the drive mount increases in accordance with the size of the inner diameter of the pipe.

CITATION LIST

Patent Literature

PTL 1: Japanese Patent Laid-Open No. 5-213241
PTL 2: Japanese Patent Laid-Open No. 2011-246033

SUMMARY OF INVENTION

Technical Problem

The in-pipe traveling carriage described in PTL 1, however, is so configured that the drive cylinder is driven to actuate the upper and lower drive arms so that the upper and lower driving wheels installed at one-side ends of the drive arms are pressed against the inner wall surface of the pipe and the reaction force from the inner wall surface resulting from the rotational force from the upper and lower driving wheels causes the in-pipe traveling carriage to travel in the pipe. Therefore, if the drive cylinder fails for some reason in the state in which the traveling carriage is in the pipe and stops operating with the upper and lower driving wheels pressed against the inner wall surface of the pipe, the traveling carriage is stuck in the pipe and cannot undesirably be taken out of the pipe.

The in-pipe moving apparatus described in PTL 2 has the configuration in which the adjustment mechanism is interposed between the main body mount, which is supported on the wheel mount including the wheels, and the drive amount, on which the driving wheel is rotatably disposed, and the adjustment mechanism includes a cylinder having a base end fixed to one of the main body mount and the drive mount and a cylinder rod that has a front end fixed to the other one of the main body mount and the drive mount and is moved forward and backward by the cylinder. Therefore, if the cylinder fails for some reason and stops operating with the wheels and/or the driving wheel pressed against the inner wall surface of the pipe, the in-pipe moving apparatus is stuck in the pipe and cannot undesirably be taken out of the pipe, as in the case of the in-pipe traveling carriage described in PTL 1.

The present invention has been made in view of the problems with the related art, and an object of the present invention is to provide an in-pipe moving apparatus that can freely and smoothly move in a pipe having a bent portion and a branching portion, is not stuck in the pipe even if a drive motor of a movement mechanism fails or otherwise experiences a problem, and can be readily taken out of the pipe.

Solution to Problem

An in-pipe moving apparatus according to the present invention is characterized in that the in-pipe moving apparatus includes two sets of wheel-based traveling elements each having a plurality of driving wheels linearly arranged or two sets of crawler traveling elements each having a traveling belt rollably bridged over a space between wheels disposed on upstream and downstream sides of the crawler traveling element and a variable bag expanded and contracted in accordance with pressure of a fluid supplied to the variable bag, and that the two sets of wheel-based traveling elements or the two sets of crawler traveling elements are so disposed as to sandwich the variable bag and are fixed to an outer surface of the variable bag.

A pair of linkage links may be so provided as to sandwich the two sets of wheel-based traveling elements or the two sets of crawler traveling elements, and one-side ends of the pair of linkage links may be pivotably linked to one of the wheel-based traveling elements or the crawler traveling elements and another-side ends of the pair of linkage links may be pivotably linked to another of the wheel-based traveling elements or the crawler traveling elements. Further, it is preferable that a plurality of springs are so bridged over a space between the two sets of wheel-based traveling elements or the two sets of crawler traveling elements as to exert spring force on the variable bag.

The two sets of wheel-based traveling elements or the two sets of crawler traveling elements may each be provided with a plurality of support pieces that protrude from the wheel-based traveling element or the crawler traveling element toward another wheel-based traveling element or crawler traveling element, and the plurality of support pieces may be each so sized as to protrude outward in a radial direction of a pipe beyond a portion where the other wheel-based traveling element or crawler traveling element is fixed to the variable bag. It is further preferable that a front end portion of each of the plurality of support pieces is provided with a rotatable auxiliary wheel that does not come into contact with an inner side of the pipe when the variable bag is expanded but comes into contact with an inner surface of the pipe when the variable bag is contracted to cause the driving wheels or the traveling belts to be separate from the inner surface of the pipe.

Another in-pipe moving apparatus according to the present invention includes two sets of wheel-based traveling elements each having a plurality of driving wheels linearly arranged or two sets of crawler traveling elements each having a traveling belt rollably bridged over a space between wheels disposed on upstream and downstream sides of the crawler traveling element, two variable bags expanded and contracted in accordance with pressure of a fluid supplied to the variable bags, a central member so disposed as to be sandwiched between the two variable bags, and action restraint means for restraining an action of the two sets of wheel-based traveling elements or the two sets of crawler traveling elements in such a way that the in-pipe moving apparatus moves linearly in a radial direction of a pipe in which the in-pipe moving apparatus travels.

The action restraint means may include fixed links fixed to the central member and two sets of sliding support members that slidably support the fixed links and are pivotably supported by the two sets of wheel-based traveling elements or the two sets of crawler traveling elements.

Another in-pipe moving apparatus according to the present invention includes at least three sets of wheel-based traveling elements each having a plurality of driving wheels linearly arranged or at least three sets of crawler traveling elements each having a traveling belt rollably bridged over a space between wheels disposed on upstream and downstream sides of the crawler traveling element and a variable bag expanded and contracted in accordance with pressure of a fluid supplied to the variable bag, and the at least three sets of wheel-based traveling elements or the at least three sets of crawler traveling elements are so disposed outside the variable bag as to surround the variable bag and are fixed to the variable bag.

Advantageous Effects of Inventions

The in-pipe moving apparatus according to the present invention can freely and smoothly move in a pipe having a bent portion and a branching portion, is not stuck in the pipe even if a drive motor of a movement mechanism fails or otherwise experiences a problem by releasing force that presses the driving wheels or the traveling belt against the inner surface of the pipe, and can be readily taken out of the pipe.

DESCRIPTION OF EMBODIMENTS

Figure 1:
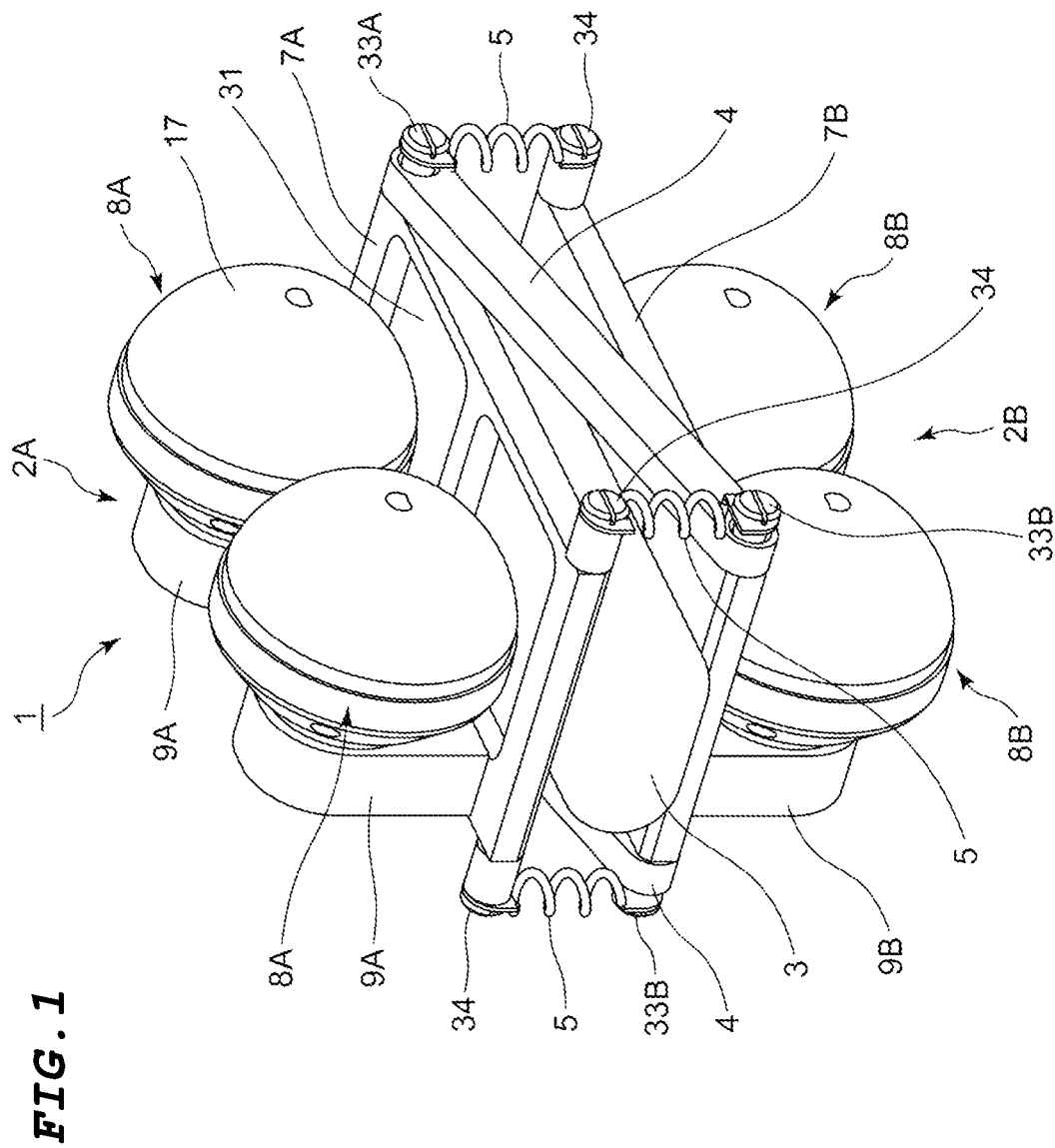
FIG. 1 is an exterior perspective view showing a first embodiment of an in-pipe moving apparatus according to the present invention.
Figure 2A:
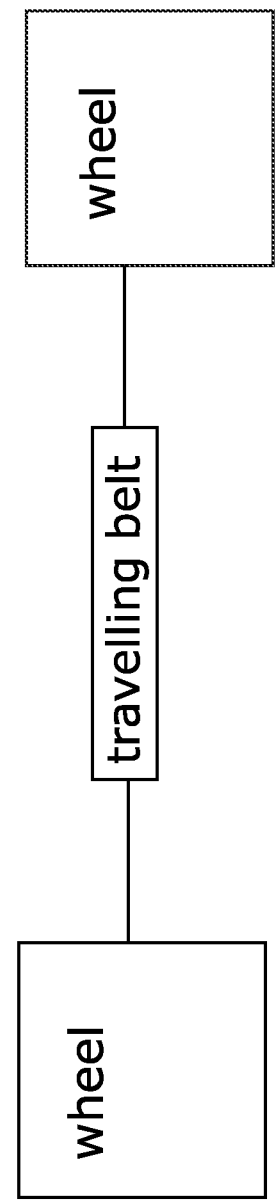
FIG. 2A is a schematic representation of wheels and a travelling belt in accordance with the present invention.
Figure 2B:
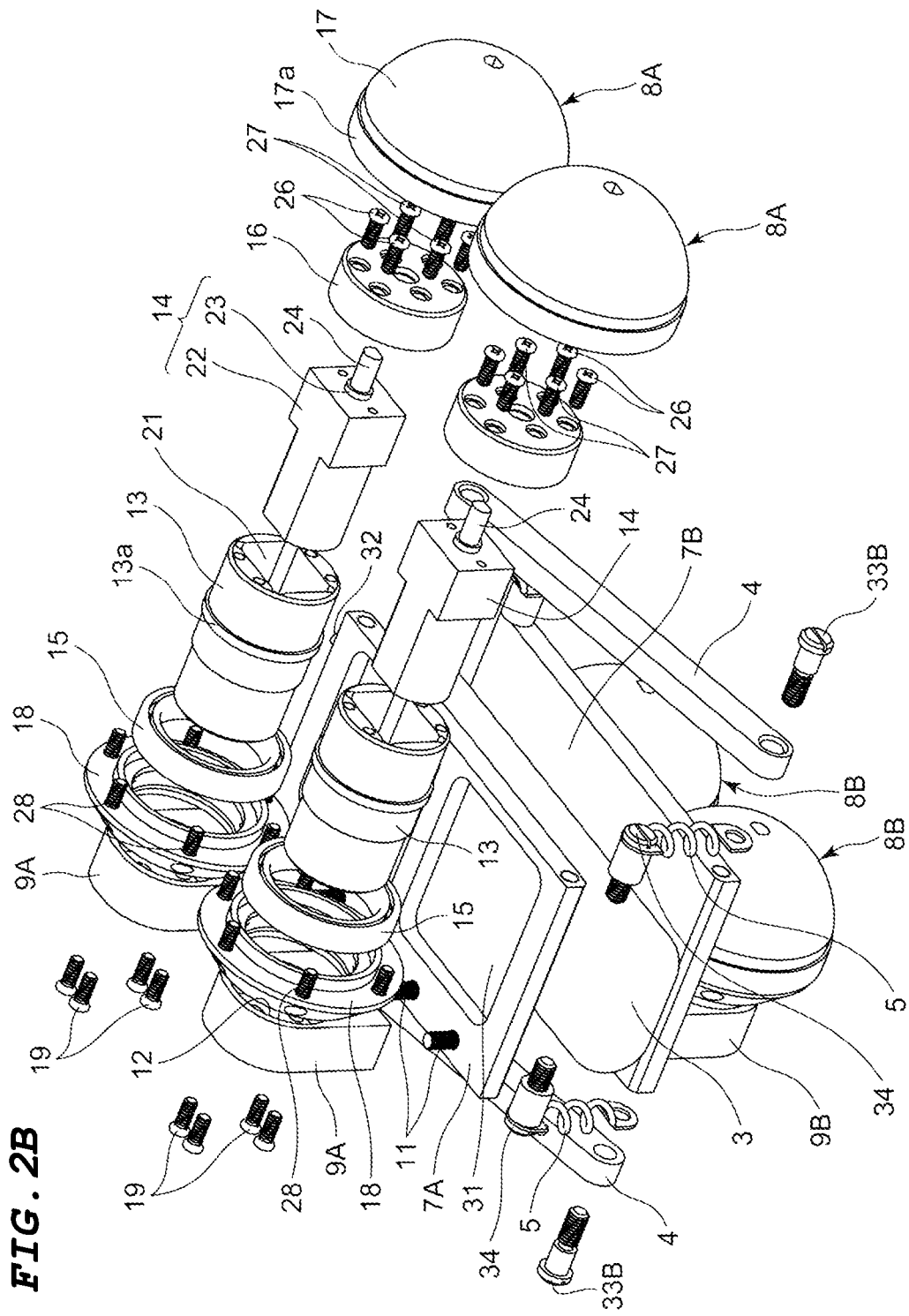
FIG. 2B is an exploded perspective view of the in-pipe moving apparatus according to the first embodiment of the present invention shown in FIG. 1.
Figure 3:
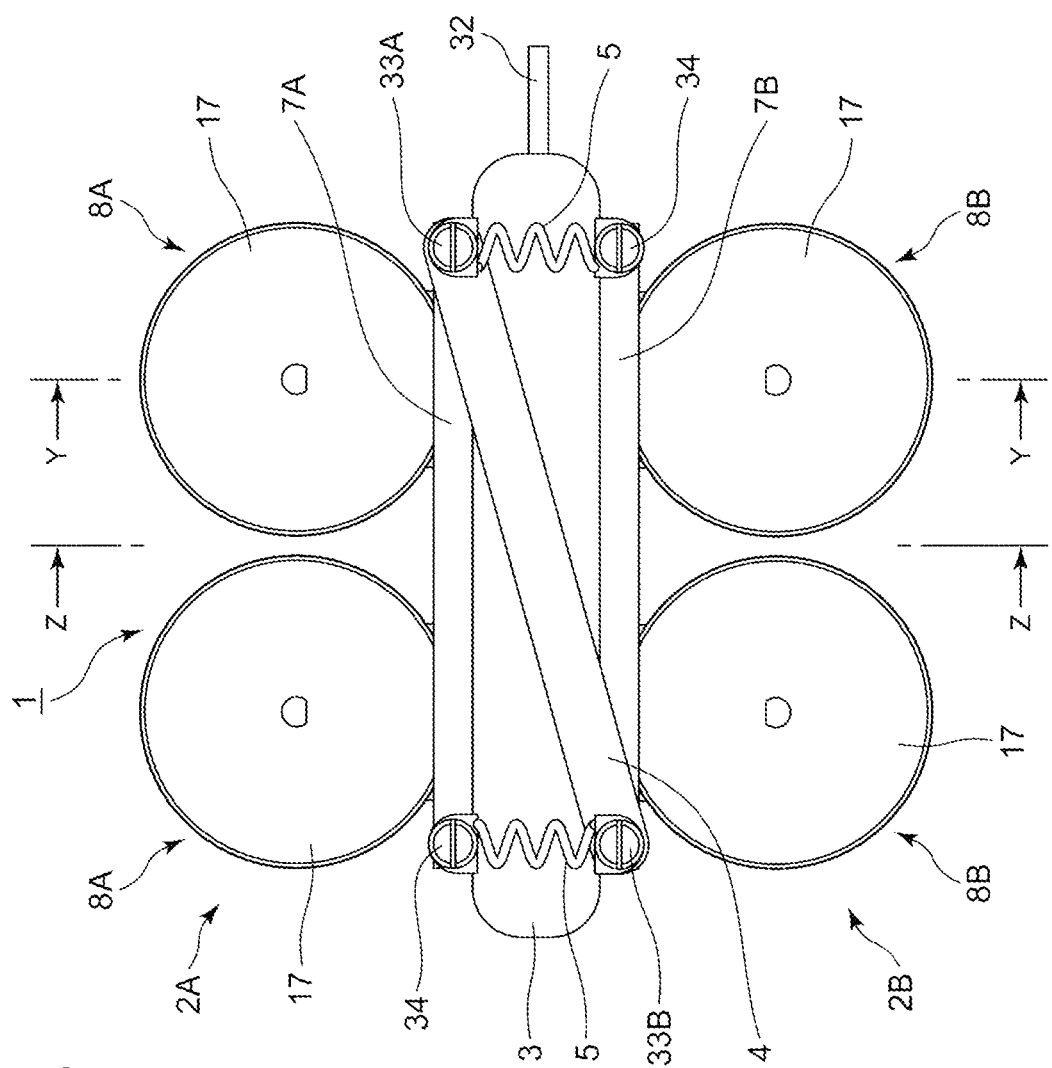
FIG. 3 is a side view showing the in-pipe moving apparatus according to the first embodiment shown in FIG. 1 in a state in which a variable bag is expanded.
Figure 4:
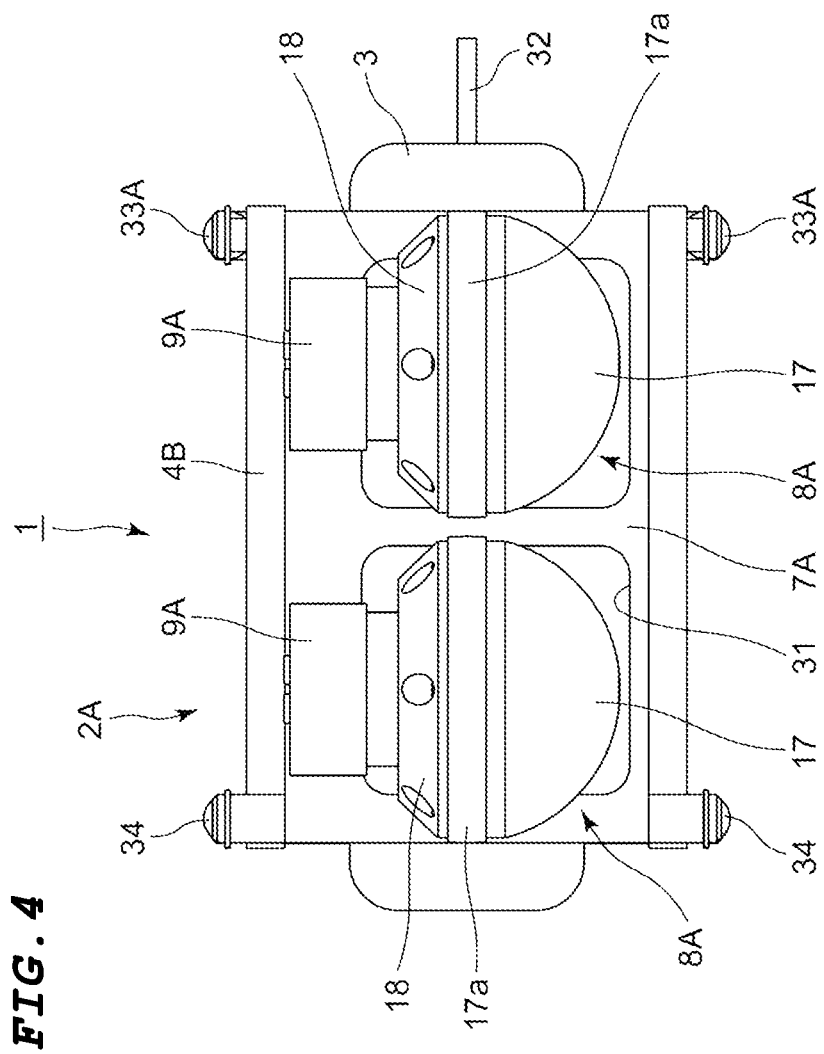
FIG. 4 is a plan view of the in-pipe moving apparatus according to the first embodiment shown in FIG. 1.

Embodiments of an in-pipe moving apparatus according to the present invention will be described below with reference to FIGS. 1 to 43.

FIGS. 1 to 10 describe a first embodiment of the in-pipe moving apparatus according to the present invention. FIG. 2A shows a schematic representation of a travelling element having a travelling belt rollably bridged over a space between wheel disposed on upstream and downstream sides of the crawler travelling element.

An in-pipe moving apparatus 1 according to the first embodiment of the present invention includes two sets of wheel-based traveling elements 2A and 2B, a variable bag 3, two linkage links 4, 4, which form a pair, four springs 5, 5, and other components, as shown in FIGS. 1 to 4 and other figures.

The two sets of wheel-based traveling elements 2A and 2B are so formed of the same parts and configured to have the same structure that the wheel-based traveling elements 2A and 2B are vertically symmetric. The wheel-based traveling elements 2A and 2B each include a base member 7A or 7B, two driving wheels 8A or 8B, two support brackets 9A or 9B, which rotatably support the driving wheels 8A or 8B on the base member 7A or 7B, and other components. The base members 7A and 7B are each formed of a plate-shaped member having an oblong shape, and the two support brackets 9A and 9B are each so fixed to one-widthwise-side portions of one-side surfaces of the base members 7A and 7B each with two fixing screws 11 as to be separate from each other by a predetermined distance in the longitudinal direction of the base members 7A and 7B. The two driving wheels 8A and 8B are so disposed via the two support brackets 9A and 9B linearly in the in-plane direction of the base members 7A and 7B, which is the traveling direction of the in-pipe moving apparatus 1. The support brackets 9A and 9B are each provided with a fitting hole 12, which opens toward the other side in the width direction, and the driving wheels 8A and 8B are attached to the support brackets 9A and 9B via the fitting holes 12.

Figure 5:
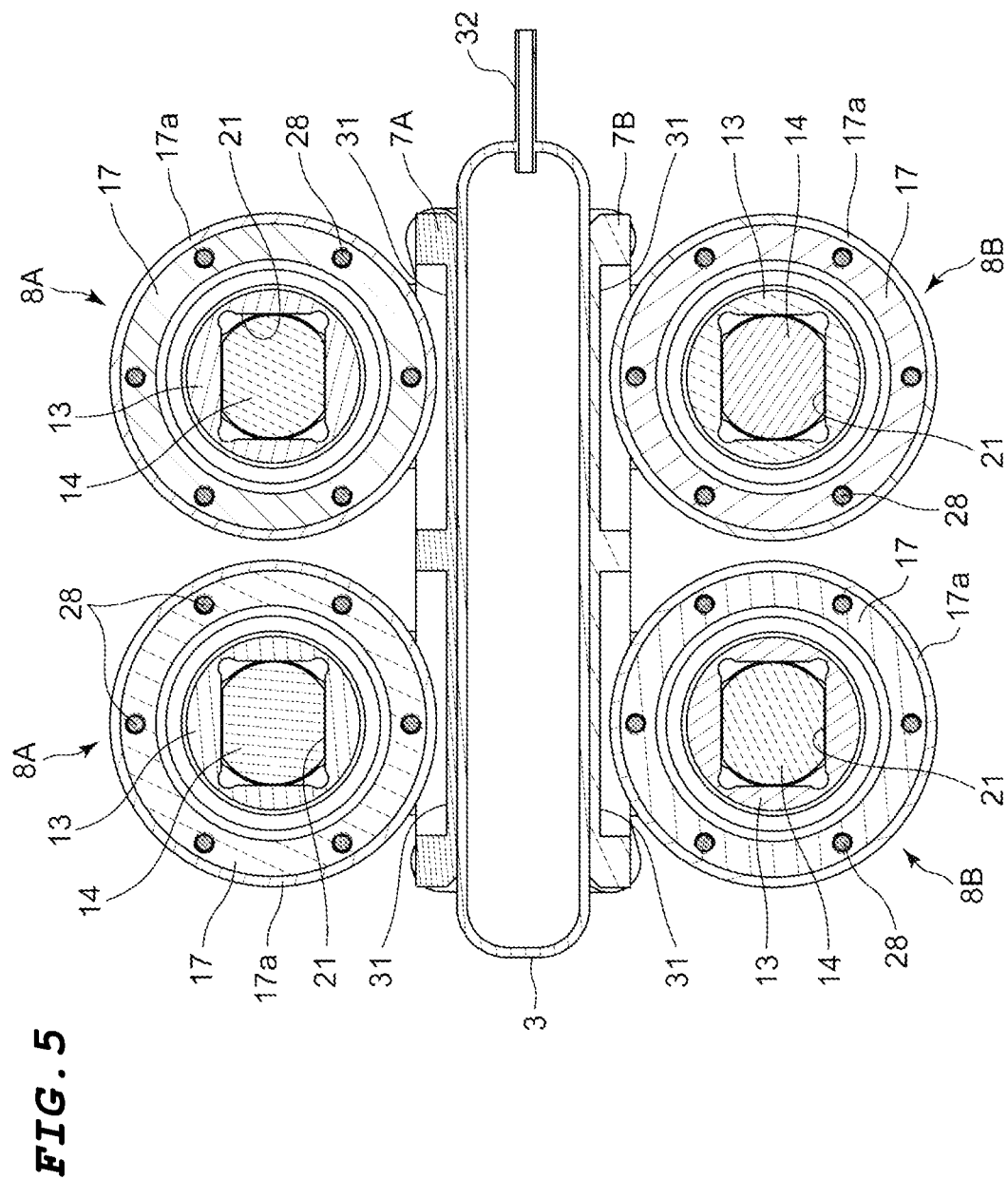
FIG. 5 describes the in-pipe moving apparatus taken along a central portion in FIG. 4.
Figure 6:
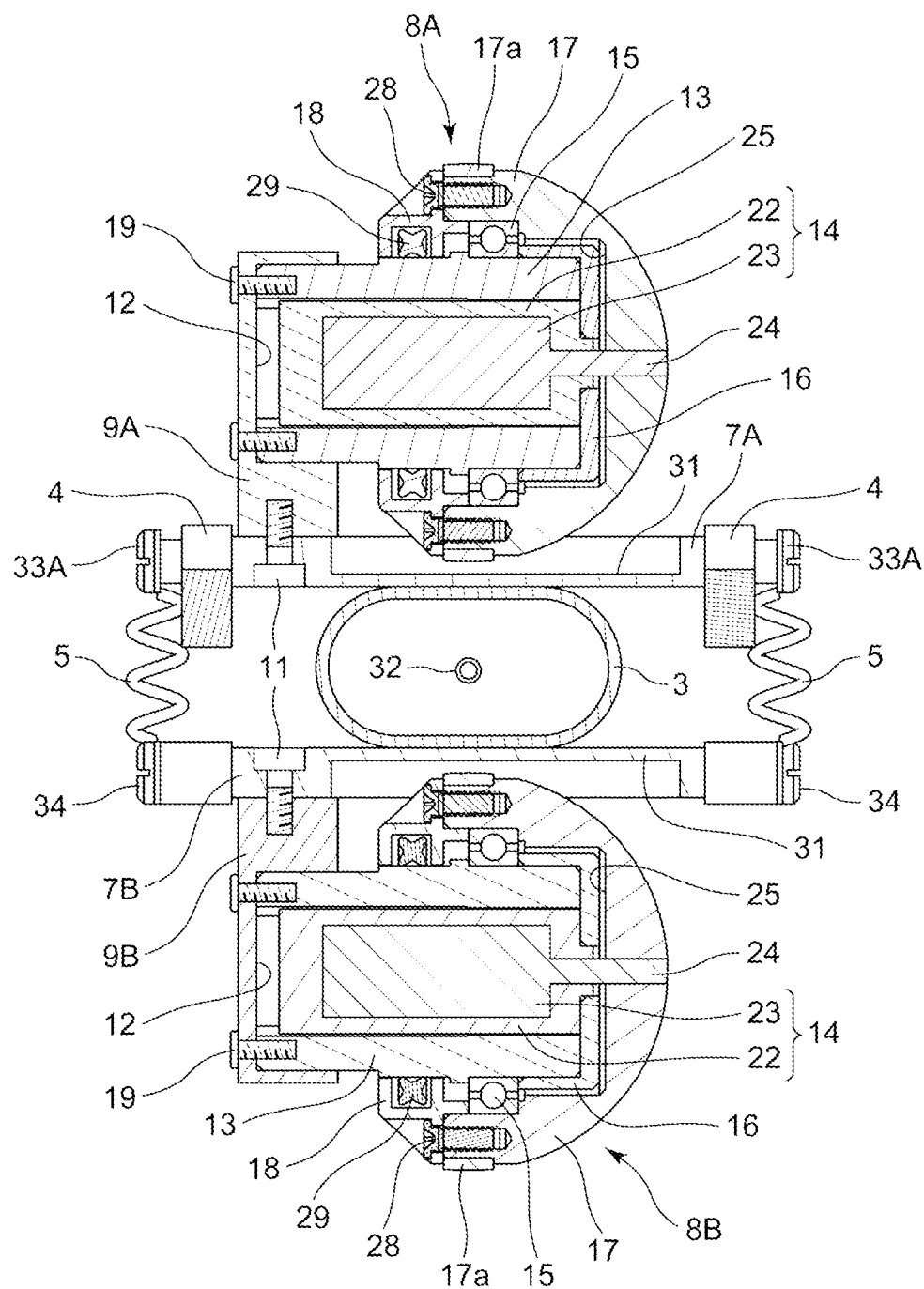
FIG. 6 describes the in-pipe moving apparatus taken along the line Y-Y in FIG. 3.
Figure 7:
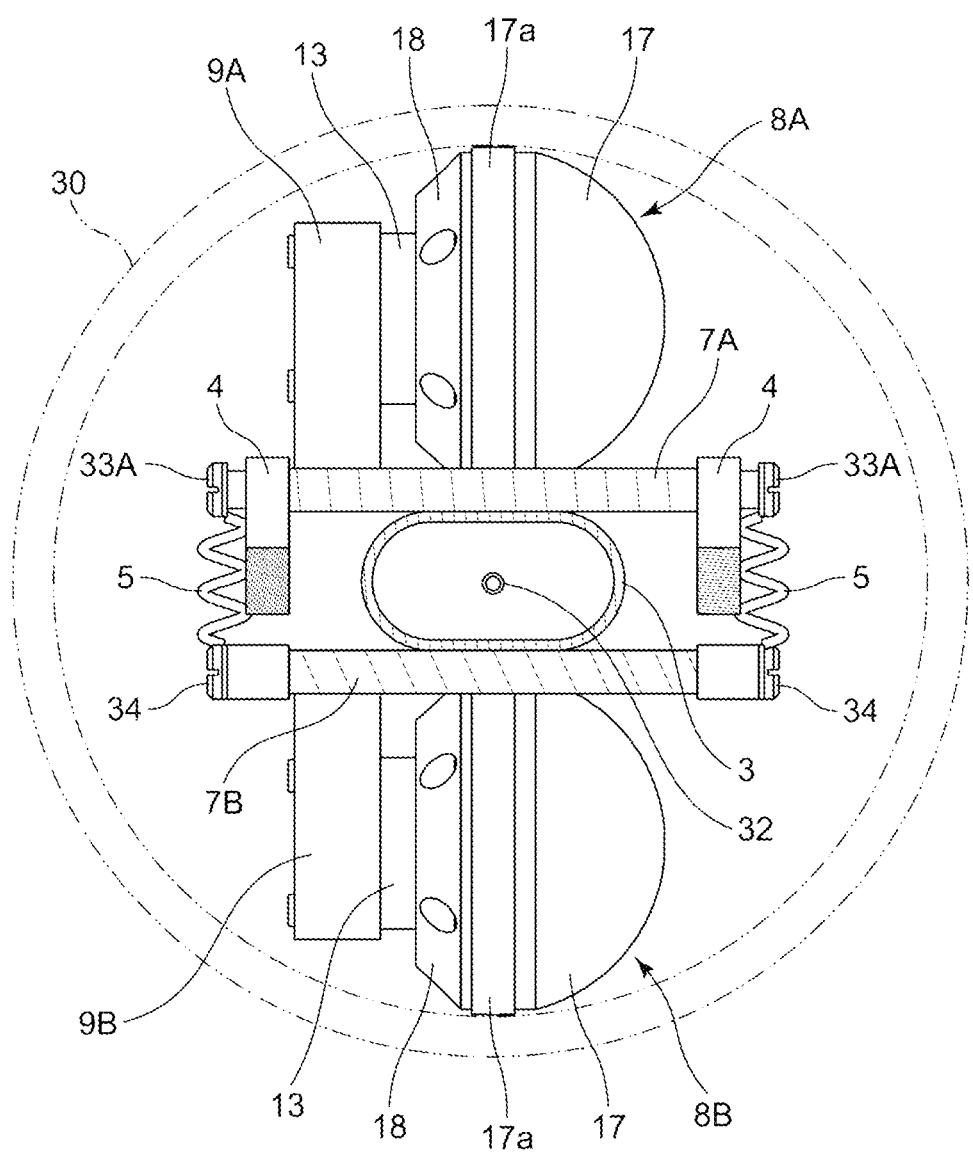
FIG. 7 describes the in-pipe moving apparatus taken along the line Z-Z in FIG. 3.

The two driving wheels 8A and 8B have the same shape and structure and each include a fixed tube 13, a drive motor 14, a bearing 15, a stopper 16, an exterior rotary element 17, a holder 18, and other components. The fixed tube 13 is formed of a tubular member having a circular outer circumferential surface and having an axial central portion through which a quadrangular hole 21 passes. The fixed tube 13 is fit into the fitting hole 12 of each of the support brackets 9A and 9B with the axis of the fixed tube 13 extending in the horizontal direction. The fixed tubes 13 supported by the support brackets 9A and 9B in the form of cantilevers are fastened and fixed with fixing screws 19 thereto to form an integrated module. The drive motors 14 are fit into the quadrangular holes 21 of the fixed tubes 13 and held integrally therewith, as shown in FIGS. 5 and 6. The stoppers 16 attached to the front ends of the fixed tubes 13 prevent the drive motors 14 from falling off the fixed tubes 13.

The driver motors 14 each include a fixed section 22, which is fixed to and held by the fixed tube 13, and a rotary section 23, which is rotatably supported by the fixed section 22. A rotary shaft 24 of the rotary section 23 passes through a side surface of the fixed section 22 and an end surface of the stopper 16 in the horizontal direction, and the exterior rotary element 17 is so linked and fixed to a front end portion of the rotary shaft 24 as to be integrated therewith in the rotational direction. The exterior rotary element 17 is linked to the rotary shaft 24 in the embodiment as follows: one location of the rotary shaft 24 is provided with a flat surface; the exterior rotary element 17 is provided with a hole having a shape corresponding to the shape of the rotary shaft 24; and the rotary shaft 24 is fit into the hole. The exterior rotary element 17 is, however, not necessarily linked to the rotary shaft 24 as described above in the embodiment, and any other known linkage means may, of course, be used. For example, the rotary shaft 24 may be provided with a threaded portion, and the exterior rotary element 17 may be fastened and fixed to the rotary shaft 24 with a nut that engages with the threaded portion.

The exterior rotary elements 17 each have a hemispherical shape that forms a half of a sphere, and the protruding side of the fixed tube 13, to which the stopper 16 is attached, is inserted into a recess 25 provided in a portion of the exterior rotary element 17 that is the portion facing the end surface thereof. The recess 25 of the exterior rotary element 17 has a small-diameter portion, into which the stopper 16 is inserted, and a large-diameter portion continuous with the opening side of the small-diameter portion. The outer ring of the bearing 15 is fit into the large-diameter portion, and the fixed tube 13 is fit into the inner ring of the bearing 15. The inner ring of the bearing 15 is positioned by a flange provided around the outer circumferential surface of the fixed tube 13, and the stopper 16 prevents the inner ring from moving. The stopper 16 is fastened to an end surface of the fixed tube 13 with four fixing screws 26 and further fastened to an end surface of the fixing section 22 of the driver motor 14 with two fixing screws 27.

A maximum diameter portion of the exterior rotary element 17 that is the portion facing the end surface thereof is provided with a ground contact section 17a, which transmits rotational force of the exterior rotary element 17 to the inner surface of the pipe. Further, the holder 18, which presses and positions the outer ring of the bearing 15, is fastened and fixed to the end surface of the exterior rotary element 17 with six fixing screws 28. The holder 18 holds a sealing material 29, which is slidably in contact with the outer circumferential surface of the fixed tube 13 to prevent dust, water, and other foreign matter from entering the bearing 15.

The drive motors 14 are each connected to a controller that is not shown but is placed outside the in-pipe moving apparatus 1 via lead wires, and operation performed on the controller controls and drives the driving wheels 8A and 8B. A towing member that is also not shown but tows the in-pipe moving apparatus 1 to an opening of a pipe 30 in an emergency, such as in the case of failure of the apparatus 1, is linked to the apparatus 1.

The two driving wheels 8A and 8B having the configuration described above are so mounted on the base members 7A and 7B as to be separate from each other by a predetermined distance at front and rear locations in the traveling direction to form the two sets of wheel-based traveling elements 2A and 2B. The two sets of wheel-based traveling elements 2A and 2B are so disposed that the driving wheels 8A or 8B protruding in the same direction and the driving wheels 8B or 8A angularly displaced by 180 degrees protrude in opposite directions by reversing one of the wheel-based traveling elements 2A and 2B with respect to the other and assembling the base members 7A and 7B in such away that they face each other. The variable bag 3 is then interposed between the first base member 7A of the first wheel-based traveling element 2A and the second base member 7B of the second wheel-based traveling element 2B. The base members 7A and 7B are each provided with clearance recesses 31, which prevent the base member from coming into contact with the exterior rotary elements 17.

The variable bag 3 expands or contracts in accordance with the pressure of a supplied fluid and is formed of an expandable, contractable rubber elastic element having a tubular shape. The variable bag 3 may have, for example, a circular, elliptical, oblong, square, or any other cross-sectional shape. One end of a pipe 32, which is connected to a hydraulic pressure apparatus that is not shown, is connected to one end of the variable bag 3. The two sets of wheel-based traveling elements 2A and 2B are so structured as to move away from each other when the variable bag 3 expands and approach each other when the variable bag 3 contracts in accordance with the pressure of the fluid supplied from the hydraulic pressure apparatus. The variable bag 3 can be made of a silicon rubber, a vulcanized rubber, or any of a variety of other elastic materials, but not limited thereto, and can, for example, be made of a seat-shaped material, such as fabric onto which vinyl or rubber is applied. The fluid used to expand and contract the variable bag 3 is typically air. In this case, the hydraulic pressure apparatus is a pneumatic apparatus. It is, however, noted that the fluid useable to expand and contract the variable bag 3 can, of course, for example, be nitrogen or any other gas and can, of course, also be water, oil, or any other liquid.

The two linkage links 4, 4, which form a pair, are bridged over the two sets of the wheel-based traveling elements 2A and 2B disposed on the upper and lower sides, as shown in FIGS. 1, 3, 4, and 9. The two linkage links 4, 4 are so disposed as to sandwich the two sets of the wheel-based traveling elements 2A and 2B on opposite sides in the width direction of the support bases 7A and 7B and are also so disposed that upper ends of the linkage links 4, 4 that are one-side end portions thereof face one longitudinal side (rear side in traveling direction) of the base member 7A of the first wheel-based traveling element 2A located on the upper side and lower end portions of the linkage links 4, 4 that are the-other-side end portions thereof face the other longitudinal side (front side in traveling direction) of the base member 7B of the second wheel-based traveling element 2B located on the lower side.

Further, the upper end portions of the two linkage links 4, 4 are rotatably supported by attachment screws 33A, which pass through the linkage links 4, 4 in the horizontal direction, on opposite side surfaces of the first base member 7A. The lower end portions of the two linkage links 4, 4 are rotatably supported by attachment screws 33B, which pass through the linkage links 4, 4 in the horizontal direction, on opposite side surfaces of the second base member 7B. The two attachment screws 33A, which rotatably support the upper end portions of the two linkage links 4, 4, are disposed along the same axial line, whereby the first wheel-based traveling element 2A is pivotable around the axial line of the two attachment screws 33A. Similarly, the two attachment screws 33B, which rotatably support the lower end portions of the two linkage links 4, 4, are disposed along the same axial line, whereby the second wheel-based traveling element 2B is pivotable around the axial line of the two attachment screws 33B.

The four springs 5, which produce spring force in the direction in which the base members 7A and 7B are pulled toward each other, are bridged over the corresponding ones of the four corners of the first base member 7A and the second base member 7B. One-side ends of two of the springs 5 engage with and are supported by the attachment screws 33B, which support the lower end portions of the linkage links 4, 4 on the second support base 7B, and the other-side ends of the two springs 5 engage with and are supported by attachment screws 34 on end portions of the first support base 7A that are located on the forward side in the traveling direction. One-side ends of the remaining two springs 5 engage with and are supported by the attachment screws 33A, which support the upper end portions of the linkage links 4, 4 on the first support base 7A, and the other-side ends of the two springs 5 engage with and are supported by attachment screws 34 on end portions of the second support base 7B that are located on the rear side in the traveling direction.

Figure 8:
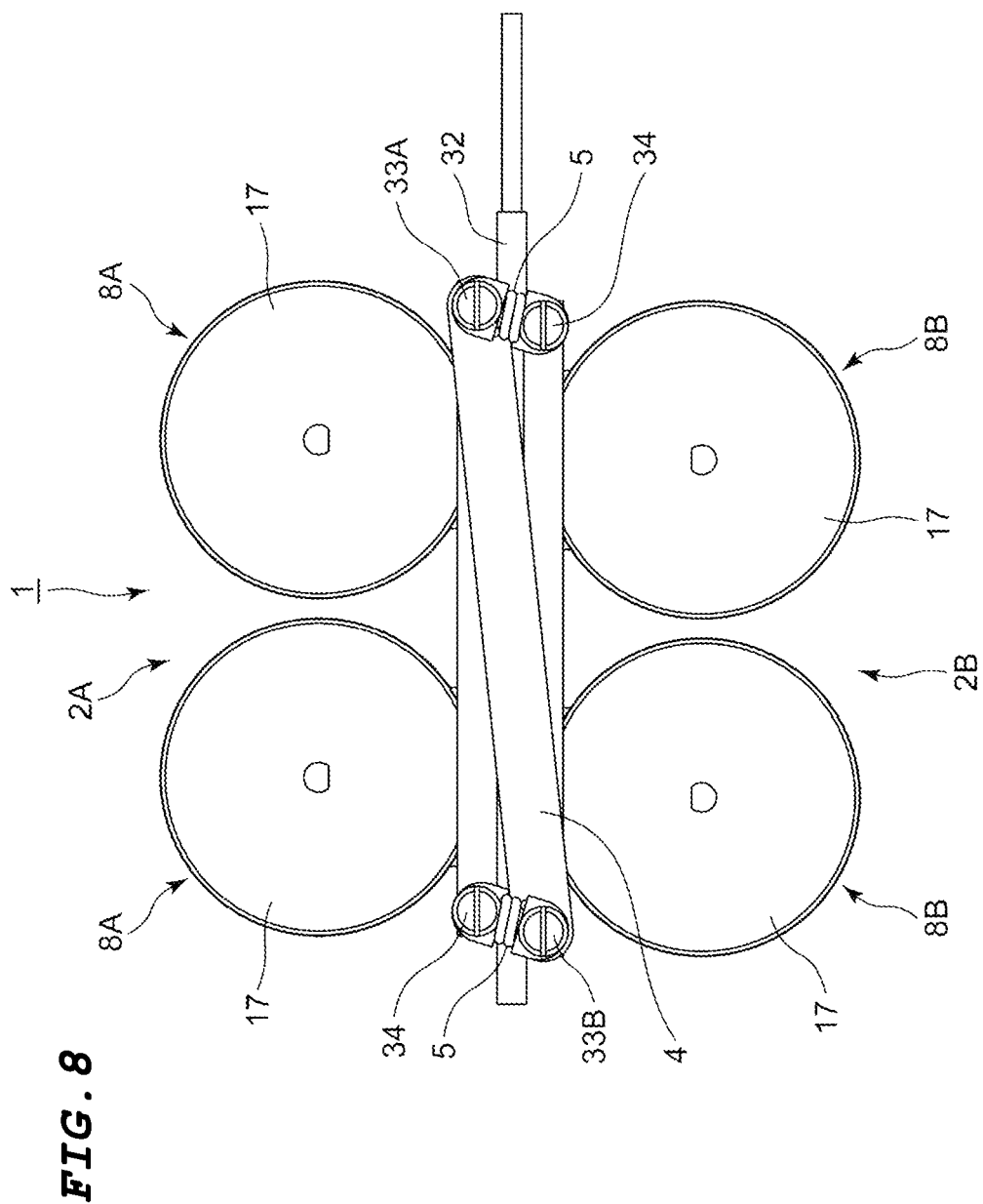
FIG. 8 is a side view showing the in-pipe moving apparatus according to the first embodiment shown in FIG. 1 in a state in which the variable bag is contracted.

The pneumatic apparatus, which is not shown, then supplies the interior of the variable bag 3 with compressed air via the pipe 32 with the in-pipe moving apparatus 1 inserted into the pipe 30, and the internal pressure is increased to at least a predetermined value to expand the variable bag 3. As a result, the expanded variable bag 3 presses the two sets of wheel-based traveling elements 2A and 2B outward in the radial direction in which they move away from each other, and the four driving wheels 8A and 8B are pressed against the inner surface of the pipe 30, as shown in FIG. 8. At this point, in each of the wheel-based traveling elements 2A and 2B, the ground contact surfaces 17a of the two driving wheels 8A and 8B are arranged linearly in the traveling direction and come into contact with the inner surface of the pipe 30. Further, the ground contact surfaces 17a of the driving wheels 8A and 8B facing each other in the radial direction between the two sets of wheel-based traveling elements 2A and 2B come into contact with the inner surface of the pipe 30 in positions thereon angularly displaced from each other by 180 degrees.

From this state, when the controller, which is not shown, is operated to drive the drive motors 14 for the four driving wheels 8A and 8B, the drive force from the drive motors 14 is transmitted to the exterior rotary elements 17. Therefore, the frictional force that occurs between the ground contact surfaces 17a of the exterior rotary elements 17 and the inner surface of the pipe 30 causes the in-pipe moving apparatus 1 to travel forward or backward in accordance with the rotational direction of the exterior rotary elements 17.

Figure 9:
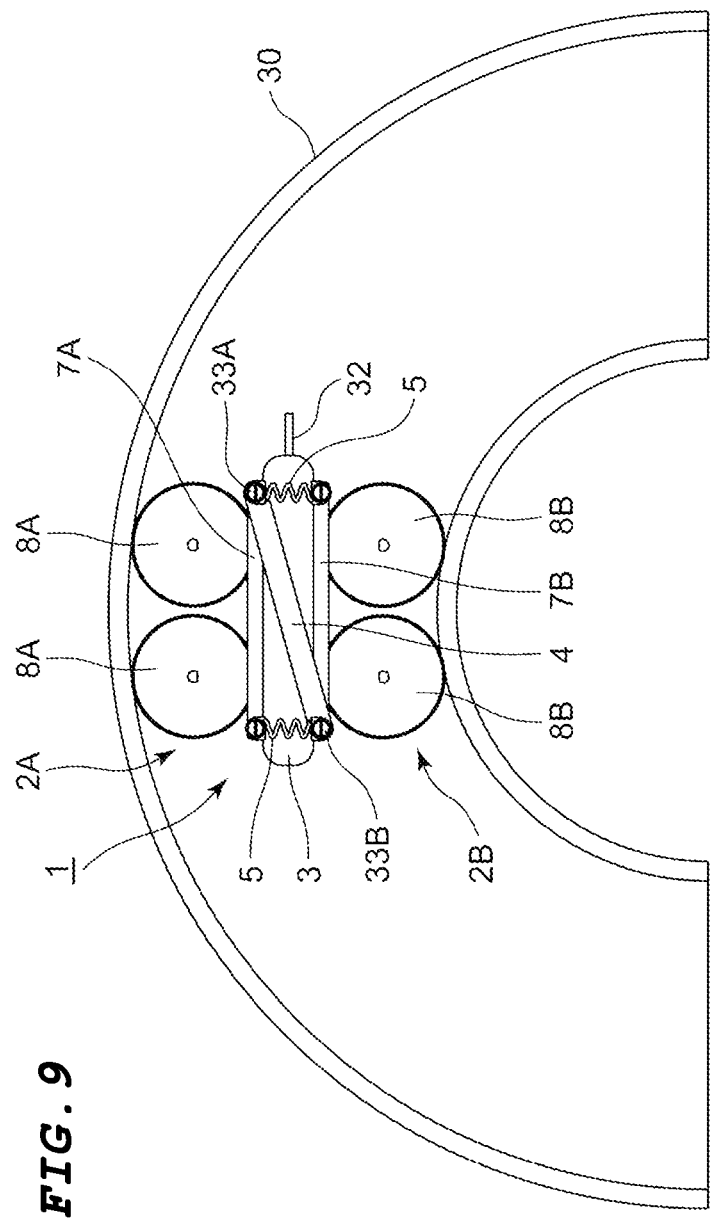
FIG. 9 is a side view showing a state in which the in-pipe moving apparatus according to the first embodiment shown in FIG. 1 travels in a curved portion of a pipe.
Figure 10:
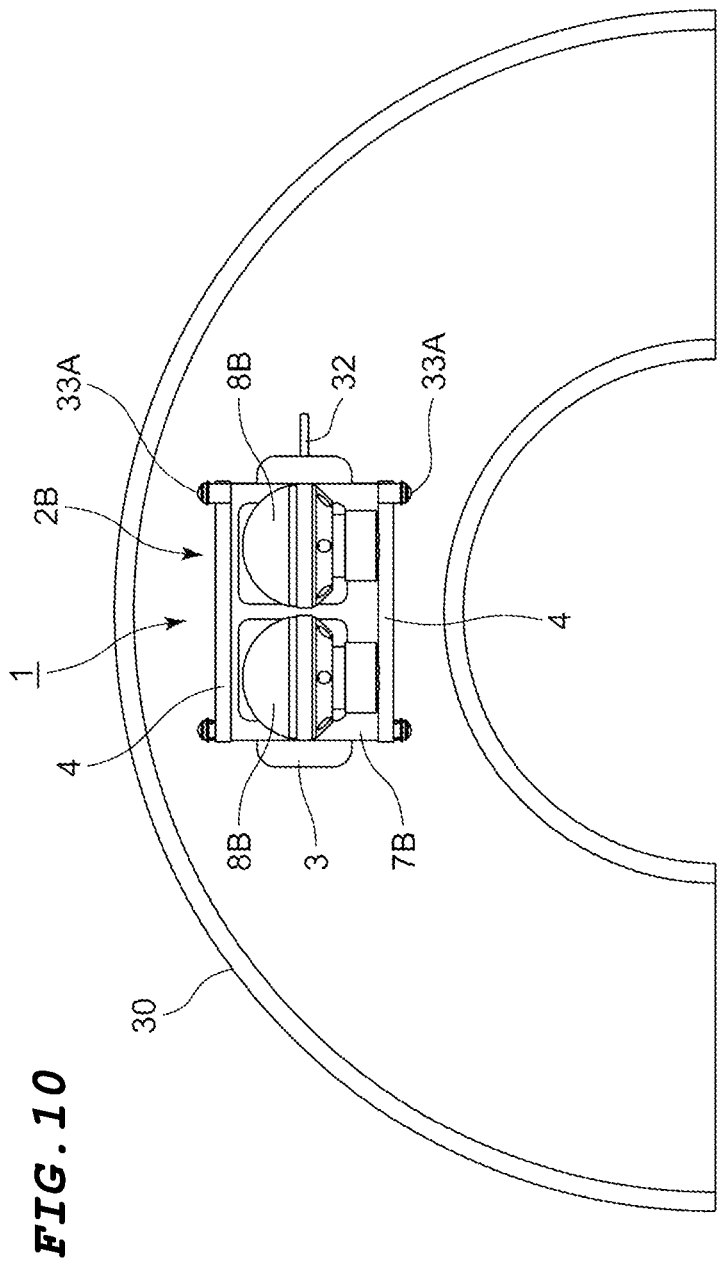
FIG. 10 is a plan view showing a state in which the in-pipe moving apparatus according to the first embodiment shown in FIG. 1 travels in the curved portion of the pipe.

FIGS. 9 and 10 describe the state in which the in-pipe moving apparatus 1 passes through a curved portion of the pipe 30. In this case, since the first wheel-based traveling element 2A and the second wheel-based traveling element 2B of the in-pipe moving apparatus 1 are pivotably linked to each other via the pair of linkage links 4, 4, the in-pipe moving apparatus 1 can be readily moved even in the curved portion having the curved shape shown in FIGS. 9 and 10. In general, a curved portion has a radius of curvature on the inner side smaller than that on the outer side, and in a case where four driving wheels are merely divided into two sets and the driving wheels in each of the two sets are arranged in parallel to each other, the four driving wheels cannot come into contact with the inner surface of the pipe 30 at the same time. This holds true particularly for a case where the pipe has a small inner diameter and a curved portion has a small radius of curvature.

In contrast, in the in-pipe moving apparatus 1, since the pair of linkage links 4, 4 pivotably link the two sets of wheel-based traveling elements 2A and 2B to each other, the first wheel-based traveling element 2A is pivotable around the attachment screws 33A, and the second wheel-based traveling element 2B is pivotable around the attachment screws 33B. Further, since the two sets of wheel-based traveling elements 2A and 2B are so linked to each other via the variable bag 3 that the attitude of the wheel-based traveling elements 2A and 2B can be changed, the four exterior rotary elements 17 of the four driving wheels 8A and 8B are always allowed to be in contact with the inner surface of the pipe 30 even in a case where the in-pipe moving apparatus 1 is in the pipe 30 having a relatively small inner diameter (ranging from 3 to 6 inches, for example) and passes through a curved portion having a small radius of curvature. The rotational force from the four driving wheels 8A and 8B allows reliable, smooth movement of the in-pipe moving apparatus 1.

Further, for example, even in a case where scale extending on part of the inner surface of the pipe 30 or in the circumferential direction thereof develops, the in-pipe moving apparatus 1 according to the embodiment can travel over the scale and move in the pipe. For example, in a case where scale is present in front of the front driving wheel 8B of the second wheel-based traveling element 2B of the in-pipe moving apparatus 1 travelling in the pipe 30, and when the front driving wheel 8B travels on to the scale, pressing force resulting from reaction force from the scale acts from the front driving wheel 8B via the first support bracket 9B and the second base member 7B to a front end portion of the variable bag 3 from below to above in FIG. 3.

Therefore, a portion of the variable bag 3 that is a portion thereof on the forward side in the traveling direction is compressed, whereas a portion of the variable bag 3 that is a portion thereof on the backward side in the traveling direction is expanded. Following the elastic deformation of the variable bag 3, the front driving wheel 8B travels over the scale. Once the front driving wheel 8B travels over the scale, the second base member 7B swings downward and moves away from the variable bag 3. As a result, the variable bag 3 returns to the initial state, and the initial traveling state in which the second base member 7B is parallel to the first base member 7A is restored. The action of traveling over the scale in this case also applies to the front driving wheel 8A of the first wheel-based traveling element 2A and to the rear driving wheel 8A of the first wheel-based traveling element 2A and the rear driving wheel 8B of the second wheel-based traveling element 2B.

For example, in a case where any of the drive motors fails in the state in which the in-pipe moving apparatus 1 having the configuration in the related art is present in a linear or curved portion of the pipe 30, the in-pipe moving apparatus cannot be taken out of the pipe by using the frictional force that occurs between the wheels and the inner surface of the pipe. In contrast, the in-pipe moving apparatus 1 according to the present embodiment can be readily taken out of the pipe 30 as follows even in the case where the accident described above occurs.

That is, in a case where anyone or more of the driving wheels 8A and 8B of the in-pipe moving apparatus 1 fail and the in-pipe moving apparatus 1 is therefore unable to move in the middle of the pipe 30, the internal pressure in the variable bag 3 is released to the outside, for example, by stopping the supply of the air pressure from the pneumatic apparatus and opening a check valve. When the interior of the variable bag 3 is depressurized as described above, the compressional force of the springs 5 also acts on the variable bag 3 so that the variable bag 3 contracts, and the state of the in-pipe moving apparatus 1 shown in FIG. 8 is achieved. The exterior rotary elements 17 of the driving wheels 8A or 8B of at least the wheel-based traveling element 2A (or 2B) out of the two sets of wheel-based traveling elements 2A and 2B can therefore be separate from the inner surface of the pipe 30.

As a result, the state in which the in-pipe moving apparatus 1 is stuck in the pipe 30 is eliminated, whereby the force that holds the in-pipe moving apparatus 1 in the pipe 30 is reduced or eliminated. The towing member, which is not shown, is then pulled via an opening of the pipe 30, whereby the in-pipe moving apparatus 1 stuck in the pipe 30 can be readily taken out of the pipe 30.

It is preferable to set the distance between the two driving wheels 8A or 8B out of the two sets of the wheel-based traveling elements 2A and 2B to a small value that does not cause the two adjacent exterior rotary elements 17 to be in contact with each other or causes the two adjacent exterior rotary elements 17 to be separate enough from each other not to make it difficult to hold the attitude of the in-pipe moving apparatus, as shown in FIGS. 9 and 10. The reason for this is that since the two driving wheels 8A and 8B are fixed to the base members 7A and 7B, a smaller gap between the two driving wheels 8A, 8A (or 8B, 8B) allows passage through a curved portion having a smaller radius of curvature. Further, the wheel-based traveling elements 2A and 2B have been described with reference to the case where the two driving wheels 8A and 8B are provided on a set basis, and three or more driving wheels can, of course, be provided on a set basis.

Further, the in-pipe moving apparatus 1 according to the first embodiment has been described with reference to the case where the two sets of wheel-based traveling elements 2A and 2B are provided, and two sets of crawler traveling elements can be used in place of the two sets of wheel-based traveling elements 2A and 2B. The two sets of crawler traveling elements, although not shown, can for example, be configured as follows:

That is, only the drive motor of one of the two driving wheels 8A of the wheel-based traveling element 2A is used with the other drive motor omitted, and pulleys are attached in place of the exterior rotary elements 17. An endless, continuous traveling belt is bridged over the portion between the pulleys disposed on the front and rear sides, and the one drive motor is driven to cause the traveling bels to travel. The same applies to the wheel-based traveling element 2B. The configuration described above allows the in-pipe moving apparatus 1 to travel by using the two sets of crawler traveling elements in the same manner in which the in-pipe moving apparatus 1 is caused to travel by using the two sets of wheel-based traveling elements 2A and 2B. The same holds true for a case where the in-pipe moving apparatus 1 passes through a stepped portion of a pipe, a recessed portion of a joint between pipes, a portion where the diameter of a pipe changes to a larger or smaller value, or any other portion of a pipe.

FIGS. 11 to 17 describe a second embodiment of an in-pipe moving apparatus according to the present invention.

Figure 11:
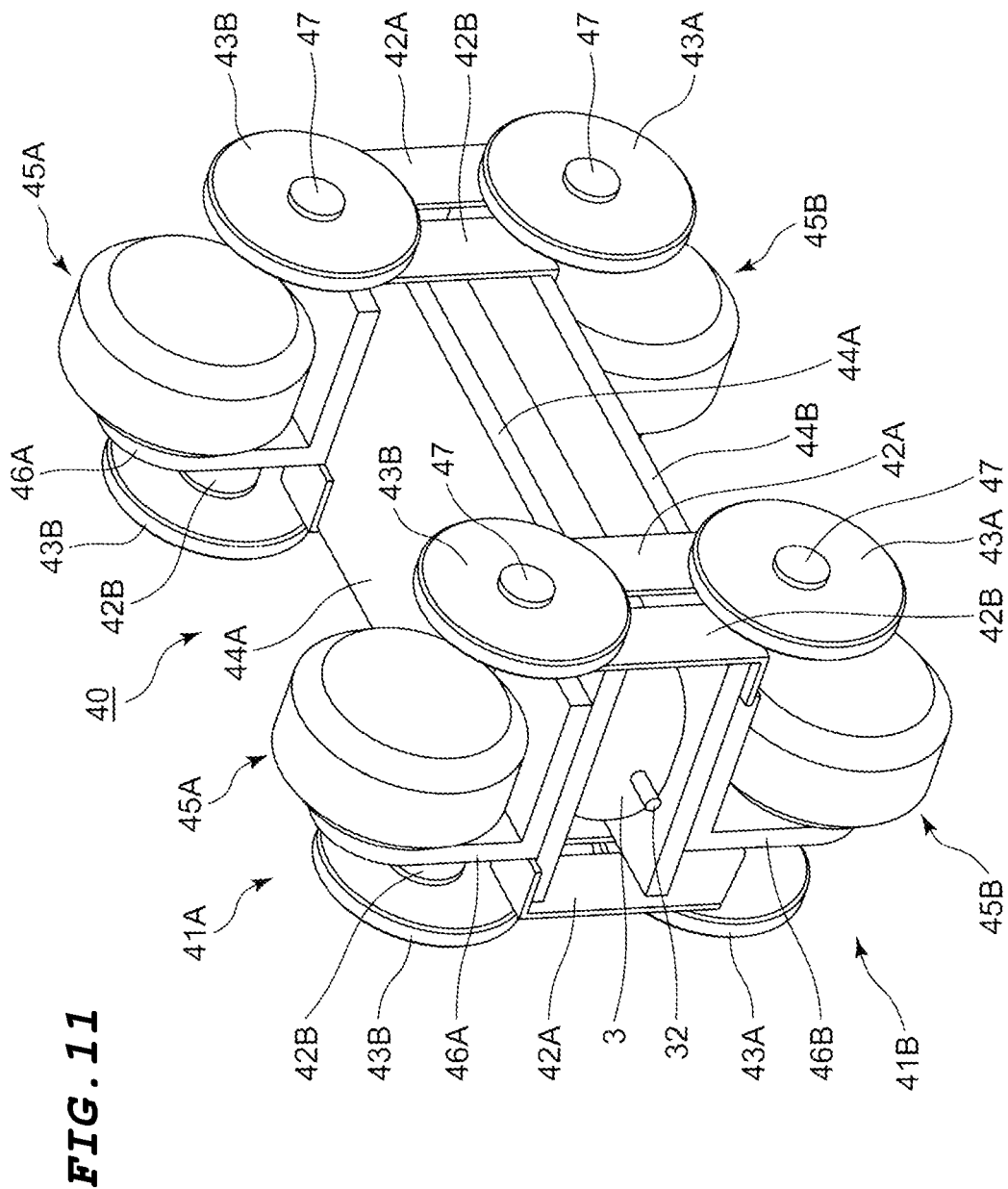
FIG. 11 is an exterior perspective view showing a second embodiment of an in-pipe moving apparatus according to the present invention.
Figure 12:
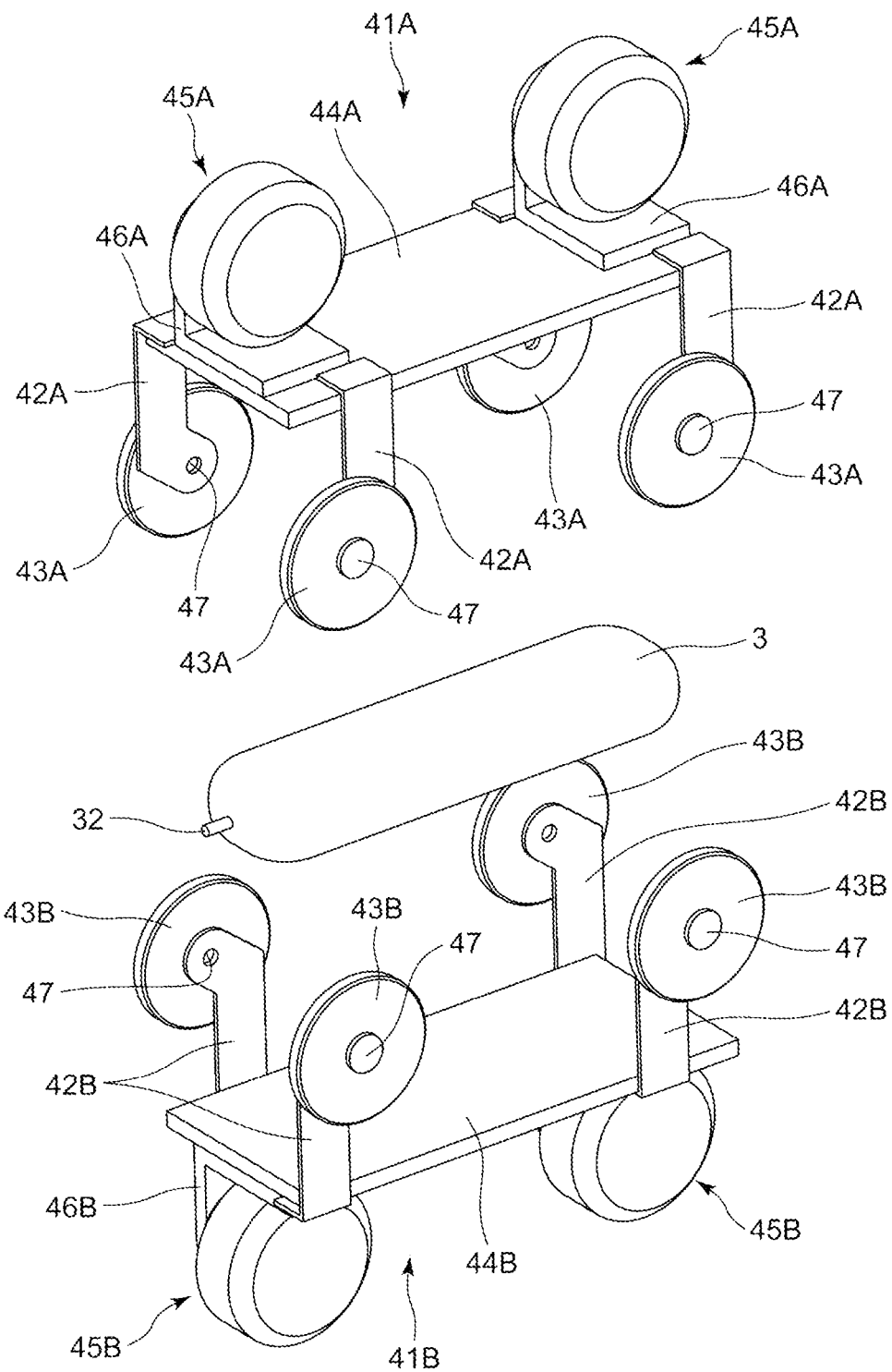
FIG. 12 is an exploded perspective view of the in-pipe moving apparatus according to the second embodiment of the present invention shown in FIG. 11.
Figure 16:
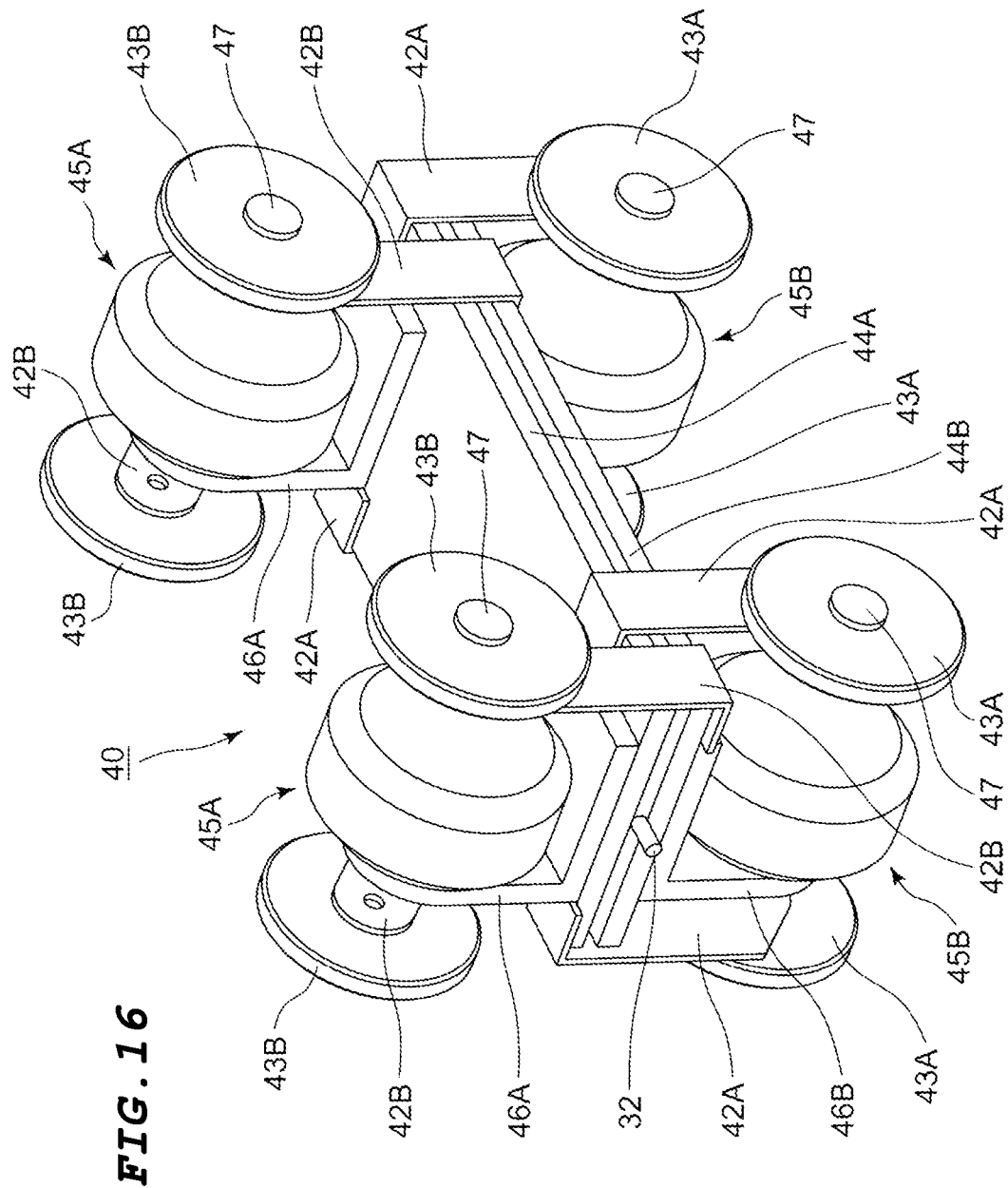
FIG. 16 is a perspective view showing the in-pipe moving apparatus according to the second embodiment shown in FIG. 11 in the state in which the variable bag is contracted.

An in-pipe moving apparatus 40 according to the second embodiment of the present invention includes two sets of wheel-based traveling elements 41A and 41B, one variable bag 3, four support pieces 42A and 42B, which each form a pair, four auxiliary wheels 43A and 43B, and other components, as shown in FIGS. 11, 12, and 16.

The two sets of wheel-based traveling elements 41A and 41B are so formed of the same parts and configured to have the same structure that the wheel-based traveling elements 41A and 41B are vertically symmetric. The wheel-based traveling elements 41A and 41B each include a base member 44A or 44B, two driving wheels 45A or 45B, two support brackets 46A or 46B, which rotatably support the driving wheels 45A or 45B on the base member 7A or 7B, and other components.

The base members 44A and 44B are each formed of a plate-shaped member having an oblong shape, and the two support brackets 46A and 46B are each so fixed to substantially widthwise central portions of one-side surfaces of the base members 44A and 44B by using known fixing means as to be separate from each other by a predetermined distance in the longitudinal direction of the base members 44A and 44B. The support brackets 46A and 46B can be fixed, for example, by using screw fastening using fixing screws, adhesion based on welding, bonding using an adhesive, and a variety of other means. The support brackets 46A and 46B are each formed of a member formed in an L-letter-like shape, and one side of the L-letter-like shape is fixed to a flat surface portion of each of the base members 44A and 44B to cause the other side to protrude in the vertical direction. Driving wheels 45A and 45B are rotatably supported by front end portions of the support brackets 46A and 46B.

The driving wheels 45A and 45B differ from the driving wheels 8A and 8B shown in the first embodiment described above in terms of exterior appearance but are the same as the driving wheels 8A and 8B in terms of the configurations, functions, and other factors of the drive motors, the exterior rotary elements, and other components that are the basic configurations of the driving wheels, as shown in FIG. 11 and other figures. The driving wheels 45A and 45B will not therefore be described in detail. Also in the second embodiment, two sets of crawler traveling elements, such as those described in the first embodiment, can, of course, be used in place of the two sets of wheel-based traveling elements 41A and 41B.

The four support pieces 42A and 42B are each formed of a member formed in an L-letter-like shape, and one side of the L-letter-like shape is fixed to each of four corner portions of the flat surface of each of the base members 44A and 44B to cause the other side to protrude toward the side opposite the side toward which the support brackets 46A and 46B protrude. The support pieces 42A and 42B can be fixed, for example, by using screw fastening using fixing screws, adhesion based on welding, bonding using an adhesive, and a variety of other means. The auxiliary wheels 43A and 43B are rotatably supported by pivotal axes 47 at front end portions of the four support pieces 42A and 42B. In the wheel-based traveling elements 41A and 41B, the centers of rotation of the auxiliary wheels 43A and 43B so placed as to face each other in the width direction of the base members 44A and 44B are located along the same axial lines.

The two sets of wheel-based traveling elements 41A and 41B are so disposed that the base members 44A and 44B face each other with the variable bag 3 sandwiched therebetween and so combined with each other that the auxiliary wheels 43A or 43B supported by the support pieces 42A or 42B of the wheel-based traveling element 41A or 41B sandwich the driving wheels 45B or 45A of the wheel-based traveling element 41B or 41A on opposite sides, as shown in FIG. 12. The two sets of wheel-based traveling elements 41A and 41B are thus combined with each other in the state shown in FIGS. 11 and 16. The variable bag 3 is the same as that in the first embodiment described above and will not therefore be described.

In each of the thus combined two sets of wheel-based traveling elements 41A and 41B, the support pieces 42A or 42B of the base member 44A or 44B protrude upward above the base member 44B or 44A. The four support pieces 42A (or 42B) of the wheel-based traveling element 41A (or 41B)

restrict the motion of the wheel-based traveling element 41B (or 41A), whereby the two sets of wheel-based traveling elements 41A and 41B are movable only in the radial direction of the pipe 30.

Figure 13:
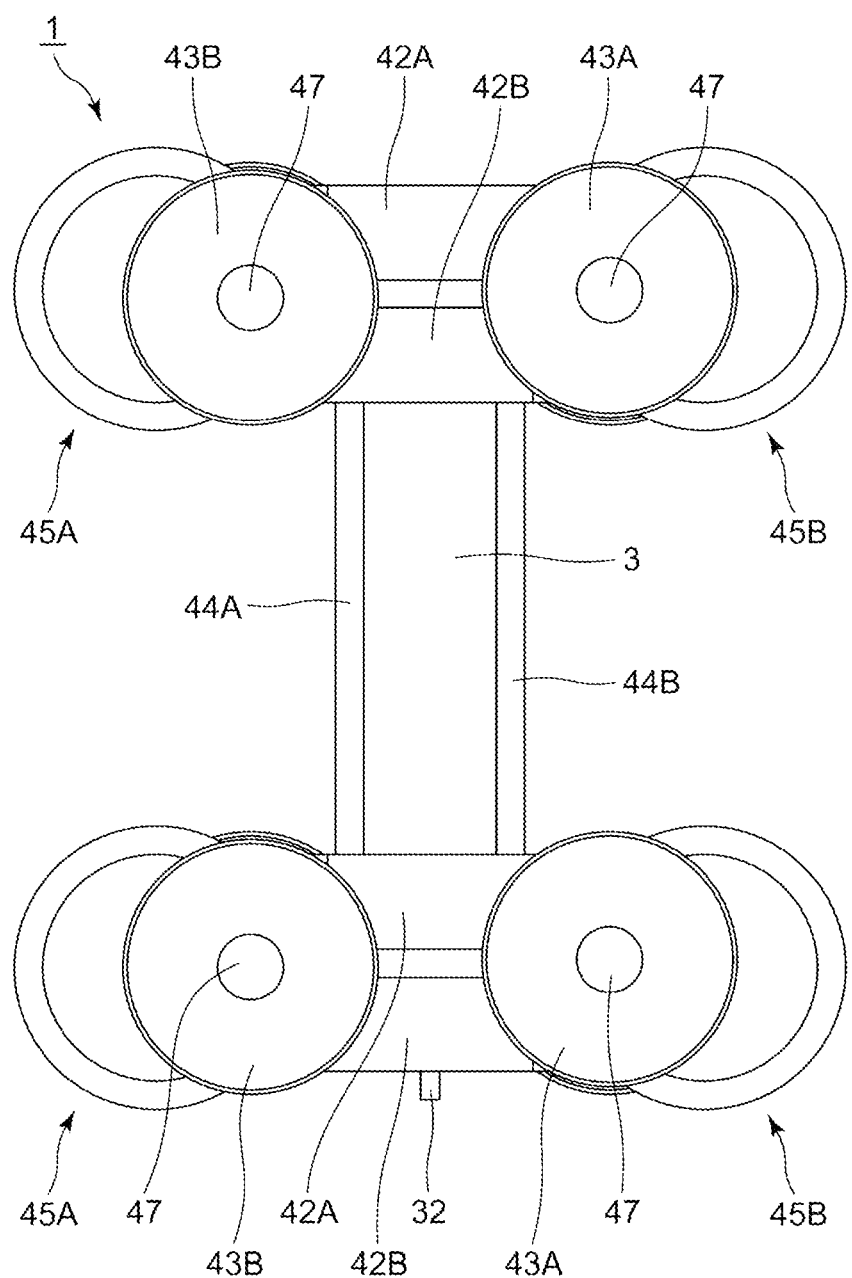
FIG. 13 is aside view of the in-pipe moving apparatus according to the second embodiment shown in FIG. 11.
Figure 14:
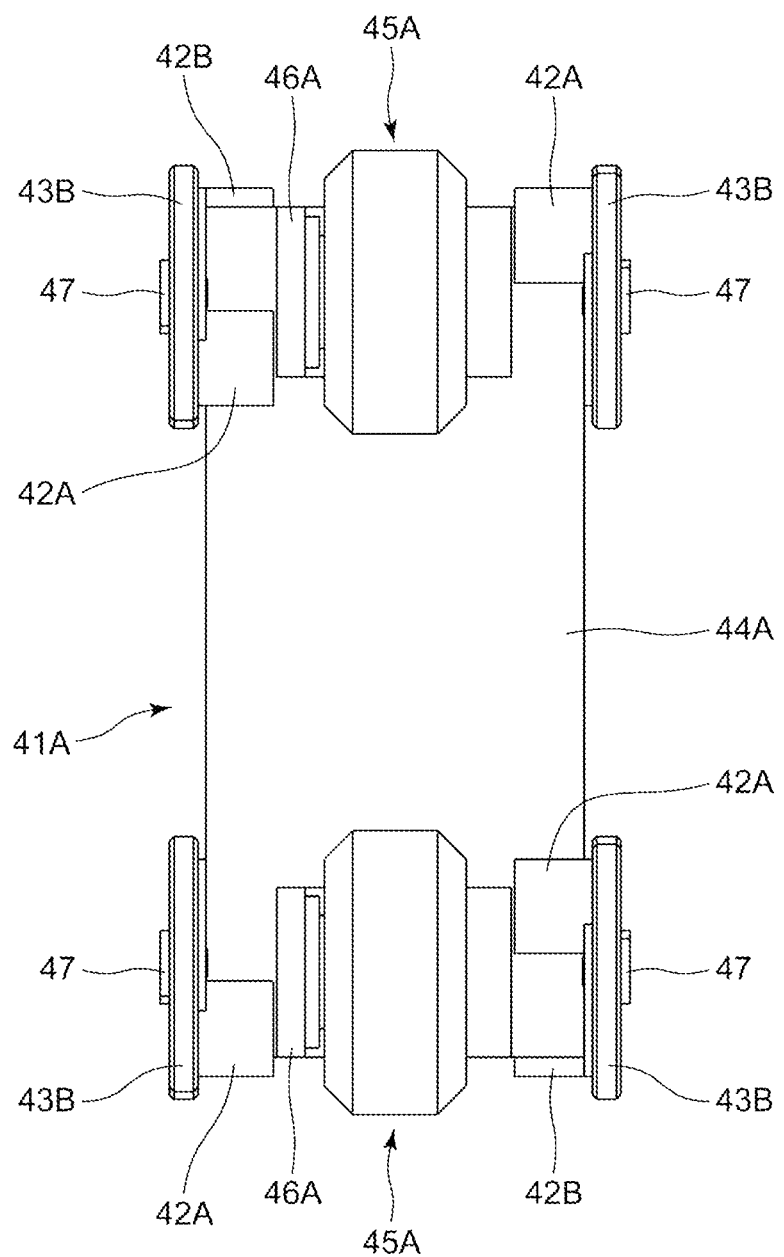
FIG. 14 is a plan view of the in-pipe moving apparatus according to the second embodiment shown in FIG. 11.
Figure 15:
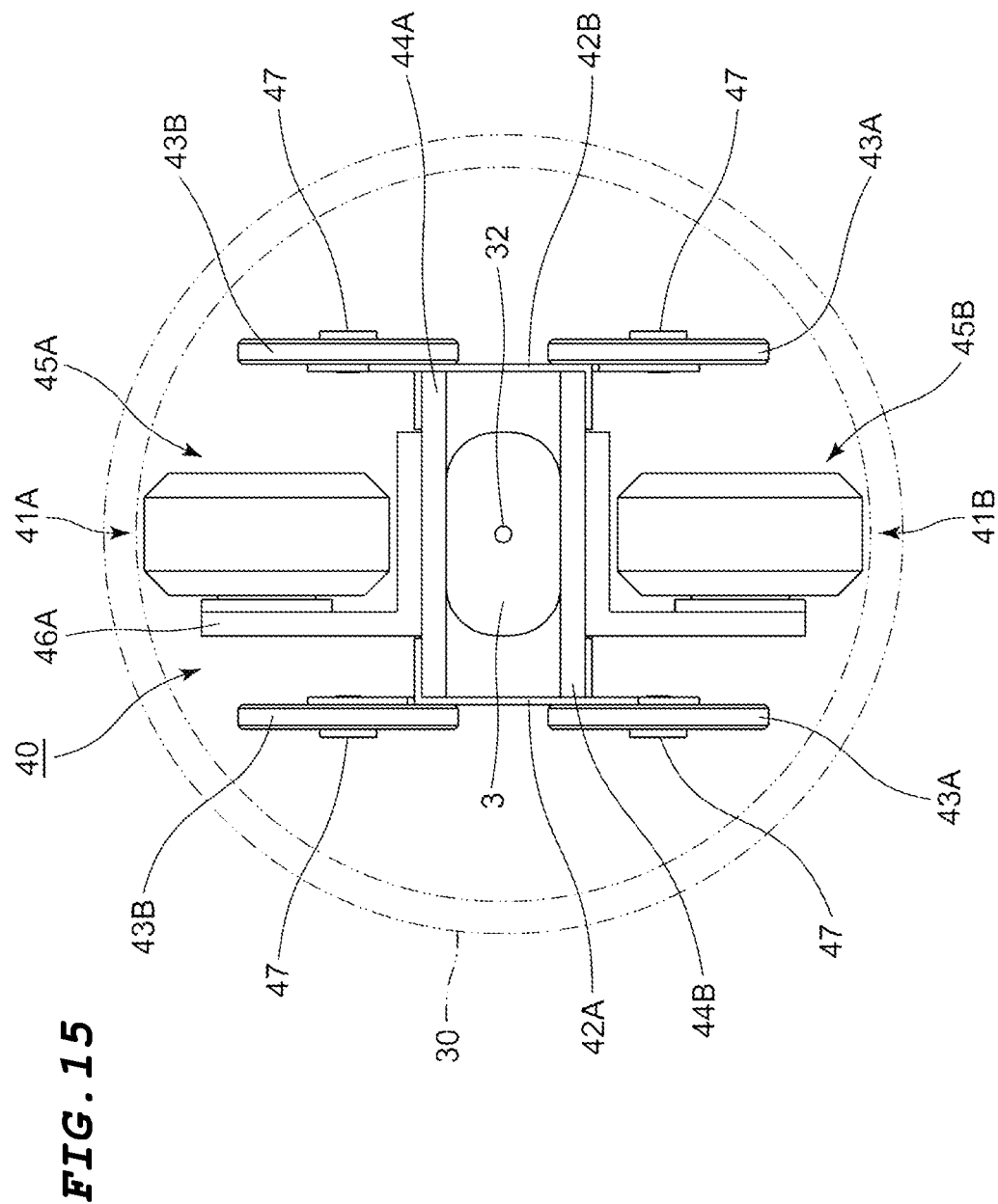
FIG. 15 is a front view showing the in-pipe moving apparatus according to the second embodiment shown in FIG. 11 in the state in which the variable bag is expanded.

In the in-pipe moving apparatus 40 having the configuration described above, the driving wheels 45A and 45B of the two sets of wheel-based traveling elements 41A and 41B are pressed against the inner surface of the pipe 30 in the state in which compressed air having at least predetermined pressure is supplied to the variable bag 3 to expand it, as shown in FIGS. 11, 13, and 15. At this point, the four auxiliary wheels 43A and 43B supported by the four support pieces 42A and 42B of the two sets of wheel-based traveling elements 41A and 41B are not pressed against the inner surface of the pipe but are separate from the inner surface with an appropriate gap held therebetween. Driving the four driving wheels 45A and 45B in this state allows the in-pipe moving apparatus 40 to move forward or backward in accordance with the rotational direction of the driving wheels 45A and 45B.

Further, for example, even in the case where scale extending on part of the inner surface of the pipe 30 or in the circumferential direction thereof develops, the in-pipe moving apparatus 40 according to the embodiment can travel over the scale and move in the pipe. For example, in a case where scale is present in front of the front driving wheel 45B of the second wheel-based traveling element 41B of the in-pipe moving apparatus 40 travelling in the pipe 30, and when the front driving wheel 45B travels on to the scale, pressing force resulting from reaction force from the scale acts from the front driving wheel 45B via the front support bracket 46B and the second base member 44B to a front end portion of the variable bag 3 from below to above in FIG. 12.

Therefore, a portion of the variable bag 3 that is a portion thereof on the forward side in the traveling direction is compressed, whereas a portion of the variable bag 3 that is a portion thereof on the backward side in the traveling direction is expanded. Following the elastic deformation of the variable bag 3, the front driving wheel 45B travels over the scale. Once the front driving wheel 45B travels over the scale, the second base member 44B swings downward and moves away from the variable bag 3. As a result, the variable bag 3 returns to the initial state, and the initial traveling state in which the second base member 44B is parallel to the first base member 44A is restored. The action of traveling over the scale in this case also applies to the front driving wheel 45A of the first wheel-based traveling element 41A and to the rear driving wheel 45A of the first wheel-based traveling element 41A and the rear driving wheel 45B of the second wheel-based traveling element 41B.

Figure 17:
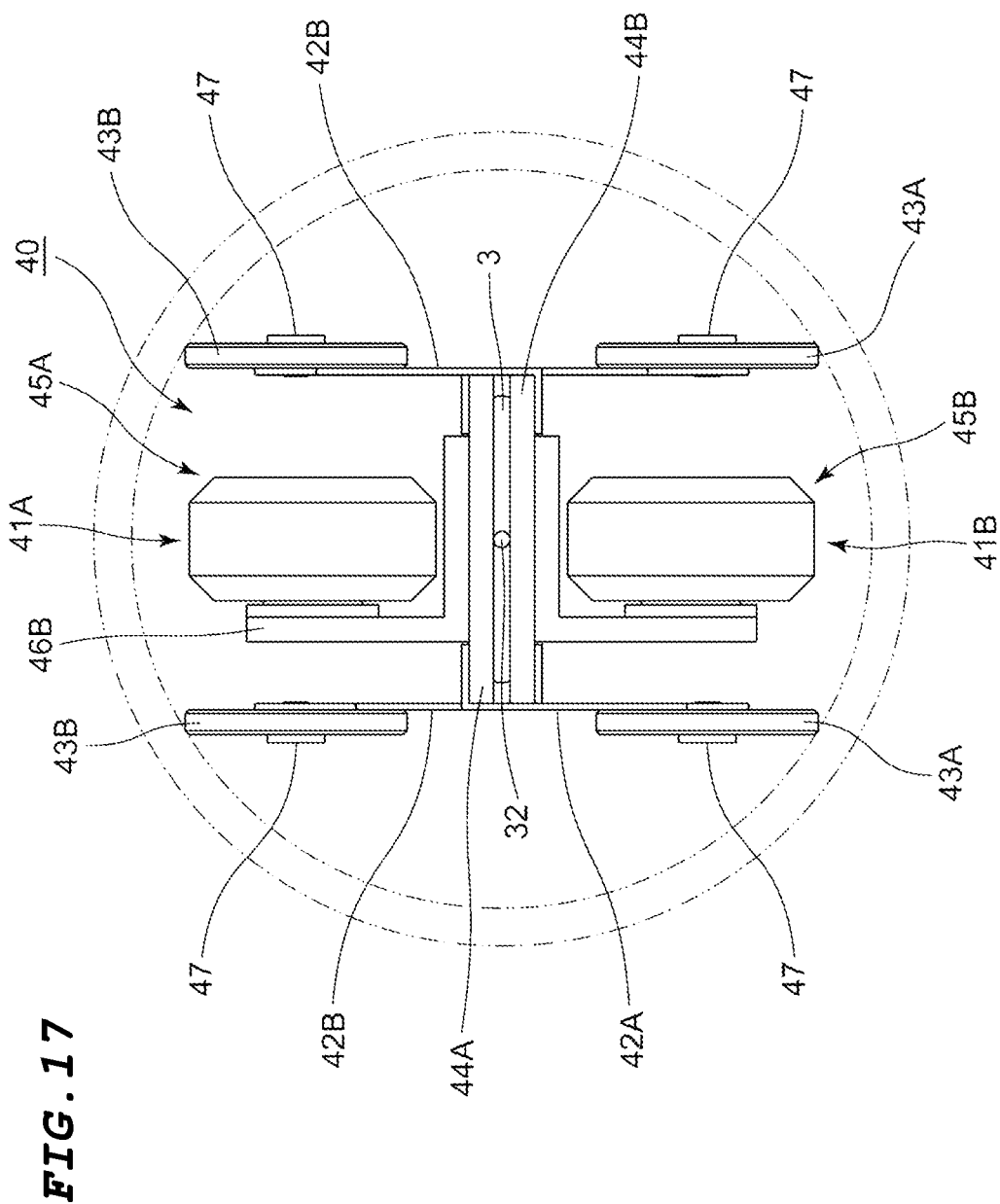
FIG. 17 is a front view showing the in-pipe moving apparatus according to the second embodiment shown in FIG. 11 in the state in which the variable bag is contracted.

For example, even in a case where any of the drive motors fails in the state in which the in-pipe moving apparatus 40 in a linear or curved portion of the pipe 30, the in-pipe moving apparatus 40 can be readily taken out of the pipe 30 as follows:

For example, in a case where any one or more of the driving wheels 45A and 45B of the in-pipe moving apparatus 40 fail and the in-pipe moving apparatus 40 is therefore unable to move, for example in the middle of a curved portion of the pipe 30 or in a branching portion thereof, the internal pressure in the variable bag 3 is released to the outside, for example, by stopping the supply of the air pressure from the pneumatic apparatus and opening a check valve. When the interior of the variable bag 3 is depressurized as described above, the variable bag 3 contracts, and the state of the in-pipe moving apparatus 40 shown in FIG. 17 is achieved. One or more of the driving wheels 45A or 45B of at least the wheel-based traveling element 41A (or 41B) out of the two sets of wheel-based traveling elements 41A and 41B can therefore be separate from the inner surface of the pipe 30.

As a result, the state in which the in-pipe moving apparatus 40 is stuck in the pipe 30 is eliminated, whereby the force that holds the in-pipe moving apparatus 40 in the pipe 30 is reduced or eliminated. The towing member, which is not shown, is then pulled via an opening of the pipe 30, whereby the in-pipe moving apparatus 40 stuck in the pipe 30 can be readily taken out of the pipe 30. The same holds true for a case where the in-pipe moving apparatus 40 passes through a stepped portion of a pipe, a recessed portion of a joint between pipes, a portion where the diameter of a pipe changes to a larger or smaller value, or any other portion of a pipe.

FIGS. 18 to 21 describe a third embodiment of an in-pipe moving apparatus according to the present invention.

Figure 18:
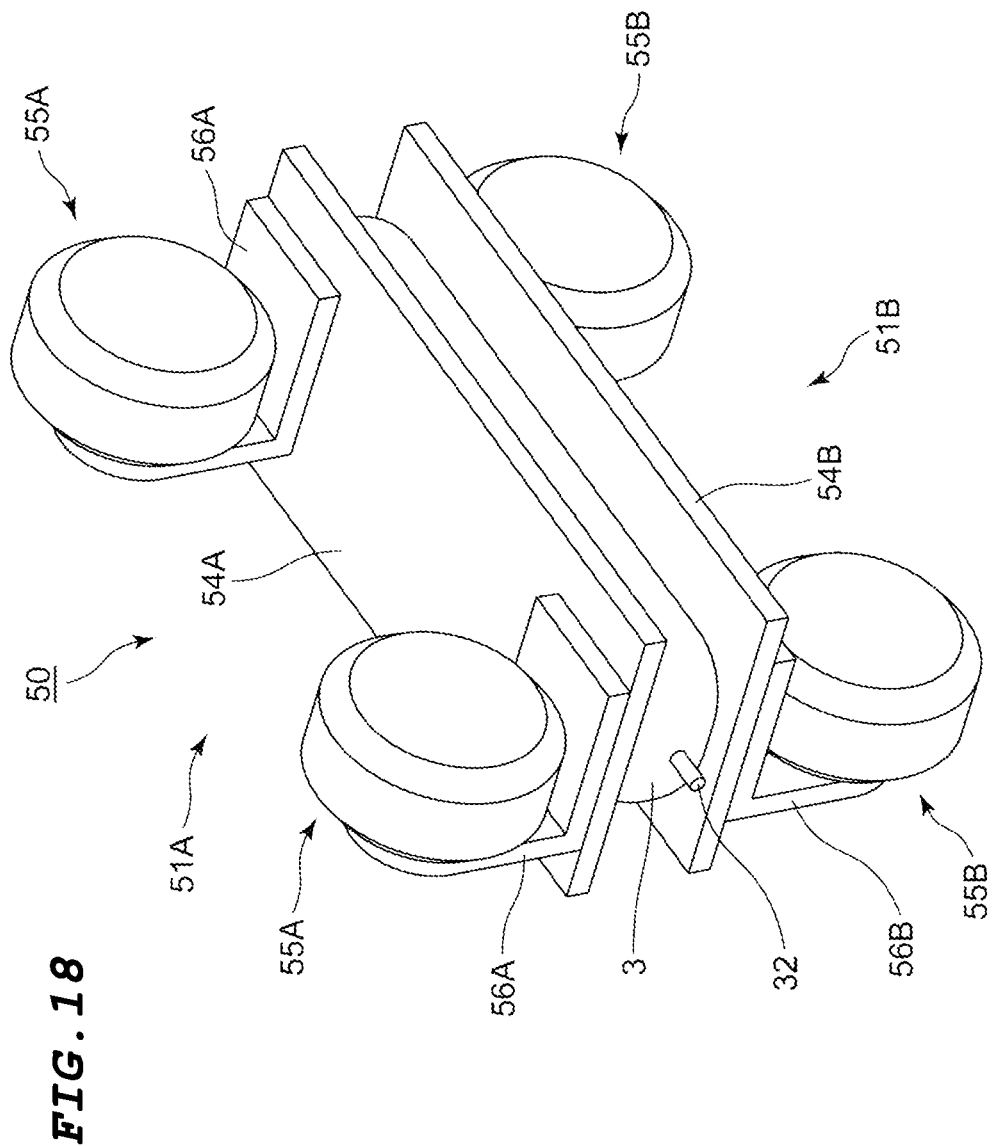
FIG. 18 is an exterior perspective view showing a third embodiment of an in-pipe moving apparatus according to the present invention.

An in-pipe moving apparatus 50 according to the third embodiment of the present invention includes two sets of wheel-based traveling elements 51A and 51B and one variable bag 3, as shown in FIG. 18.

Figure 19:
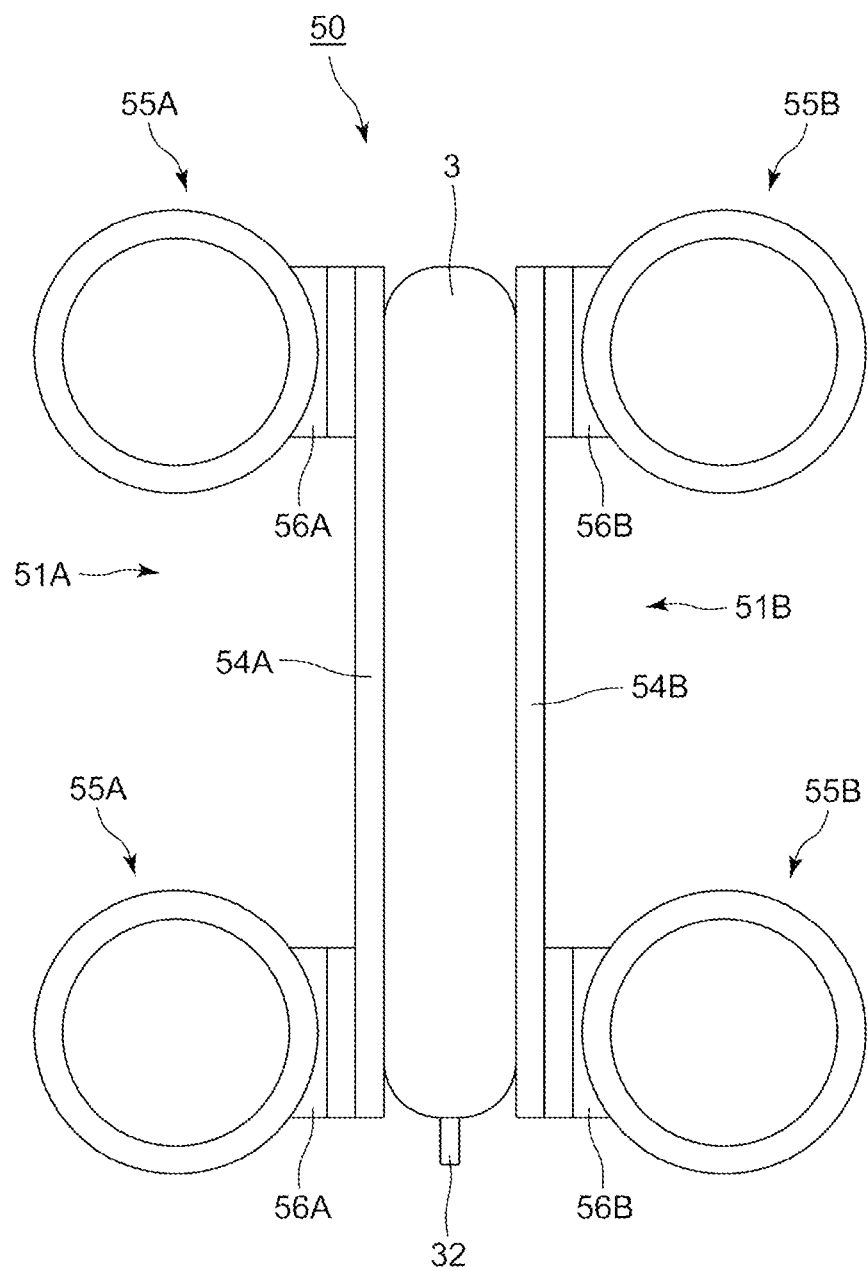
FIG. 19 is a side view of the in-pipe moving apparatus according to the third embodiment of the present invention shown in FIG. 18.
Figure 20:
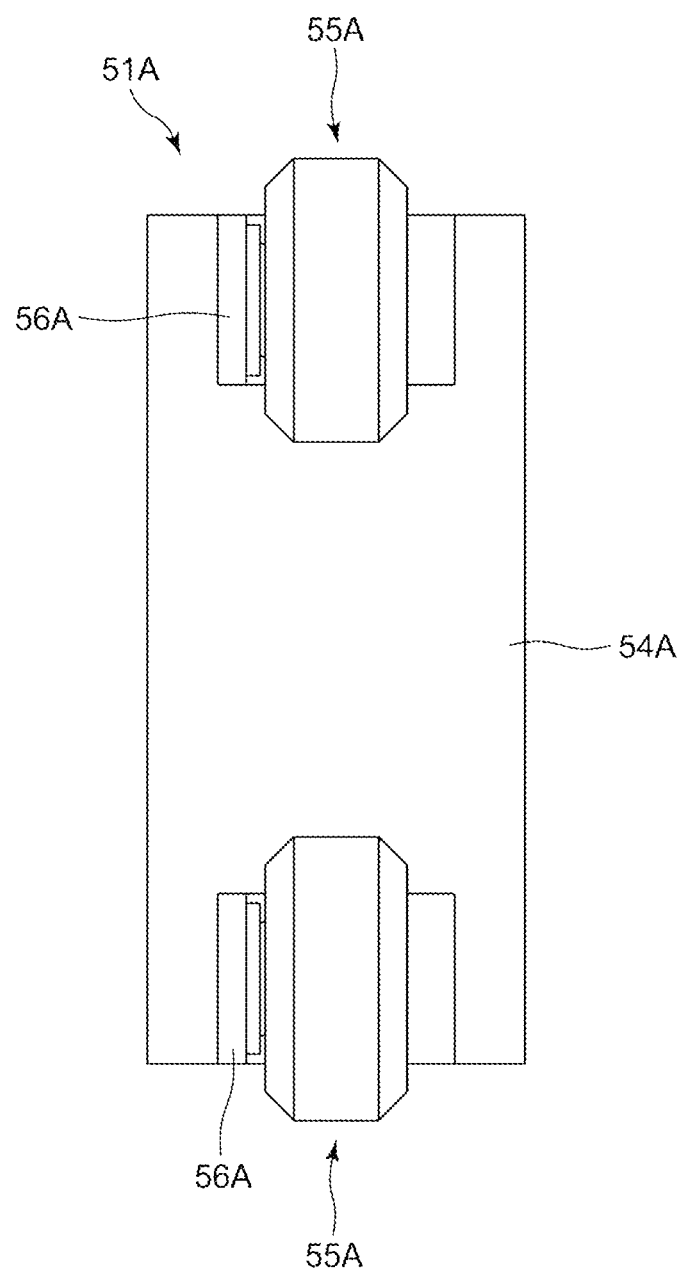
FIG. 20 is a plan view of the in-pipe moving apparatus according to the third embodiment shown in FIG. 18.
Figure 21:
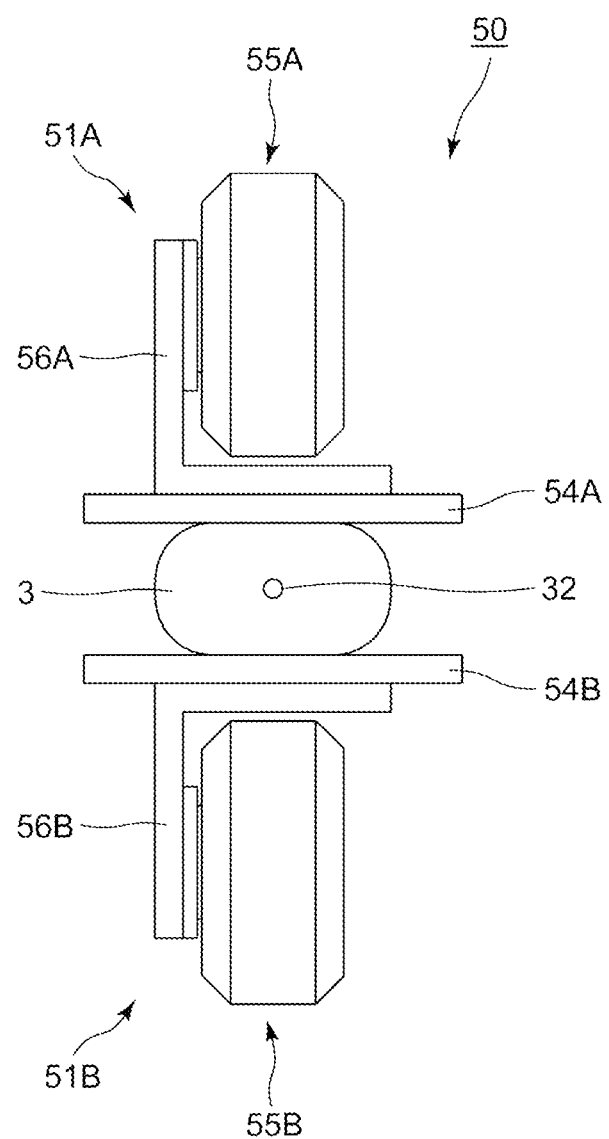
FIG. 21 is a front view of the in-pipe moving apparatus according to the third embodiment shown in FIG. 18.

The two sets of wheel-based traveling elements 51A and 51B are the same as the two sets of wheel-based traveling elements 41A and 41B shown in the second embodiment described above in terms of not only the exterior appearance but the configurations, functions, and other factors of base members 54A and 54B, driving wheels 55A and 55B, and support brackets 56A and 56B, which are the basic configurations of the wheel-based traveling elements, as shown in FIGS. 19 to 21. The two sets of wheel-based traveling elements 51A and 51B will not therefore be described in detail. Also in the third embodiment, two sets of crawler traveling elements, such as those described in the first embodiment, can, of course, be used in place of the two sets of wheel-based traveling elements 51A and 51B.

The variable bag 3 is the same as that in the first embodiment described above and will not therefore be described. The two sets of wheel-based traveling elements 51A and 51B are fixed to the outer circumferential surface of the variable bag 3 in positions thereon angularly displaced from each other by 180 degrees. As the fixation of the two sets of wheel-based traveling driving 51A and 51B to the variable bag 3, it is typical to firmly fix the wheel-based traveling elements 51A and 51B to the outer surface of the variable bag 3 with an adhesive. Instead, a double-sided adhesive tape may be used for the fixation. In the third embodiment, since the two sets of wheel-based traveling elements 51A and 51B are disposed on opposite sides of the variable bag 3, the cross-sectional shape of the variable bag 3 in the direction perpendicular to the longitudinal direction thereof is preferably an elliptical shape, an oblong shape, or a square shape.

The in-pipe moving apparatus 50 having the configuration described above also can quickly and smoothly move forward and backward in a pipe by actuating the driving wheels 55A and 55B.

Even in the case where scale extending on part of the inner surface of the pipe or in the circumferential direction thereof develops, the in-pipe moving apparatus 50 according to the embodiment can travel over the scale and move in the pipe. For example, in a case where scale is present in front of the front driving wheel 55B of the second wheel-based traveling element 51B of the in-pipe moving apparatus 50 travelling in the pipe, and when the front driving wheel 55B travels on to the scale, pressing force resulting from reaction force from the scale acts from the front driving wheel 55B via the front support bracket 56B and the second base member 54B to a front end portion of the variable bag 3 from below to above in FIG. 19.

Therefore, a portion of the variable bag 3 that is a portion thereof on the forward side in the traveling direction is compressed, whereas a portion of the variable bag 3 that is a portion thereof on the backward side in the traveling direction is expanded. Following the elastic deformation of the variable bag 3, the front driving wheel 55B travels over the scale. Once the front driving wheel 55B travels over the scale, the second base member 54B swings downward and moves away from the variable bag 3. As a result, the variable bag 3 returns to the initial state, and the initial traveling state in which the second base member 54B is parallel to the first base member 54A is restored. The action of traveling over the scale in this case also applies to the front driving wheel 55A of the first wheel-based traveling element 51A and to the rear driving wheel 55A of the first wheel-based traveling element 51A and the rear driving wheel 55B of the second wheel-based traveling element 51B.

For example, in a case where any one or more of the driving wheels 55A and 55B of the in-pipe moving apparatus 50 fail and the in-pipe moving apparatus 50 is therefore unable to move, for example in a straight or curved portion of the pipe, the internal pressure in the variable bag 3 is released to the outside, for example, by stopping the supply of the air pressure from the pneumatic apparatus and opening a check valve. When the interior of the variable bag 3 is depressurized as described above, the variable bag 3 contracts, and one or more of the driving wheels 55A or 55B of at least the wheel-based traveling element 51A (or 51B) out of the two sets of wheel-based traveling elements 51A and 51B can be separate from the inner surface of the pipe.

As a result, the state in which the in-pipe moving apparatus 50 is stuck in the pipe is eliminated, whereby the force that holds the in-pipe moving apparatus 50 in the pipe is reduced or eliminated. The towing member, which is not shown, is then pulled via an opening of the pipe, whereby the in-pipe moving apparatus 50 stuck in the pipe can be readily taken out of the pipe. The same holds true for a case where the in-pipe moving apparatus 50 passes through a stepped portion of a pipe, a recessed portion of a joint between pipes, a portion where the diameter of a pipe changes to a larger or smaller value, or any other portion of a pipe.

FIGS. 22 to 25 describe a fourth embodiment of an in-pipe moving apparatus according to the present invention.

Figure 22:
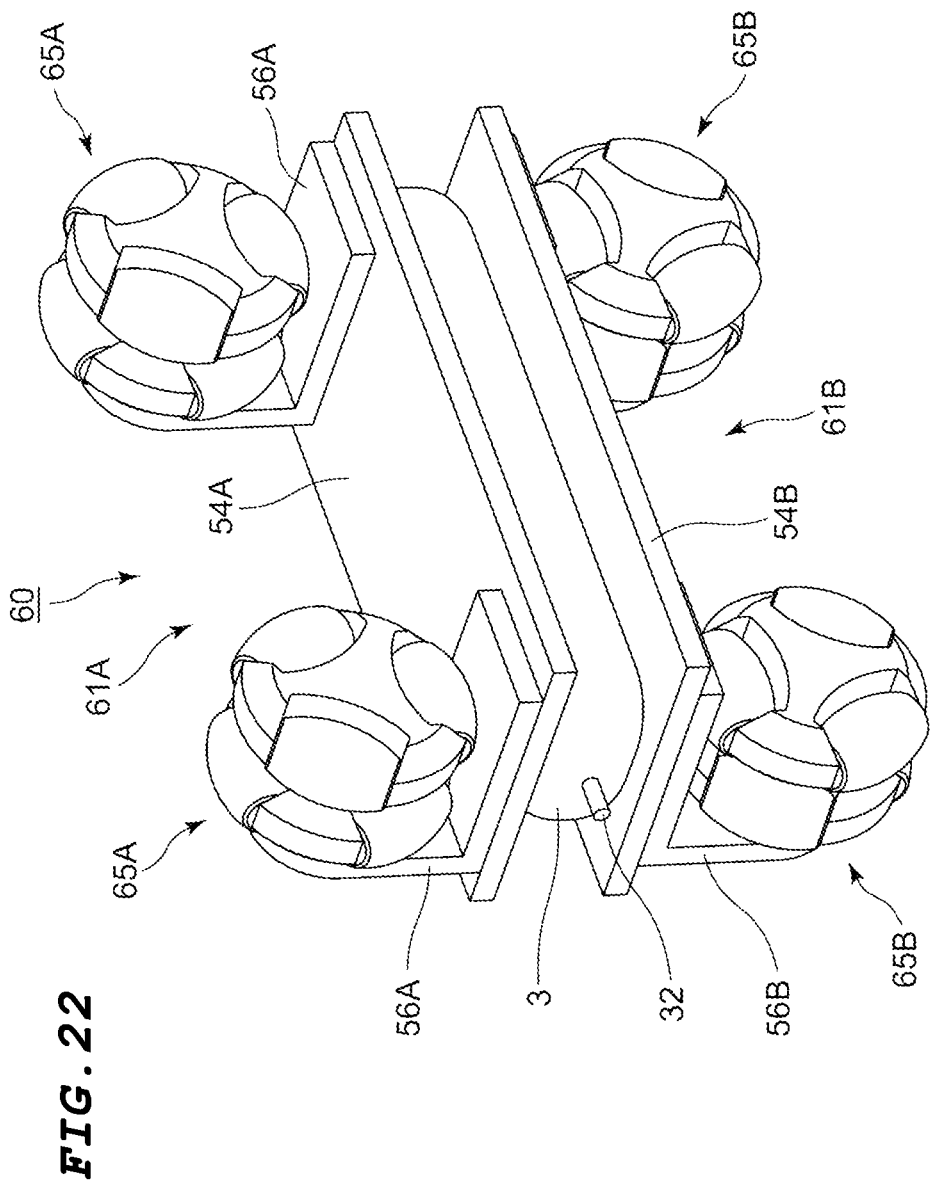
FIG. 22 is an exterior perspective view showing a fourth embodiment of an in-pipe moving apparatus according to the present invention.
Figure 23:
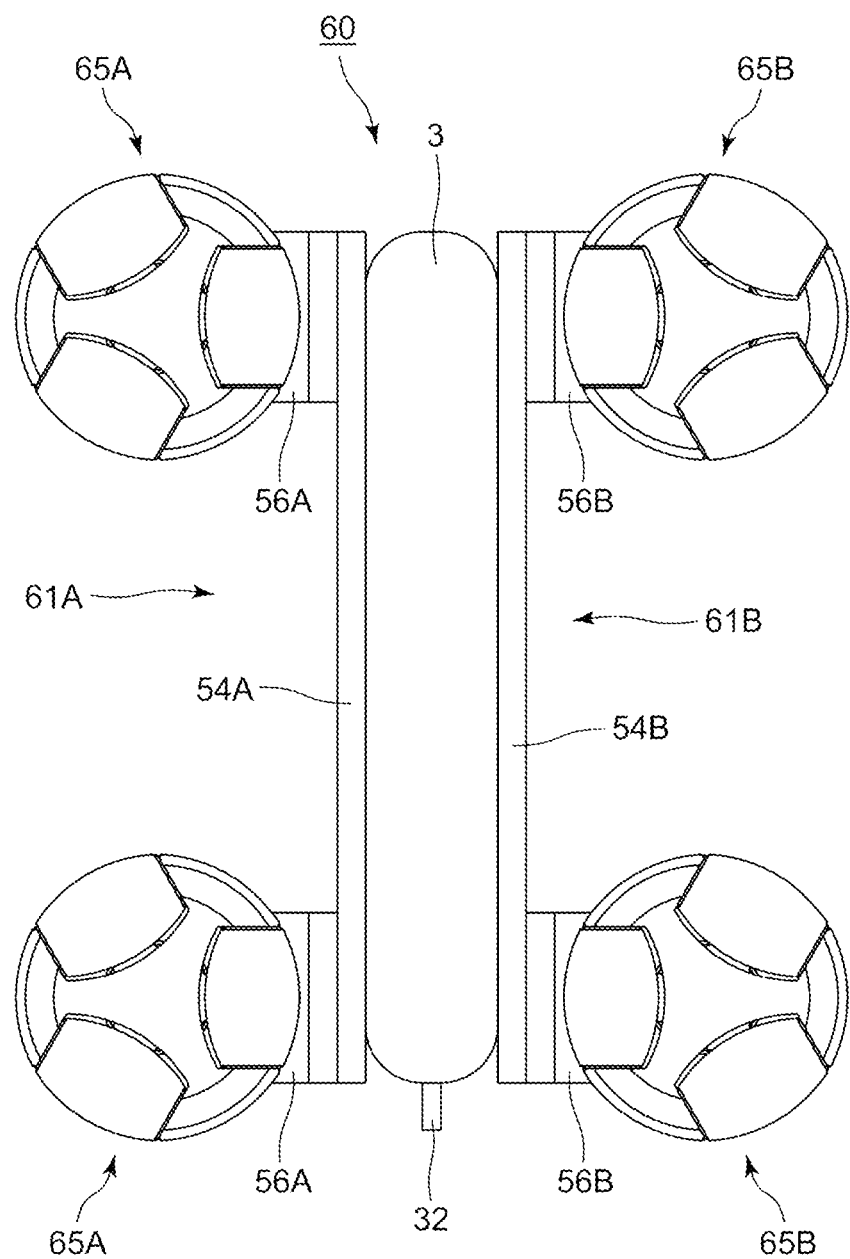
FIG. 23 is a side view of the in-pipe moving apparatus according to the fourth embodiment according to the present invention shown in FIG. 22.
Figure 24:
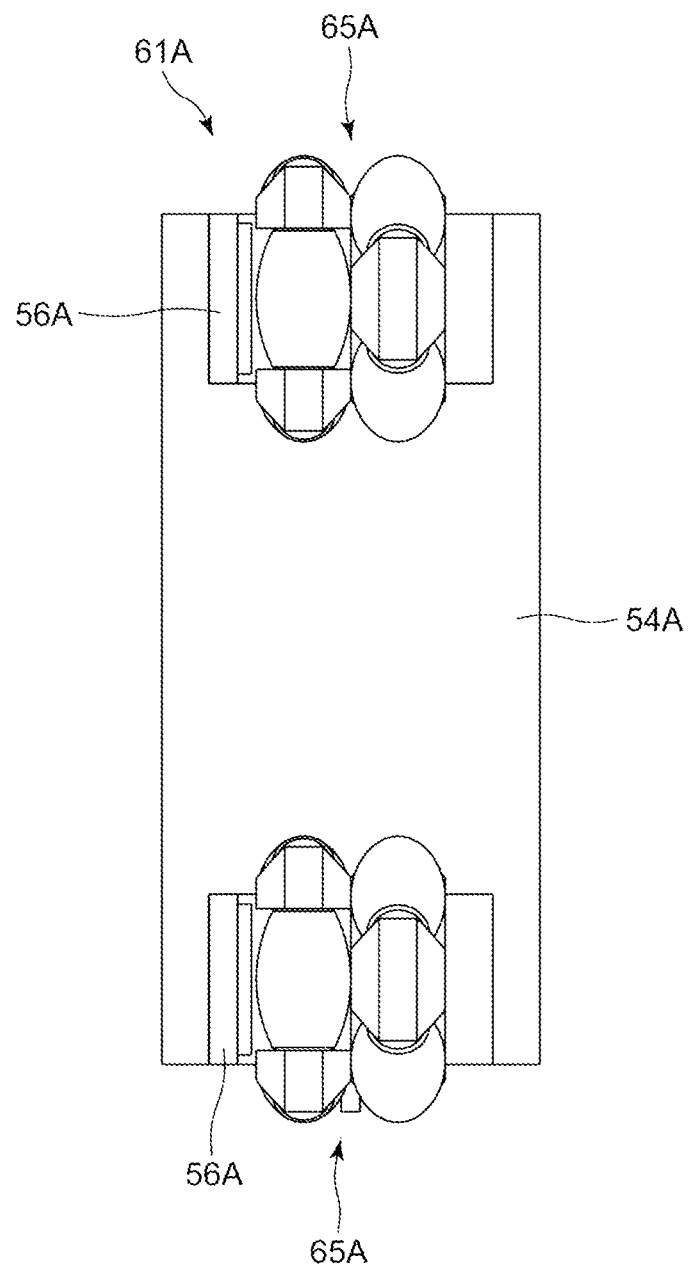
FIG. 24 is a plan view of the in-pipe moving apparatus according to the fourth embodiment shown in FIG. 22.
Figure 25:
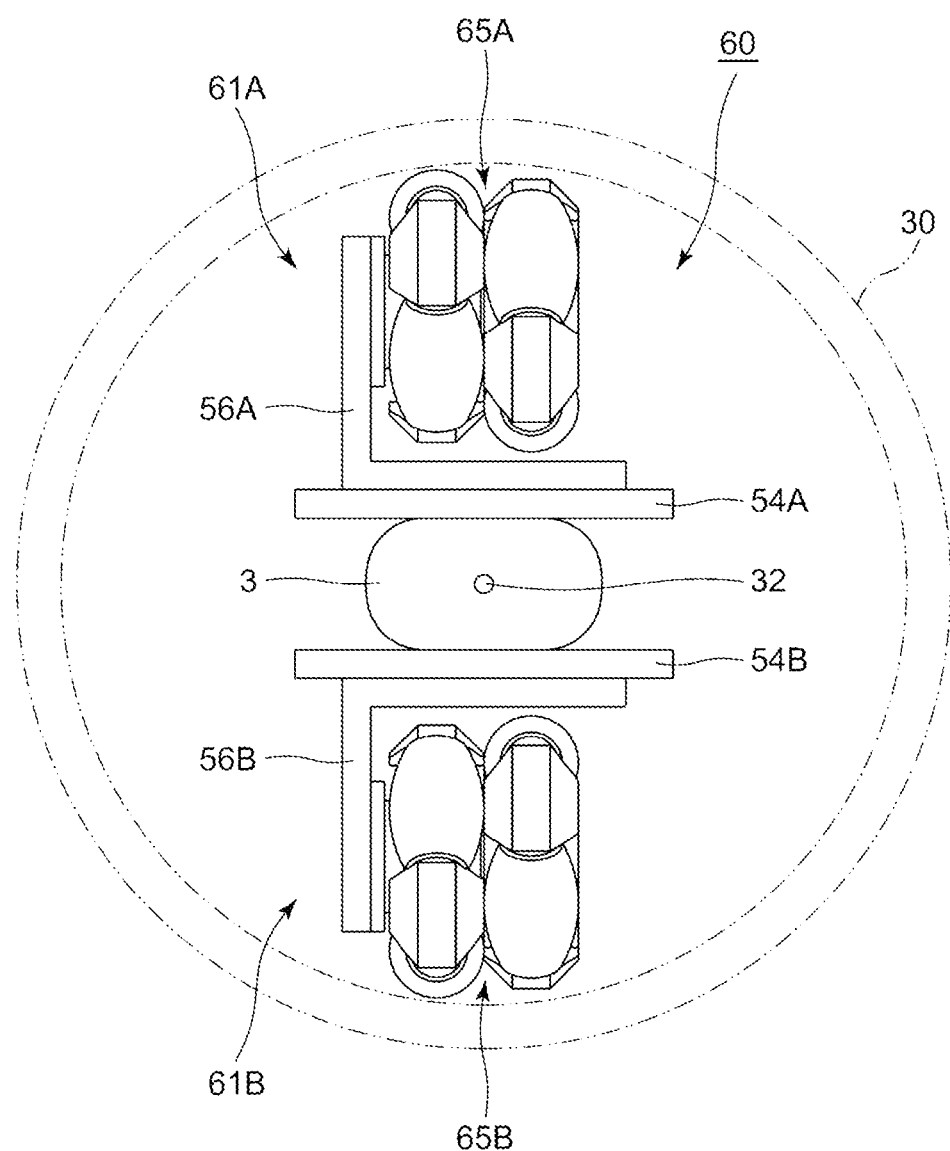
FIG. 25 is a front view of the in-pipe moving apparatus according to the fourth embodiment shown in FIG. 22.

An in-pipe moving apparatus 60 according to the fourth embodiment of the present invention differs from the in-pipe moving apparatus 50 according to the third embodiment only in that the two sets of wheel-based traveling elements 51A and 51B are replaced with two sets of wheel-based traveling elements 61A and 61B, and the other structure of the in-pipe moving apparatus 60 is the same as that of the in-pipe moving apparatus 50, as shown in FIG. 22. The base members 54A and 54B and the support brackets 56A and 56B having the same configurations as those in the in-pipe moving apparatus 50 will not therefore be described.

That is, the in-pipe moving apparatus 60 includes two sets of wheel-based traveling elements 61A and 61B and one variable bag 3. The two sets of wheel-based traveling elements 61A and 61B are characterized in that omni-wheels are used as driving wheels 65A and 65B, as shown in FIG. 22. An omni-wheel is a known technology and will not therefore be described in detail. A brief description of an overview of an omni-wheel is as follows:

An omni-wheel is a wheel having a plurality of (typically at least three) free rollers so arranged along the outer circumference of the axle as to be freely movable around the axis of rotation, and an omni-wheel is used, for example, as the wheels of an omnidirectional moving carriage. A typical omni-wheel has a structure in which two wheels each including free rollers are layered on each other and alternately arranged.

In the case of the in-pipe moving apparatus 1 using typical wheels shown in FIG. 1 and other figures, the wheels sideslip depending on the attitude of the apparatus in some cases when the apparatus enters a curved pipe from a straight pipe, whereas the in-pipe moving apparatus 60 including the driving wheels 65A and 65B each using an omni-wheel in the present embodiment allows a much smoother sideslip, whereby the amount of loss of energy in the movement can be reduced.

The in-pipe moving apparatus 60 having the configuration described above also can quickly and smoothly move forward and backward in a pipe by actuating the driving wheels 65A and 65B. Further, the driving wheels 65A and 65 travel over a scale, as the driving wheels described above do, and the in-pipe moving apparatus 50 passes through a stepped portion of a pipe, a recessed portion of a joint between pipes, a portion where the diameter of a pipe changes to a larger or smaller value, or any other portion of a pipe, as the in-pipe moving apparatuses described above do.

For example, in a case where any one or more of the driving wheels 65A and 65B of the in-pipe moving apparatus 60 fail and the in-pipe moving apparatus 60 is therefore unable to move, for example in a straight or curved portion of the pipe, the air pressure in the variable bag 3 is released to the outside, for example, by stopping the supply of the air pressure from the pneumatic apparatus and opening a check valve. When the interior of the variable bag 3 is depressurized so that the variable bag 3 contracts, as described above, one or more of the driving wheels 65A or 65B of at least the wheel-based traveling element 61A (or 61B) out of the two sets of wheel-based traveling elements 61A and 61B can be separate from the inner surface of the pipe.

As a result, the state in which the in-pipe moving apparatus 60 is stuck in the pipe is eliminated, whereby the force that holds the in-pipe moving apparatus 60 in the pipe is reduced or eliminated. The towing member, which is not shown, is then pulled via an opening of the pipe, whereby the in-pipe moving apparatus 60 stuck in the pipe can be readily taken out of the pipe.

FIGS. 26 to 30 describe a fifth embodiment of an in-pipe moving apparatus according to the present invention.

Figure 26:
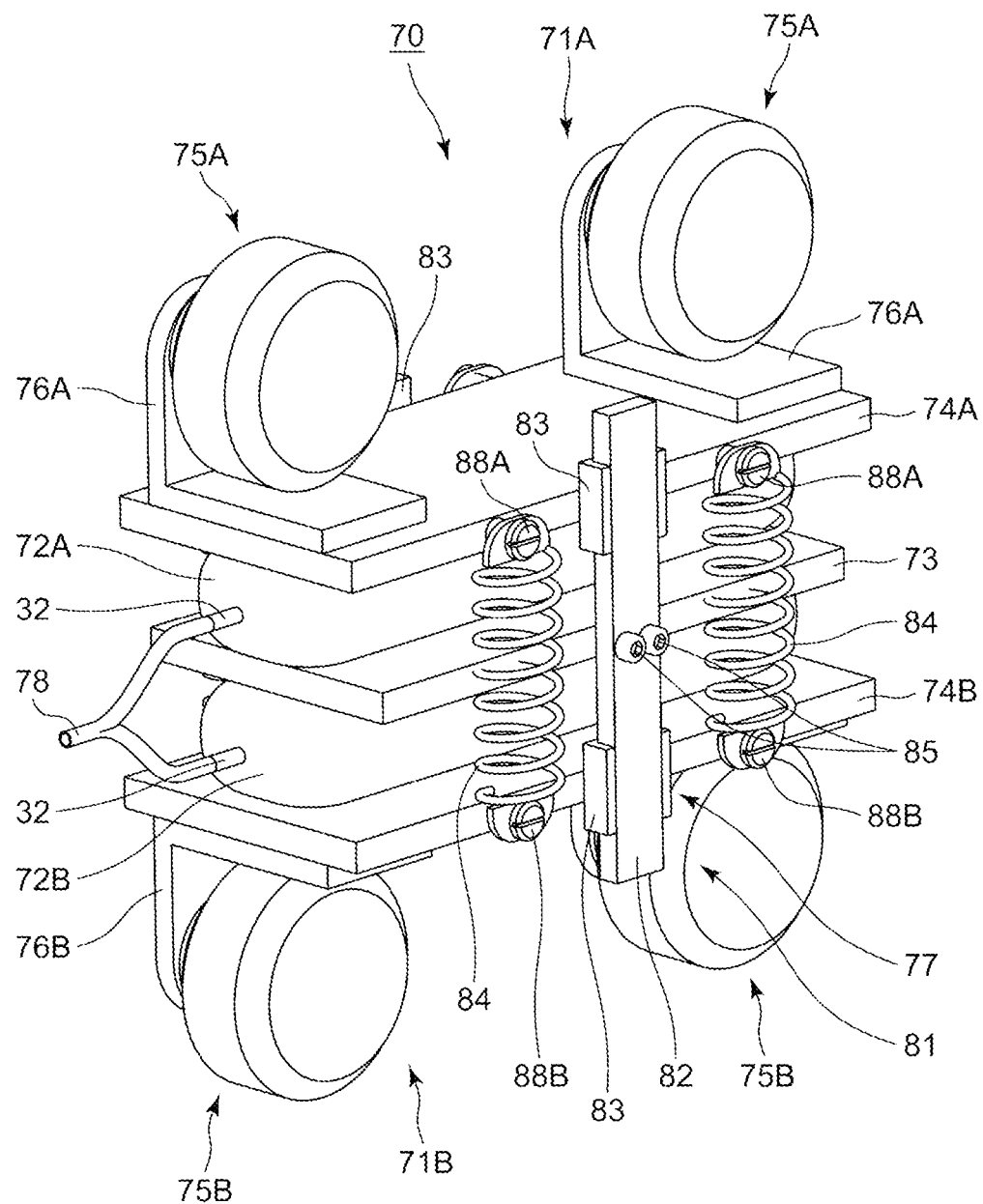
FIG. 26 is an exterior perspective view showing a fifth embodiment of an in-pipe moving apparatus according to the present invention.
Figure 27:
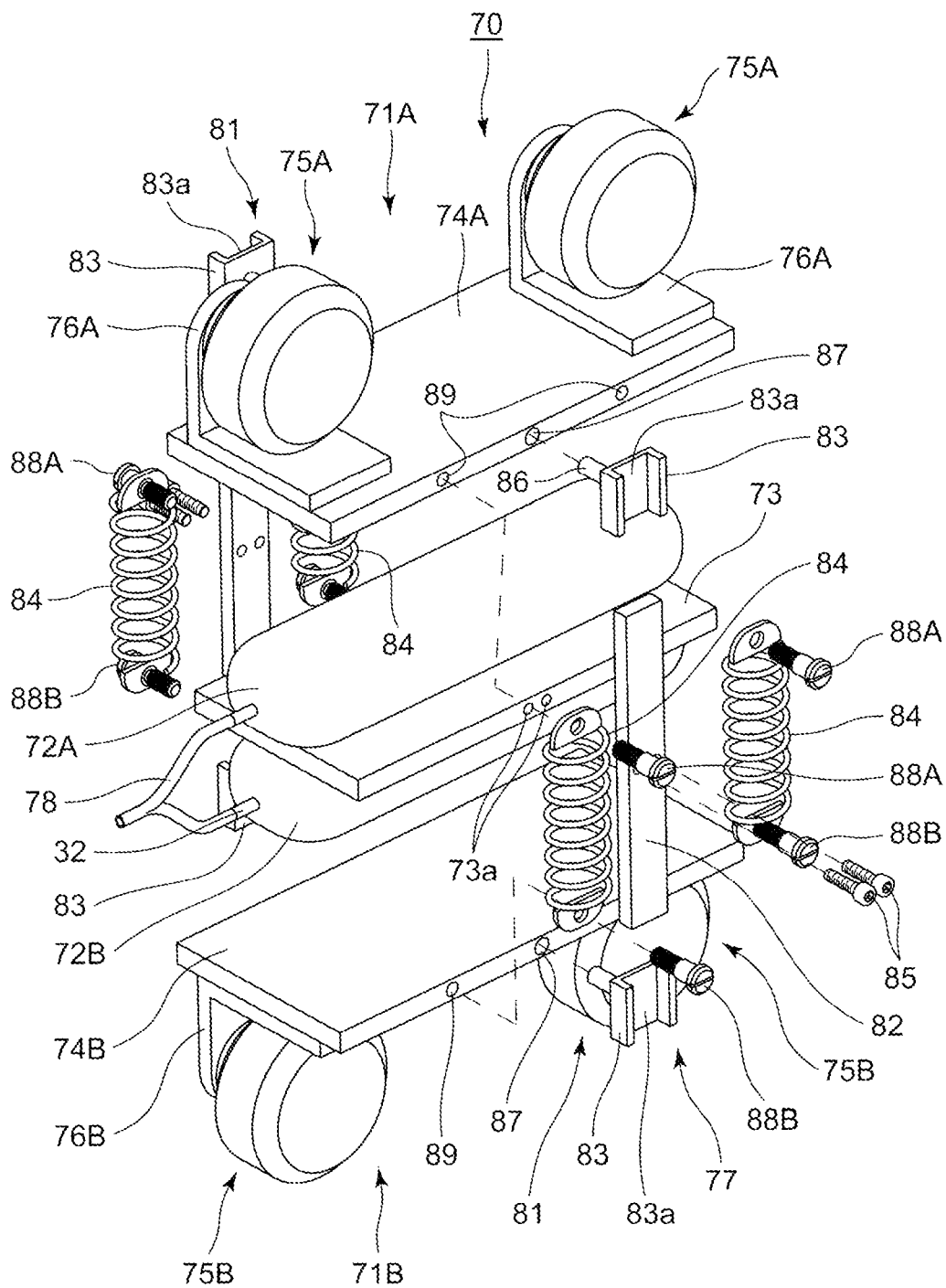
FIG. 27 is an exploded perspective view of the in-pipe moving apparatus according to the fifth embodiment of the present invention shown in FIG. 26.

An in-pipe moving apparatus 70 according to the fifth embodiment of the present invention includes two sets of wheel-based traveling elements 71A and 71B, two variable bags 72A and 72B, one central member 73, and a link sliding support mechanism 77, which shows a first embodiment of action restraint means for restraining the action of the two sets of wheel-based traveling elements 71A and 71B in the radial direction of the pipe, as shown in FIGS. 26 and 27.

The two sets of wheel-based traveling elements 71A and 71B are the same as the two sets of wheel-based traveling elements 41A and 41B shown in the second embodiment described above in terms of not only the exterior appearance but the configurations, functions, and other factors of base members 74A and 74B, driving wheels 75A and 75B, and support brackets 76A and 76B, which are the basic configurations of the wheel-based traveling elements, as shown in FIGS. 26 to 30. The two sets of wheel-based traveling elements 71A and 71B will not therefore be described in detail. Also in the fifth embodiment, two sets of crawler traveling elements, such as those described in the first embodiment, can, of course, be used in place of the two sets of wheel-based traveling elements 71A and 71B. Still instead, the wheel-based traveling elements 71A and 71B can, of course, be formed of omni-wheels.

The two variable bags 72A and 72B are each the same as that described in the first embodiment described above and will not therefore be described in detail. A Y-letter-shaped branching pipe 78 is provided, with the branch-side pipes connected to the two variable bags 72A and 72B, and the other-side end connected the pneumatic apparatus, which is not shown. A central member 73 is interposed between the two variable bags 72A and 72B. The central member 73 is formed of a plate-shaped member having the same shape and size as those of the base members 74A and 74B. The two sets of wheel-based traveling elements 71A and 71B are disposed on opposite sides of a unit formed by sandwiching the central member 73 between the two variable bags 72A and 72B. The link sliding support mechanism 77 is provided in association with the traveling element assembly.

The link sliding support mechanism 77 is formed of two sets of restrainers 81, 81 disposed on widthwise opposite sides of the traveling element assembly, and the restrainers 81, 81 are formed of the same members combined with one another and have the same structure. Each of the restrainers 81 includes a fixed link 82, which is formed of a single straight rod having a quadrangular cross-sectional shape, two sliding support members 83, which slidably support the fixed link 82, and two springs 84, and the components of the restrainer 81 are disposed in bilateral symmetry.

The fixed links 82 are placed on widthwise opposite sides of the central member 73 in longitudinally central positions thereon with the axial direction of the fixed links 82 extending in the direction perpendicular to the longitudinal direction, and a middle portion of each of the fixed links 82 is fixed to the central member 73 with fixing screws 85 screwed into threaded holes 73a. The attitude of the fixed links 82 changes integrally with that of the central member 73. The two sliding support members 83 slidably engage with axially opposite portions of each of the fixed links 82.

The sliding support members 83 each have a sliding groove 83a, into which the fixed link 82 fits and which has a recessed cross-sectional shape, and are each provided with a pivotal shaft 86, which protrudes toward the side opposite the side toward which the sliding groove 83a opens. Shaft receiving holes 87, which correspond to the pivotal shafts 86, are provided in the base member 74A of the first wheel-based traveling element 71A and the base member 74B of the second wheel-based traveling element 71B. The shaft receiving holes 87 open at the longitudinal centers of the widthwise opposite surfaces of the base members 74A and 74B. The two sliding support members 83 are pivotally attached to each of the base members 74A and 74B by inserting the pivotal shafts 86 into the shaft receiving holes 87 in the base members 74A and 74B.

The two springs 84 are disposed on opposite sides of each of the thus placed fixed links 82. The two springs 84 are so disposed as to be separate from the fixed link 82 by a predetermined distance and parallel to each other. One end of each of the springs 84 engages with and is fixed to a threaded hole 89 in the first base member 74A with an attachment screw 88A, and the other end of each of the springs 84 engages with and is fixed to a threaded hole 89 in the second base member 74B with an attachment screw 88B. The springs 84 are each installed in the form of a pulled spring, and the resultant spring force causes the two sets of wheel-based traveling elements 71A and 71B to keep pressing and holding the two variable bags 72A and 72B.

The in-pipe moving apparatus 70 having the configuration described above, which is provided with the link sliding support mechanism 77, can restrict the movement of the two sets of wheel-based traveling elements 71A and 71B in a predetermined radial direction of the pipe. Therefore, when the in-pipe moving apparatus 70 travels in a pipe, the two sets of driving wheels 75A and 75B, which are held in positions angularly displaced by 180 degrees, are always allowed to be in contact with positions angularly displaced by 180 degrees on the inner surface of the pipe (maximum inner diameter portions), whereby the in-pipe moving apparatus 70 can reliably and smoothly travel in the pipe.

Further, since the in-pipe moving apparatus 70 according to the embodiment has the configuration using the two variable bags 72A and 72B, the difference in width of the entire variable bags 72A and 72B between the contracted state and the expanded state can be increased. The large width difference provides the effect of providing an apparatus capable of handling a wide dimensional range of pipes from a small-diameter pipe having a small inner diameter to a large-diameter pipe having a large inner diameter. For example, in the case where one variable bag is used and the pipe has a large inner diameter, one driving wheel comes into contact with the inner surface of the pipe, but the other driving wheel does not reach the opposite inner surface of the pipe in some cases. Using the two variable bags allows the driving wheels on both sides to be simultaneously in contact with the inner surface of the pipe with the two sets of wheel-based traveling elements 71A and 71B unchanged.

The variable bags 72A and 72B have been described in the present embodiment with reference to the case where the variable bags each have an elliptical cross-sectional shape, but not necessarily, and may each have an oblong cross-sectional shape or a square cross-sectional shape or even an ∞-letter cross-sectional shape formed of two ellipses connected to each other or a cross-sectional shape formed of at least three contiguous ellipses. Further, in the in-pipe moving apparatus 70 according to the present embodiment, since the link sliding support mechanism 77 restricts the movement of the two sets of wheel-based traveling elements 71A and 71B in a fixed radial direction of the pipe, the cross-sectional shape of the variable bags 72A and 72B is not limited to those described above and can, for example, each be a trapezoidal shape, a diamond shape, a star shape, or any other arbitrary shape.

Even in the case where scale extending on part of the inner surface of the pipe or in the circumferential direction thereof develops, the in-pipe moving apparatus 70 according to the embodiment can travel over the scale and move in the pipe. For example, in a case where scale is present in front of the front driving wheel 75B of the second wheel-based traveling element 71B of the in-pipe moving apparatus 70 travelling in the pipe, and when the front driving wheel 75B travels on to the scale, pressing force resulting from reaction force from the scale acts from the front driving wheel 75B via the front support bracket 76B and the second base member 74B to a front end portion of the second variable bag 72B from below to above in FIG. 28.

At this point, the second base member 74B, on which the front driving wheel 75B is mounted, is pivotably supported by the lower sliding support members 83, which each include the pivotal shaft 86, on the fixed links 82 of the link sliding support mechanism 77. Similarly, the first base member 74A, on which the front driving wheel 75A is mounted, is pivotably supported by the upper sliding support members 83, which each include the pivotal shaft 86, on the fixed links 82 of the link sliding support mechanism 77. The fixed links 82 are fixed to the central member 73 with the fixing screws 85, and the sliding support members 83 engage with and are supported by the longitudinally opposite surfaces of the fixed links 82, which extend in the direction perpendicular to the longitudinal direction of the central member 73.

Figure 28:
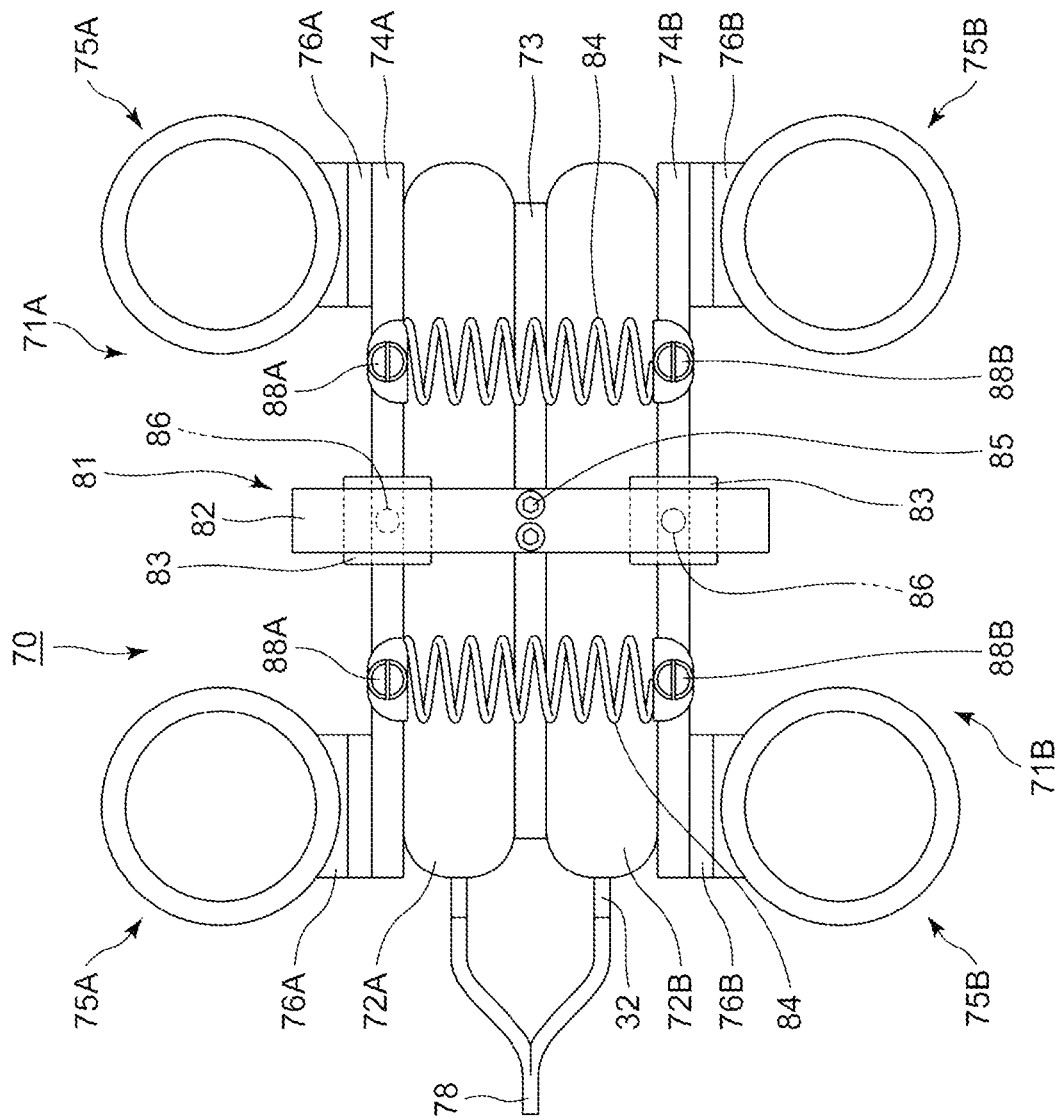
FIG. 28 is a side view showing the in-pipe moving apparatus according to the fifth embodiment shown in FIG. 26 in a state in which two variable bags are expanded.
Figure 29:
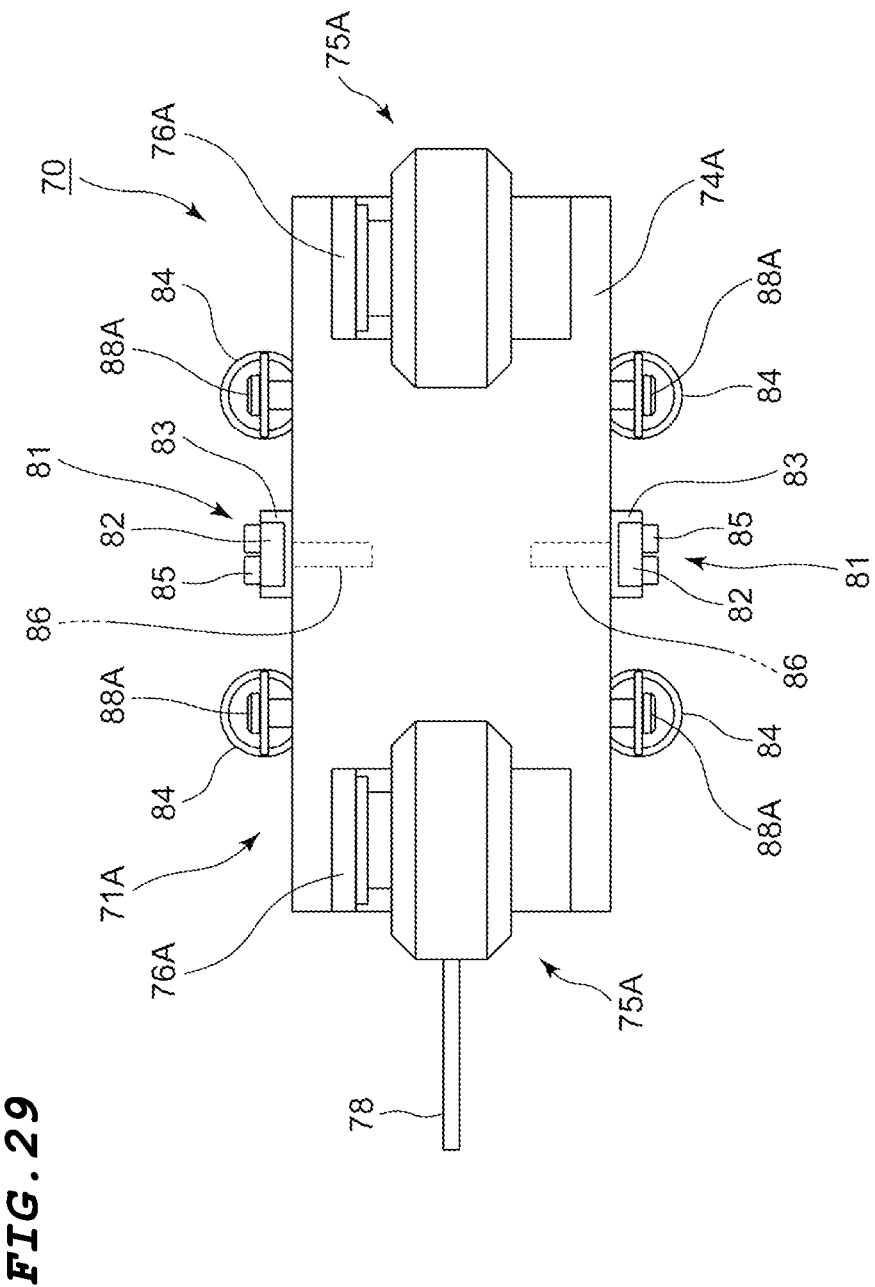
FIG. 29 is a plan view of the in-pipe moving apparatus according to the fifth embodiment shown in FIG. 26.
Figure 30:
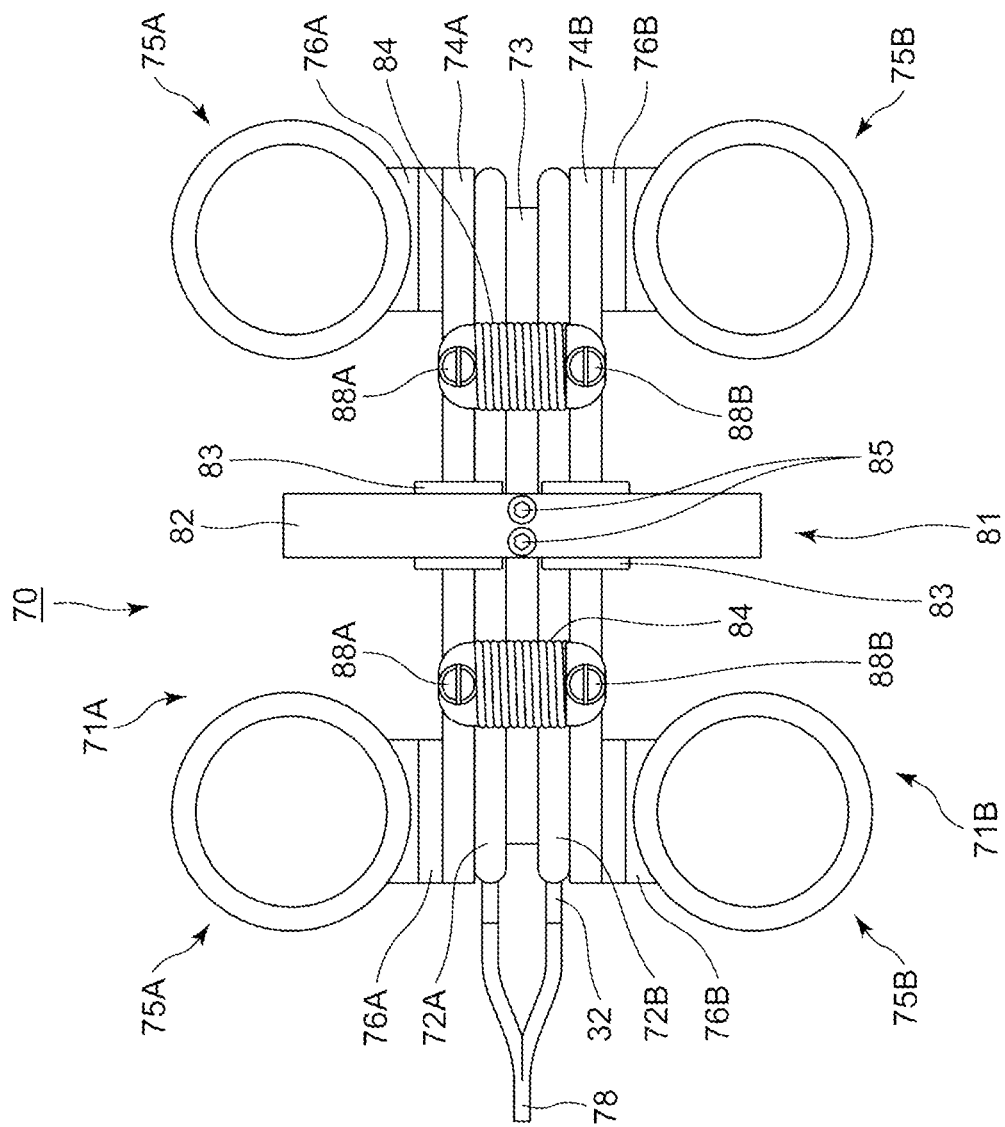
FIG. 30 is a side view showing the in-pipe moving apparatus according to the fifth embodiment shown in FIG. 26 in a state in which the two variable bags are contracted.
Figure 31:
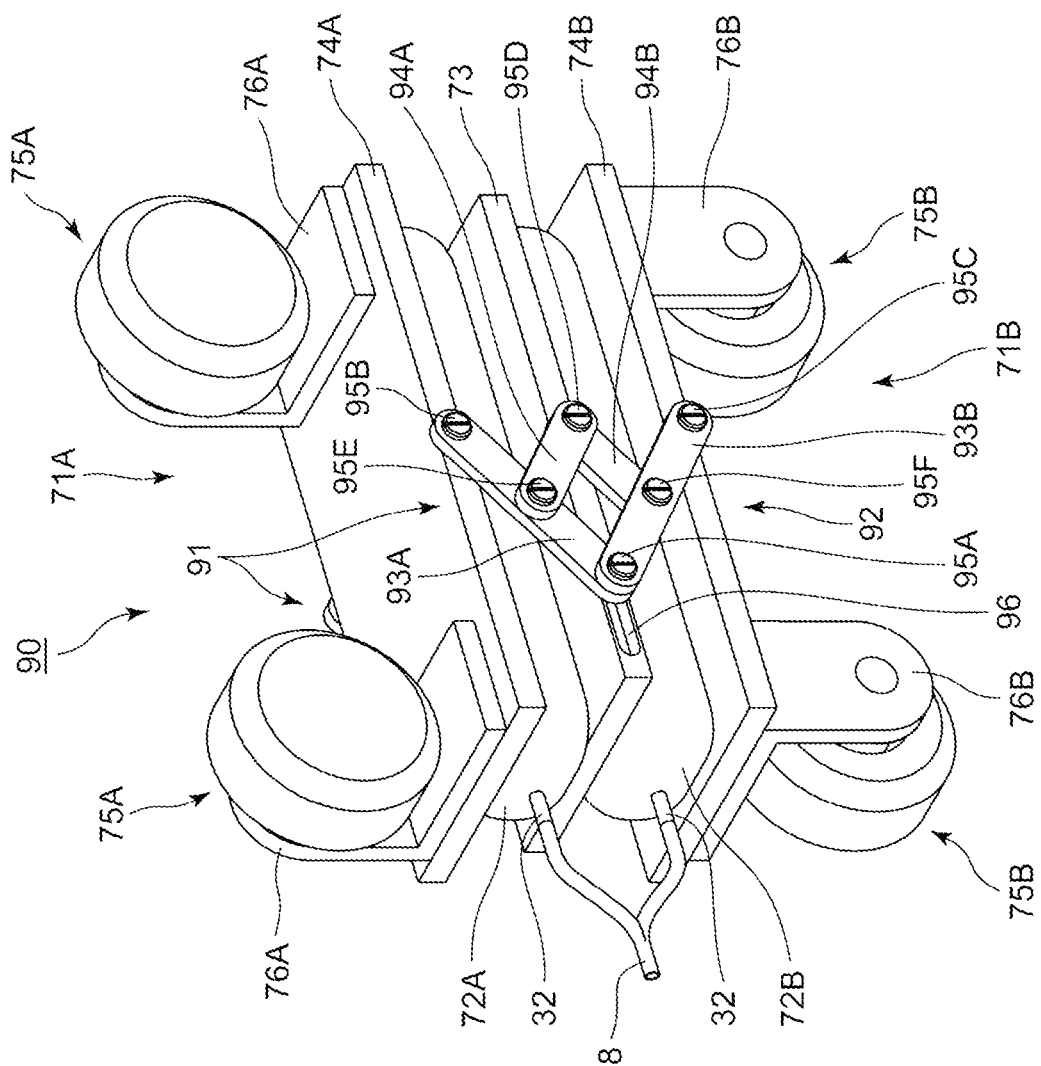
FIG. 31 is an exterior perspective view showing a sixth embodiment of an in-pipe moving apparatus according to the present invention.

As a result, the second base member 74B pivots counterclockwise around the pivotal shafts 86 in FIG. 28. Therefore, a portion of the second variable bag 72B that is a portion thereof on the forward side in the traveling direction is compressed, whereas a portion of the second variable bag 72B that is a portion thereof on the backward side in the traveling direction is expanded. A front portion of the first variable bag 72A receives pressure from the front portion of the second variable bag 72B via the central member 73. As a result, a portion of the first variable bag 72A that is a portion thereof on the forward side in the traveling direction is compressed, whereas a portion of the first variable bag 72A that is a portion thereof on the backward side in the traveling direction is expanded.

Following the elastic deformation of the first variable bag 72A and the second variable bag 72B, the front driving wheel 75B travels over the scale. Once the front driving wheel 75B travels over the scale, the second base member 74B swings downward and moves away from the second variable bag 72B, and the central member 73 swings downward and moves away from the first variable bag 72A.

As a result, the first variable bag 72A and the second variable bag 72B return to the initial state, and the initial traveling state in which the central member 73 and the second base member 74B are parallel to the first base member 74A is restored. The action of traveling over the scale in this case also applies to the front driving wheel 75A of the first wheel-based traveling element 71A and to the rear driving wheel 75A of the first wheel-based traveling element 71A and the rear driving wheel 75B of the second wheel-based traveling element 71B.

For example, in a case where any one or more of the driving wheels 75A and 75B of the in-pipe moving apparatus 70 fail and the in-pipe moving apparatus 70 is therefore unable to move, for example in a straight or curved portion of the pipe, the air pressure in the variable bags 72A and 72B is released to the outside, for example, by stopping the supply of the air pressure from the pneumatic apparatus and opening a check valve. Depressurizing the interiors of the variable bags 72A and 72B to change the expanded state of the variable bags 72A and 72B shown in FIG. 28 to the contracted state of the variable bags 72A and 72B shown in FIG. 30 allows reduction in the height (length) of the link sliding support mechanism 77 of the in-pipe moving apparatus 70 in the movement restriction direction. One or more of the driving wheels 75A or 75B of at least the wheel-based traveling element 71A (or 1B) out of the two sets of wheel-based traveling elements 71A and 71B can therefore be separate from the inner surface of the pipe.

As a result, the state in which the in-pipe moving apparatus 70 is stuck in the pipe is eliminated, whereby the force that holds the in-pipe moving apparatus 70 in the pipe is reduced or eliminated. The towing member, which is not shown, is then pulled via an opening of the pipe, whereby the in-pipe moving apparatus 70 stuck in the pipe can be readily taken out of the pipe. The same holds true for a case where the in-pipe moving apparatus 60 passes through a stepped portion of a pipe, a recessed portion of a joint between pipes, a portion where the diameter of a pipe changes to a larger or smaller value, or any other portion of a pipe.

FIGS. 31 to 34 describe a sixth embodiment of an in-pipe moving apparatus according to the present invention.

An in-pipe moving apparatus 90 according to the sixth embodiment of the present invention includes two sets of wheel-based traveling elements 71A and 71B, two variable bags 72A and 72B, one central member 73, and a pantograph mechanism 91, which shows a second embodiment of the action restraint means for restraining the action of the two sets of wheel-based traveling elements 71A and 71B in the radial direction of the pipe, as shown in FIGS. 31 to 34.

The two sets of wheel-based traveling elements 71A and 71B and the two variable bags 72A and 72B are the same as those shown in the fifth embodiment described above in terms of not only the exterior appearance but the configurations, functions, and other factors of the base members 74A and 74B, the driving wheels 75A and 75B, and the support brackets 76A and 76B, which are the basic configurations of the wheel-based traveling elements, as shown in FIGS. 31 to 34. The two sets of wheel-based traveling elements 71A and 71B, the two variable bags 72A and 72B, and the center member 73 will not therefore be described in detail. Also in the sixth embodiment, two sets of crawler traveling elements, such as those described in the first embodiment, can, of course, be used in place of the two sets of wheel-based traveling elements 71A and 71B.

Figure 32:
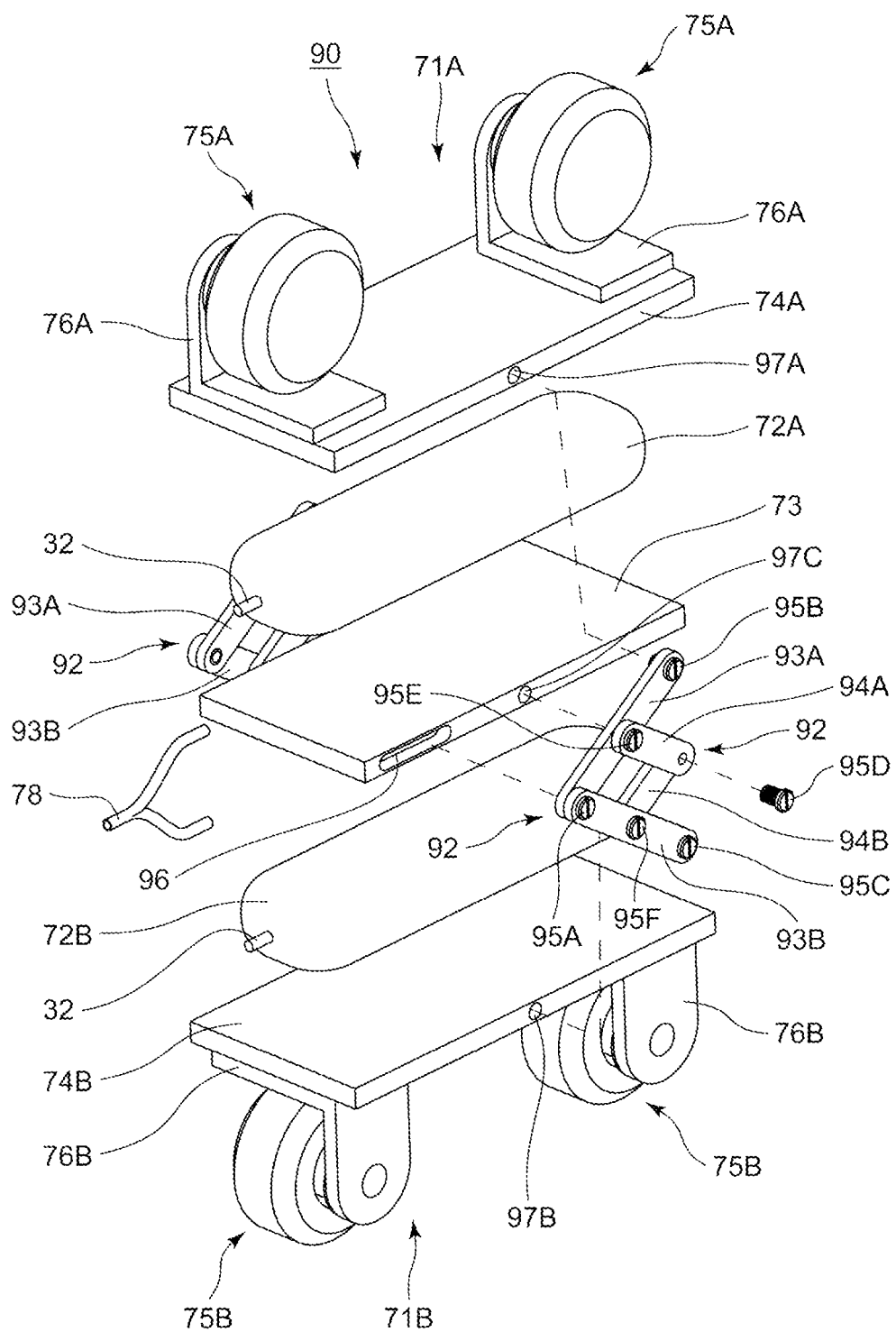
FIG. 32 is an exploded perspective view of the in-pipe moving apparatus according to the sixth embodiment of the present invention shown in FIG. 31.

The central member 73 is the same as the central member 73 shown in the fifth embodiment described above in terms of exterior appearance but differs therefrom in that elongated grooves 96 and attachment holes 97C are provided in widthwise opposite side surfaces of the central member 73, as shown in FIG. 32 and other figures. The attachment holes 97C are each a portion that serves as a center position where interlockers 92A and 92B are disposed, and the interlockers 92A and 92B can operate around a fourth linkage pin 95D, which is screwed into the attachment hole 97C.

The pantograph mechanism 91 is formed of two sets of interlockers 92, 92 disposed on widthwise opposite sides of the traveling element assembly, and the interlockers 92, 92 are formed of the combination of the same members and have the same structure. The interlockers 92 are each formed of the combination of four link members including two long links 93A and 93B and two short links 94A and 94B, and the length of the long links 93A and 93B are so set as to be substantially twice the length of the short links 94A and 94B.

The four links 93A, 93B, 94A, and 94B are pivotably linked with each other via linkage pins. That is, one-side ends of the two long links 93A and 93B are linked to each other via a first linkage pin 95A, and the first linkage pin 95A slidably engages with the elongated groove 96 provided in a side surface of the central member 73. The other end of the first long link 93A, out of the two long links 93A and 93B, is pivotably supported by a second linkage pin 95B, which fits into an attachment hole 97A provided in a side surface of the first base member 74A, on the first base member 74A. The other end of the second long link 93B is pivotably supported by a third linkage pin 95C, which fits into an attachment hole 97A provided in a side surface of the second base member 74B, on the second base member 74B.

One-side ends of the two short links 94A and 94B are linked to each other via the fourth linkage pin 95D, and the fourth linkage pin 95D fits into the attachment hole 97C provided in a side surface of the central member 73. The other end of the first short link 94A, out of the two short links 94A and 94B, is pivotably linked via a fifth linkage pin 95E to a longitudinally middle portion of the first long link 93A. The other end of the second short link 94B is pivotably linked via fifth linkage pin 95F to a longitudinally middle portion of the second long link 93B.

The position where the second linkage pin 95B is attached, the position where the third linkage pin 95C is attached, and the position where the fourth linkage pin 95D is attached are so set as to align with one another along the same line. The straight line that connects the fourth linkage pin 95D to the elongated groove 96 is so set as to be perpendicular to the straight line that links the positions where the three linkage pins 95b, 95C, and 95D are attached to each other. The pantograph mechanism 91 having the configuration described above can translate the two sets of wheel-based traveling elements 71A and 71B in accordance with the magnitude of the internal pressure in the two variable bags 72A and 72B to change the distance between the two base members 74A and 74B to a value ranging from a large value to a small value.

According to the in-pipe moving apparatus 90 including the pantograph mechanism 91 having the configuration described above, providing the pantograph mechanism 91 allows restriction of the movement of the two sets of wheel-based traveling elements 71A and 71B in a predetermined radial direction of the pipe. Therefore, when the in-pipe moving apparatus 90 travels in a pipe, the two sets of driving wheels 75A and 75B, which are held in positions angularly displaced by 180 degrees, are always allowed to be in contact with positions angularly displaced by 180 degrees on the inner surface of the pipe (maximum inner diameter portions), whereby the in-pipe moving apparatus 90 can reliably and smoothly travel in the pipe.

That is, the one-side ends of the two short links 94A and 94B, which serve as the center of the action of the pantograph mechanism 91, are layered on each other and pivotably supported by the linkage pins 95D at the center of the side surfaces of the central members 73, and the other-side ends of the short links 94A and 94B are pivotably linked by the linkage pins 95E and 95F to the central portions of the two long links 93A and 93B. Further, the one-side ends of the two long links 93A and 93B are layered on each other and slidably engage with the elongated grooves 96 provided in the central member 73. The other-side end of the long link 93A, which is one of the long links, is pivotably supported by the linkage pin 95B on the first base member 74A, and the other-side end of the long link 93B, which is the other one of the long links, is pivotably supported by the linkage pin 95C on the second base member 74B.

The pantograph mechanism 91 therefore opens and closes in accordance with the position of the first linkage pin 95A, and when the first linkage pin 95A moves in the direction in which it moves away from the fourth linkage pin 95D, the second linkage pin 95B and the third linkage pin 95C move in the direction in which they approach the fourth linkage pin 95D. As a result, the distance from the first base member 74A and the second base member 74B to the central member 73 decreases. In contrast, when the first linkage pin 95A moves in the direction in which it approaches the fourth linkage pin 95D, the second linkage pin 95B and the third linkage pin 95C move in the direction in which they move away from the fourth linkage pin 95D. As a result, the distance from the first base member 74A and the second base member 74B to the central member 73 increases.

Even in the case where scale extending on part of the inner surface of the pipe or in the circumferential direction thereof develops, the in-pipe moving apparatus 90 according to the embodiment can travel over the scale and move in the pipe. For example, in a case where scale is present in front of the front driving wheel 75B of the second wheel-based traveling element 71B of the in-pipe moving apparatus 90 travelling in the pipe, and when the front driving wheel 75B travels on to the scale, pressing force resulting from reaction force from the scale acts from the front driving wheel 75B via the front support bracket 76B and the second base member 74B to a front end portion of the second variable bag 72B from below to above in FIG. 33.

Figure 33:
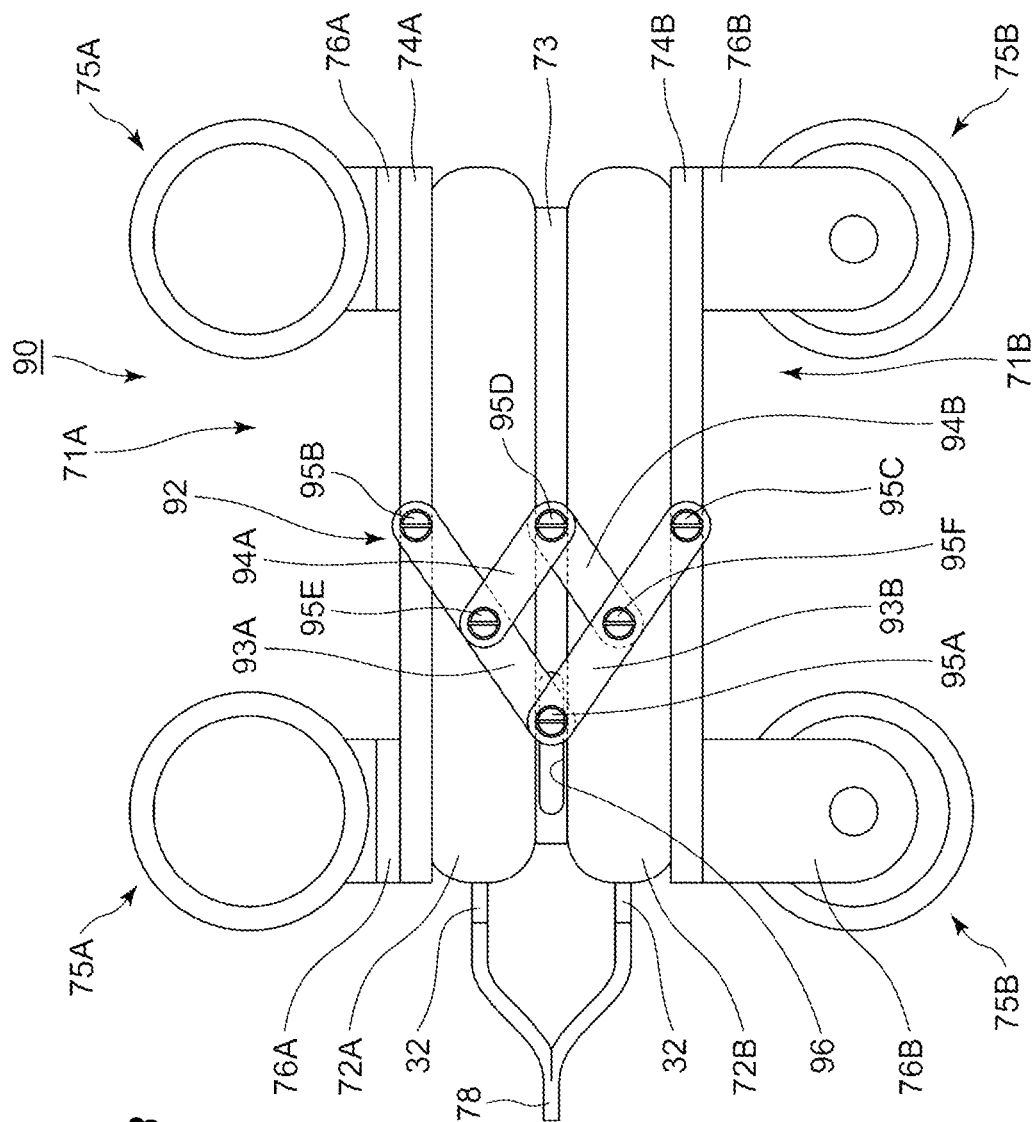
FIG. 33 is a side view showing the in-pipe moving apparatus according to the sixth embodiment shown in FIG. 31 in a state in which two variable bags are expanded.
Figure 34:
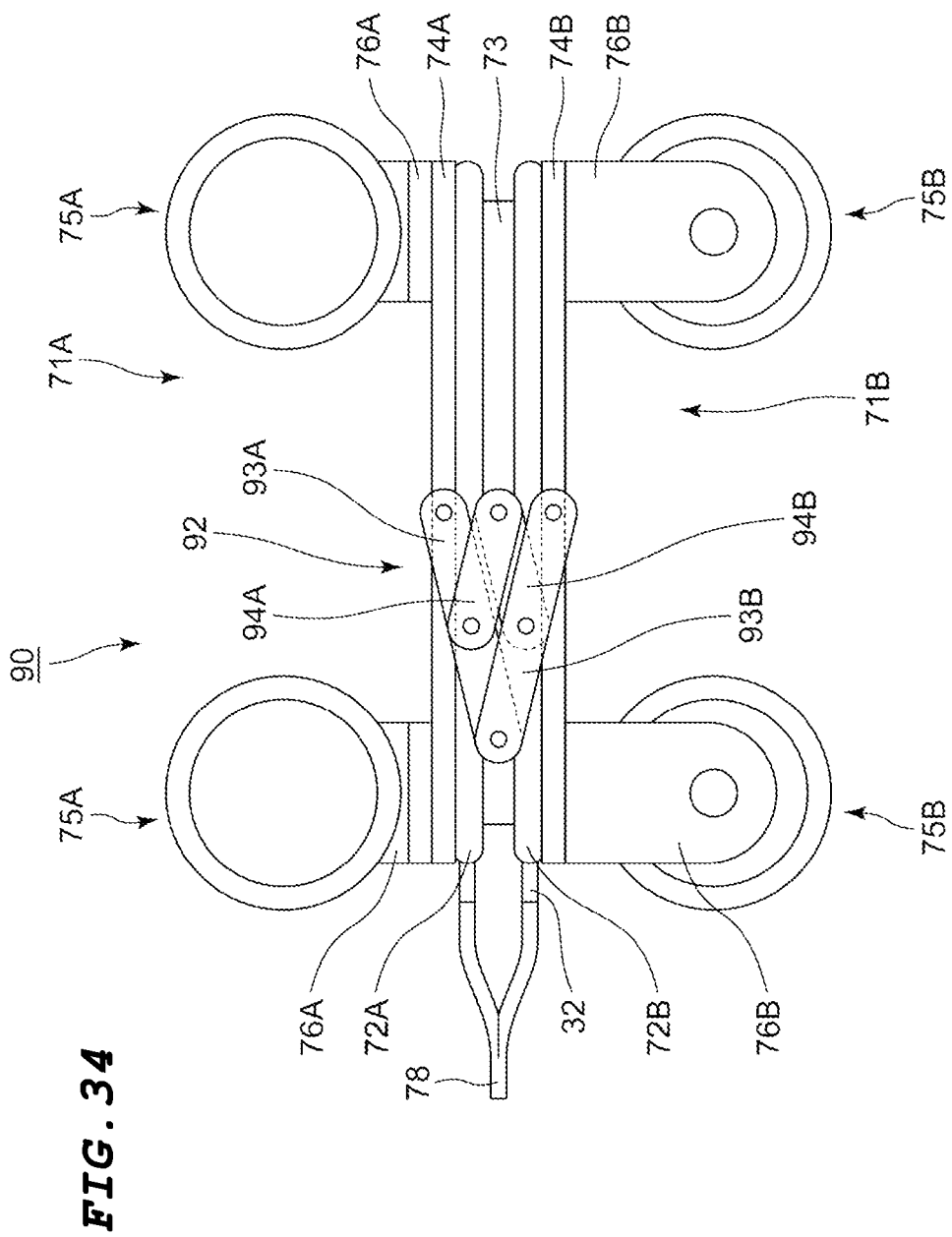
FIG. 34 is a side view showing the in-pipe moving apparatus according to the sixth embodiment shown in FIG. 31 in a state in which two variable bags are contracted.
Figure 35:
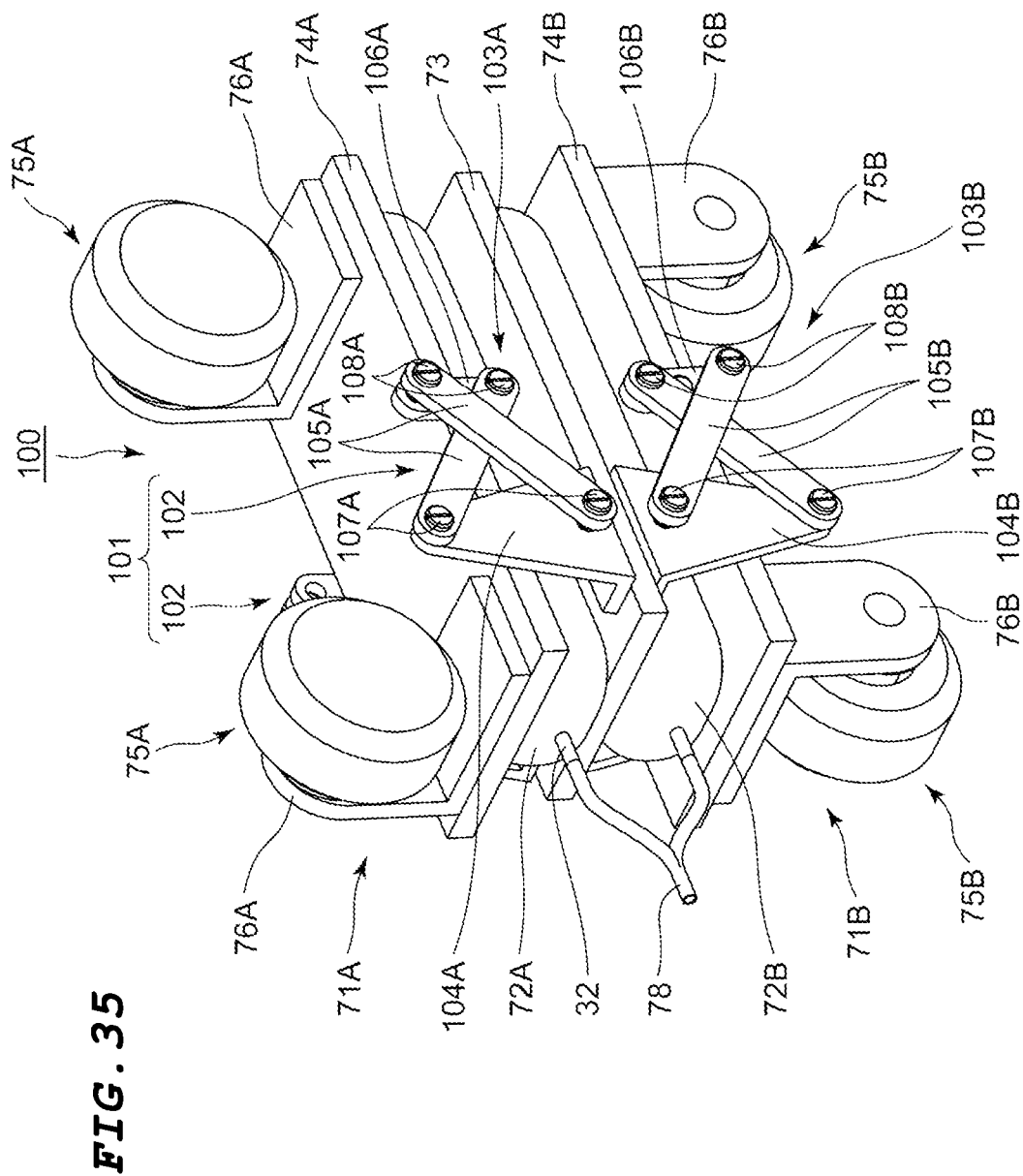
FIG. 35 is an exterior perspective view showing a seventh embodiment of an in-pipe moving apparatus according to the present invention.
Figure 36:
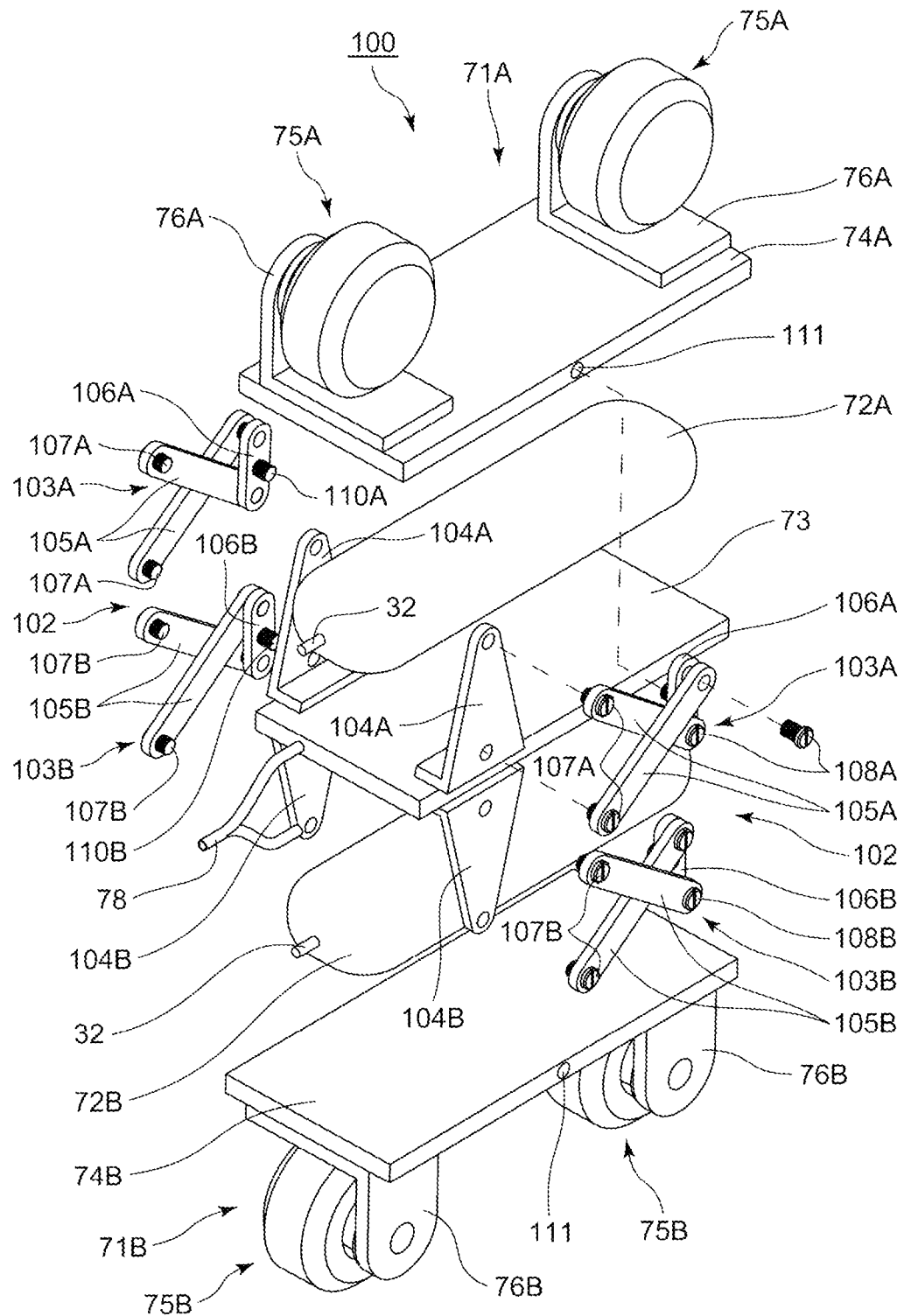
FIG. 36 is an exploded perspective view of the in-pipe moving apparatus according to the seventh embodiment of the present invention shown in FIG. 35.
Figure 37:
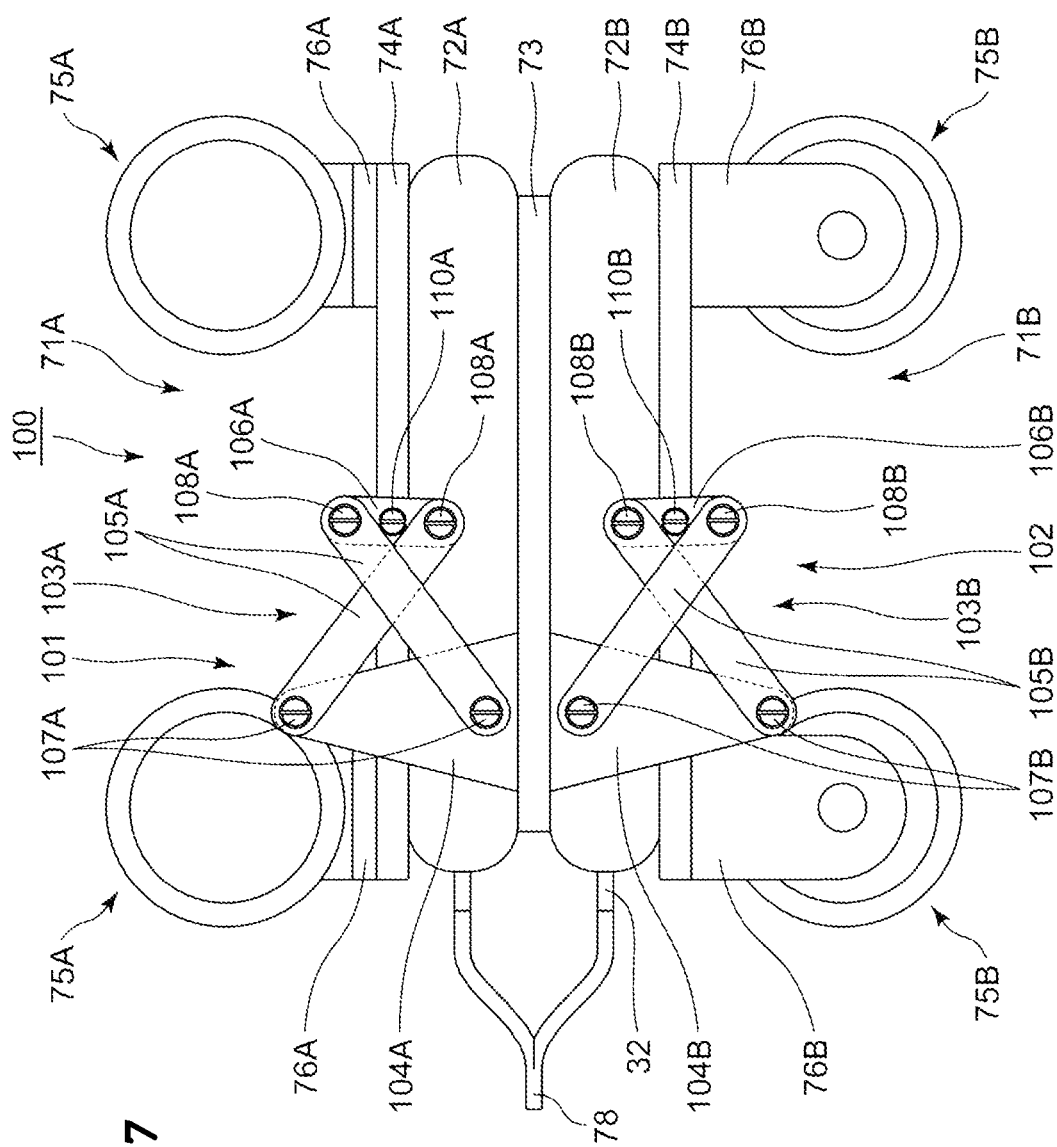
FIG. 37 is a side view showing the in-pipe moving apparatus according to the seventh embodiment shown in FIG. 35 in a state in which two variable bags are expanded.
Figure 38:
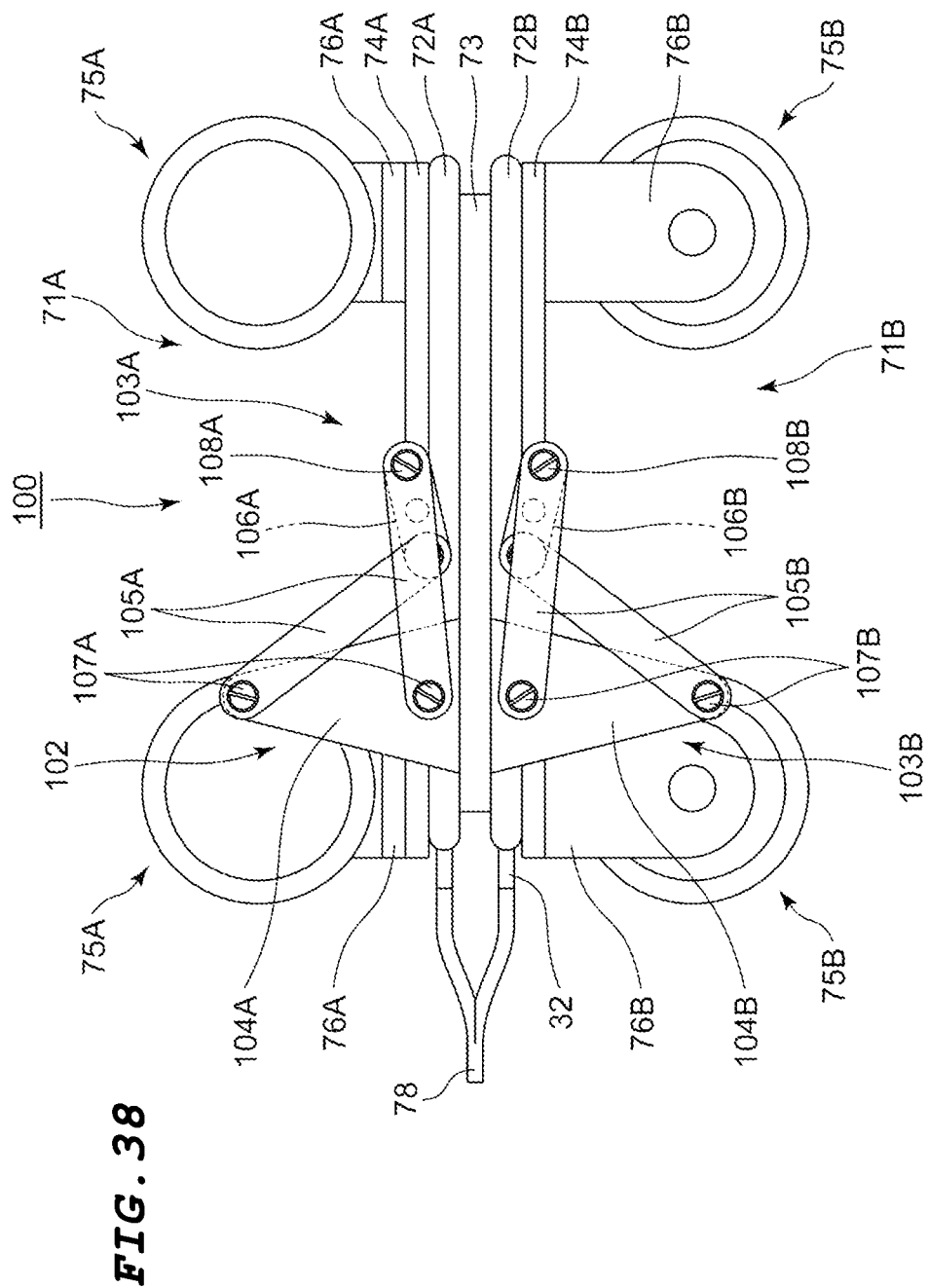
FIG. 38 is a side view showing the in-pipe moving apparatus according to the seventh embodiment shown in FIG. 35 in a state in which two variable bags are contracted.

A portion of the second base member 74B that is a portion thereof on the forward side in the traveling direction therefore presses a portion of the second variable bag 72B that is a portion thereof on the backward side in the traveling direction in FIG. 33. Thereafter, a portion of the second variable bag 72B that is a portion thereof on the forward side in the traveling direction is compressed, whereas a portion of the second variable bag 72B that is a portion thereof on the backward side in the traveling direction is expanded. A front portion of the first variable bag 72A receives pressure from the front portion of the second variable bag 72B via the central member 73. As a result, a portion of the first variable bag 72A that is a portion thereof on the forward side in the traveling direction is compressed, whereas a portion of the first variable bag 72A that is a portion thereof on the backward side in the traveling direction is expanded.

Following the elastic deformation of the first variable bag 72A and the second variable bag 72B, the front driving wheel 75B travels over the scale. Once the front driving wheel 75B travels over the scale, the second base member 74B swings downward and moves away from the second variable bag 72B, and the central member 73 swings downward and moves away from the first variable bag 72A. As a result, the first variable bag 72A and the second variable bag 72B return to the initial state, and the initial traveling state in which the central member 73 and the second base member 74B are parallel to the first base member 74A is restored. The action of traveling over the scale in this case also applies to the front driving wheel 75A of the first wheel-based traveling element 71A and to the rear driving wheel 75A of the first wheel-based traveling element 71A and the rear driving wheel 75B of the second wheel-based traveling element 71B.

For example, in a case where any one or more of the driving wheels 75A and 75B of the in-pipe moving apparatus 90 fail and the in-pipe moving apparatus 90 is therefore unable to move, for example in a straight or curved portion of the pipe, the air pressure in the variable bags 72A and 72B is released to the outside, for example, by stopping the supply of the air pressure from the pneumatic apparatus and opening a check valve. Depressurizing the interiors of the variable bags 72A and 72B to change the expanded state of the variable bags 72A and 72B shown in FIG. 33 to the contracted state of the variable bags 72A and 72B shown in FIG. 34 allows reduction in the height (length) of the pantograph mechanism 91 of the in-pipe moving apparatus 90 in the movement restriction direction. One or more of the driving wheels 75A or 75B of at least the wheel-based traveling element 71A (or 1B) out of the two sets of wheel-based traveling elements 71A and 71B can therefore be separate from the inner surface of the pipe.

As a result, the state in which the in-pipe moving apparatus 90 is stuck in the pipe is eliminated, whereby the force that holds the in-pipe moving apparatus 90 in the pipe is reduced or eliminated. The towing member, which is not shown, is then pulled via an opening of the pipe, whereby the in-pipe moving apparatus 90 stuck in the pipe can be readily taken out of the pipe.

Further, the in-pipe moving apparatus 90 according to the embodiment, which uses the two variable bags 72A and 72B, is advantageous in that it can readily handle a pipe having a large inner diameter. That is, in the case where one variable bag is used and the pipe has a large inner diameter, one driving wheel comes into contact with the inner surface of the pipe, but the other driving wheel does not reach the opposite inner surface of the pipe in some cases. Using the two variable bags allows the driving wheels on both sides to be simultaneously in contact with the inner surface of the pipe with the two sets of wheel-based traveling elements 71A and 71B unchanged.

The variable bags 72A and 72B preferably each have an elliptical, oblong, or square cross-sectional shape in the direction perpendicular to the longitudinal direction thereof, but not necessarily, and may each have a trapezoidal, diamond, star or any other cross-sectional shape.

The same holds true for a case where the in-pipe moving apparatus 60 passes through a stepped portion of a pipe, a recessed portion of a joint between pipes, a portion where the diameter of a pipe changes to a larger or smaller value, or any other portion of a pipe.

FIGS. 35 to 38 describe a seventh embodiment of an in-pipe moving apparatus according to the present invention.

An in-pipe moving apparatus 100 according to the seventh embodiment of the present invention includes two sets of wheel-based traveling elements 71A and 71B, two variable bags 72A and 72B, one central member 73, and a crank-link mechanism 101, which shows a third embodiment of the action restraint means for restraining the action of the two sets of wheel-based traveling elements 71A and 71B in the radial direction of the pipe, as shown in FIGS. 35 to 38.

The two sets of wheel-based traveling elements 71A and 71B, the two variable bags 72A and 72B, and the central member 73 are the same as those shown in the fifth embodiment described above in terms of not only the exterior appearance but the configurations, functions, and other factors of the base members 74A and 74B, the driving wheels 75A and 75B, and the support brackets 76A and 76B, which are the basic configurations of the wheel-based traveling elements, as shown in FIGS. 35 to 38. The two sets of wheel-based traveling elements 71A and 71B, the two variable bags 72A and 72B, and the center member 73 will not therefore be described in detail. Also in the seventh embodiment, two sets of crawler traveling elements, such as those described in the first embodiment, can, of course, be used in place of the two sets of wheel-based traveling elements 71A and 71B.

The crank-link mechanism 101 is formed of two sets of interlockers 102, 102 disposed on widthwise opposite sides of the traveling element assembly, and the interlockers 102, 102 are formed of the combination of the same members and have the same structure. The interlockers 102 are each formed of a first link section 103A provided between the central member 73 and the first base member 74A and a second link section 103B provided between the central member 73 and the second base member 74B.

The link section 103A is formed of the combination of three link members, which are formed of two intersecting links 105A and one pivotal link 106A, and a support bracket 104A, which supports the two intersecting links 105A. The link section 103B is formed of the combination of three link members, which are formed of two intersecting links 105B and one pivotal link 106B, and a support bracket 104B which supports the two intersecting links 105B. The number of support brackets 104A and 104B is four in total. The four support brackets 104A and 104B are so disposed on one longitudinal side of the central member 73 and opposite widthwise sides that the two support brackets 104A vertically ascends from one flat surface of the central member 73 and the two support brackets 104B vertically descends from the other flat surface of the central member 73. The support brackets 104A and 104B can be fixed, for example, by using screw fastening using fixing screws, adhesion based on welding, bonding using an adhesive, and a variety of other means.

The two intersecting links 105A and 105B are pivotably supported by attachment screws 107A and 107B on the support brackets 104A and 104B, respectively, with predetermined distances between the two intersecting links 105A and between the two intersecting links 105B. Further, the two intersecting links 105A intersect each other at longitudinally intermediate portions thereof, and so do the two intersecting links 105B, and one end of the pivotal link 106A (or 106B) is pivotably linked to the front end of one of the intersecting links 105A (or 105B) with an attachment screw 108A. The front end of the other intersecting link 105A (or 105B) is pivotably linked to the other end of the pivotal link 106A (or 106B) with an attachment screw 108A. Pivotal screws 110A and 110B pass through longitudinal intermediate portions of the pivotal links 106A and 10B, respectively, and the pivotal screws 110A and 110B are screwed into threaded holes 111 provided in the side surfaces of the base members 74A and 74B.

The first link section 103A of each of the two sets of interlockers 102 is therefore so bridged over the space between the first wheel-based traveling element 71A and the central member 73 that the attitude of the first link section 103A is changeable. The second link section 103B of each of the two sets of interlockers 102 is then so bridged over the space between the second wheel-based traveling element 71B and the central member 73 that the attitude of the second link section 103B is changeable.

According to the in-pipe moving apparatus 100 including the crank-link mechanism 101 having the configuration described above, providing the crank-link mechanism 101 allows restriction of the movement of the two sets of wheel-based traveling elements 71A and 71B in a predetermined radial direction of the pipe. Therefore, when the in-pipe moving apparatus 100 travels in a pipe, the two sets of driving wheels 75A and 75B, which are held in positions angularly displaced by 180 degrees, are always allowed to be in contact with positions angularly displaced by 180 degrees on the inner surface of the pipe (maximum inner diameter portions), whereby the in-pipe moving apparatus 100 can reliably and smoothly travel in the pipe. The variable bags 72A and 72B preferably each have an elliptical, oblong, or square cross-sectional shape in the direction perpendicular to the longitudinal direction thereof, but not necessarily, and may each, of course, have a trapezoidal, diamond, star or any other cross-sectional shape.

Even in the case where scale extending on part of the inner surface of the pipe or in the circumferential direction thereof develops, the in-pipe moving apparatus 100 according to the embodiment can travel over the scale and move in the pipe. For example, in a case where scale is present in front of the front driving wheel 75B of the second wheel-based traveling element 71B of the in-pipe moving apparatus 100 travelling in the pipe, and when the front driving wheel 75B travels on to the scale, pressing force resulting from reaction force from the scale acts from the front driving wheel 75B via the front support bracket 76B and the second base member 74B to a front end portion of the second variable bag 72B from below to above in FIG. 37.

Therefore, a portion of the second variable bag 72B that is a portion thereof on the forward side in the traveling direction is compressed, whereas a portion of the second variable bag 72B that is a portion thereof on the backward side in the traveling direction is expanded. A front portion of the first variable bag 72A receives pressure from the front portion of the second variable bag 72B via the central member 73. As a result, a portion of the first variable bag 72A that is a portion thereof on the forward side in the traveling direction is compressed, whereas a portion of the first variable bag 72A that is a portion thereof on the backward side in the traveling direction is expanded. Following the elastic deformation of the first variable bag 72A and the second variable bag 72B, the front driving wheel 75B travels over the scale.

Once the front driving wheel 75B travels over the scale, the portion of the second base member 74B that is the portion thereof on the forward side in the traveling direction swings downward and moves away from the front end side of the second variable bag 72B, and the central member 73 swings downward and moves away from the first variable bag 72A.

As a result, the first variable bag 72A and the second variable bag 72B return to the initial state, and the initial traveling state in which the central member 73 and the second base member 74B are parallel to the first base member 74A is restored. The action of traveling over the scale in this case also applies to the front driving wheel 75A of the first wheel-based traveling element 71A and to the rear driving wheel 75A of the first wheel-based traveling element 71A and the rear driving wheel 75B of the second wheel-based traveling element 71B.

For example, in a case where any one or more of the driving wheels 75A and 75B of the in-pipe moving apparatus 100 fail and the in-pipe moving apparatus 100 is therefore unable to move, for example in a straight or curved portion of the pipe, the air pressure in the variable bags 72A and 72B is released to the outside, for example, by stopping the supply of the air pressure from the pneumatic apparatus and opening a check valve. Depressurizing the interiors of the variable bags 72A and 72B to change the expanded state of the variable bags 72A and 72B shown in FIG. 37 to the contracted state of the variable bags 72A and 72B shown in FIG. 38 allows reduction in the height (length) of the crank-link mechanism 101 of the in-pipe moving apparatus 100 in the movement restriction direction. One or more of the driving wheels 75A or 75B of at least the wheel-based traveling element 71A (or 1B) out of the two sets of wheel-based traveling elements 71A and 71B can therefore be separate from the inner surface of the pipe.

As a result, the state in which the in-pipe moving apparatus 100 is stuck in the pipe is eliminated, whereby the force that holds the in-pipe moving apparatus 100 in the pipe is reduced or eliminated. The towing member, which is not shown, is then pulled via an opening of the pipe, whereby the in-pipe moving apparatus 100 stuck in the pipe can be readily taken out of the pipe.

Further, the in-pipe moving apparatus 100 according to the embodiment, which uses the two variable bags 72A and 72B, is advantageous in that it can readily handle a pipe having a large inner diameter. That is, in the case where one variable bag is used and the pipe has a large inner diameter, one driving wheel comes into contact with the inner surface of the pipe, but the other driving wheel does not reach the opposite inner surface of the pipe in some cases. Using the two variable bags allows the driving wheels on both sides to be simultaneously in contact with the inner surface of the pipe with the two sets of wheel-based traveling elements 71A and 71B unchanged.

The same holds true for a case where the in-pipe moving apparatus 60 passes through a stepped portion of a pipe, a recessed portion of a joint between pipes, a portion where the diameter of a pipe changes to a larger or smaller value, or any other portion of a pipe.

FIGS. 39 to 43 describe an eighth embodiment of an in-pipe moving apparatus according to the present invention.

Figure 39:
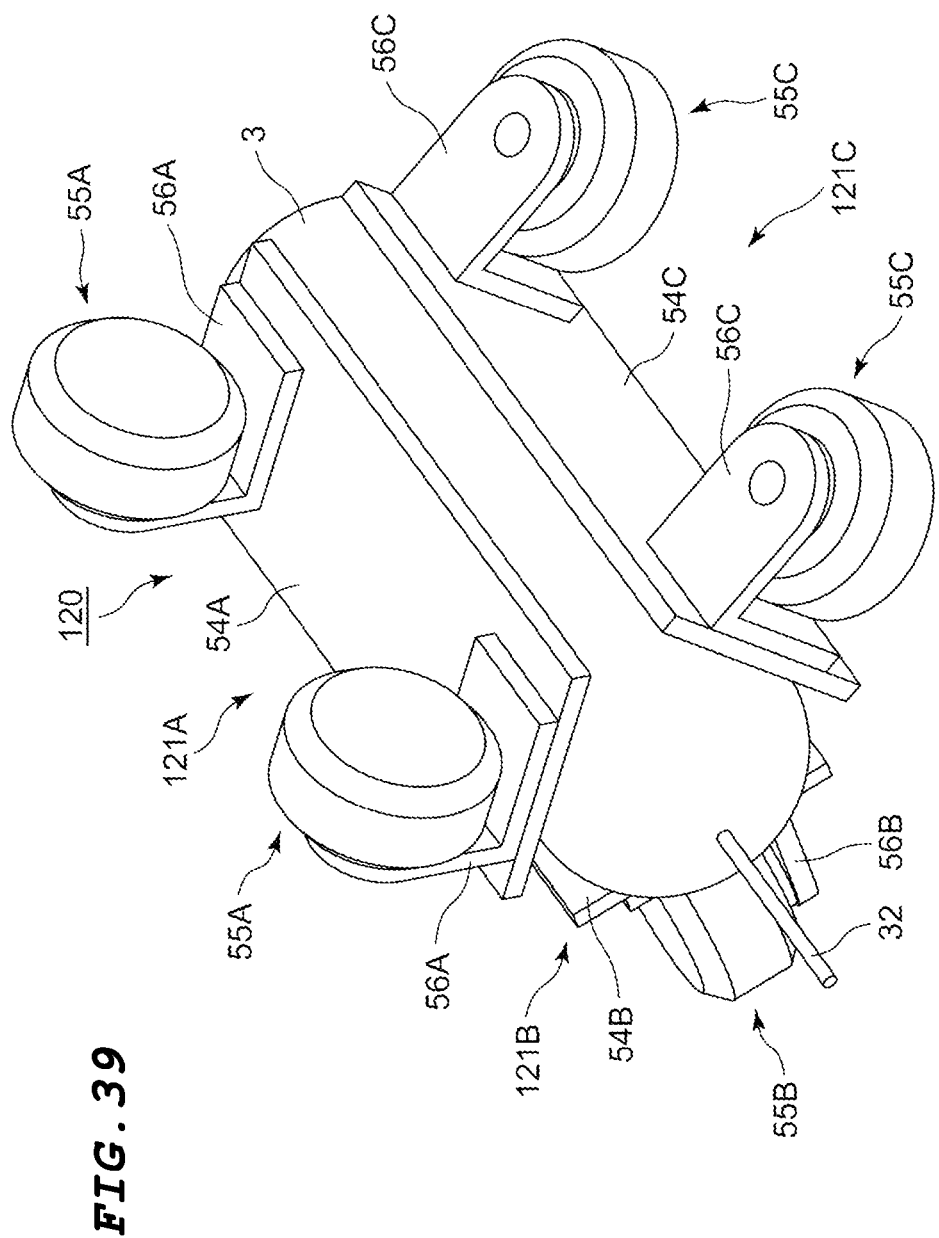
FIG. 39 is an exterior perspective view showing an eighth embodiment of an in-pipe moving apparatus according to the present invention.
Figure 40:
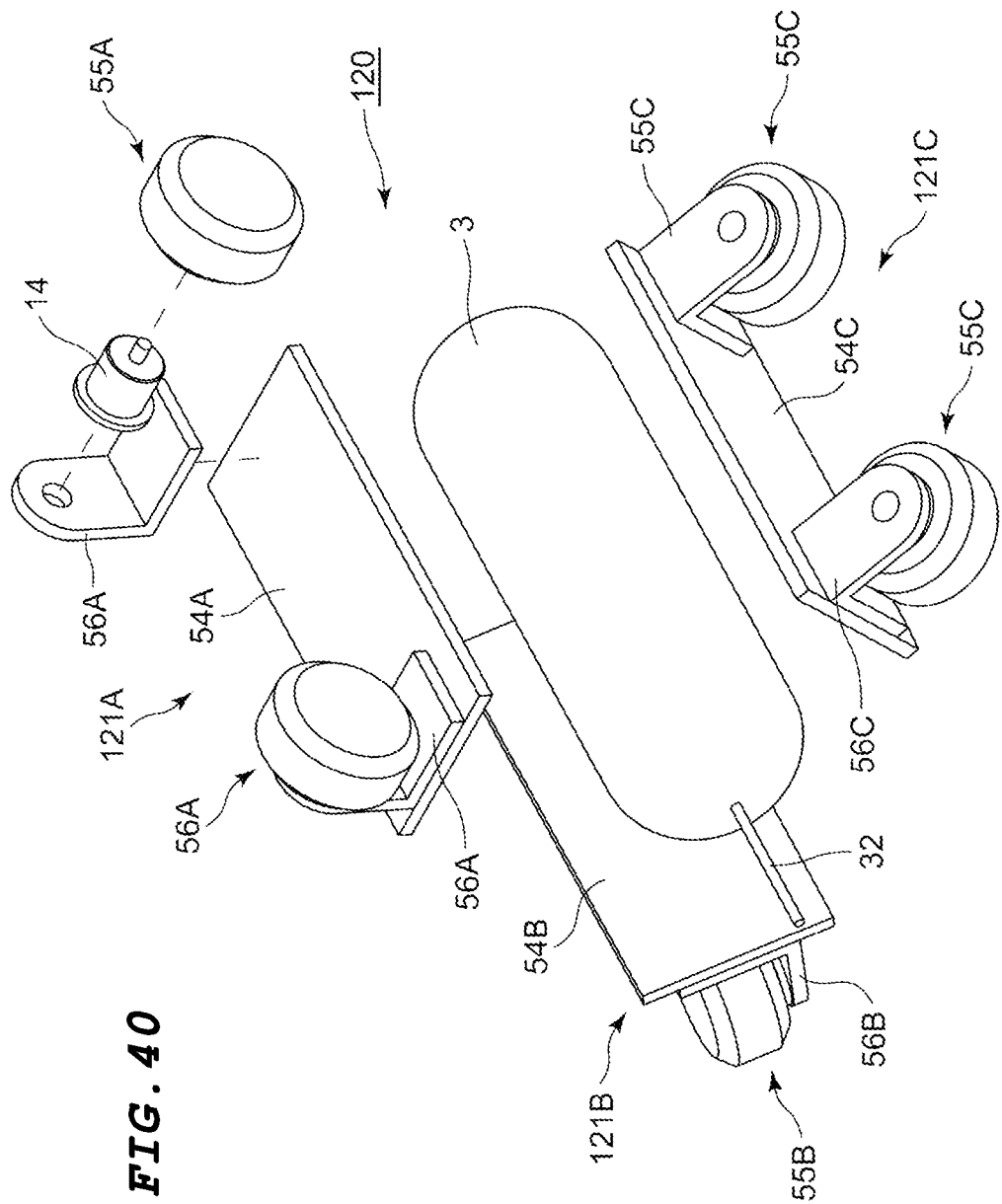
FIG. 40 is an exploded perspective view of the in-pipe moving apparatus according to the eighth embodiment of the present invention shown in FIG. 39.
Figure 41:
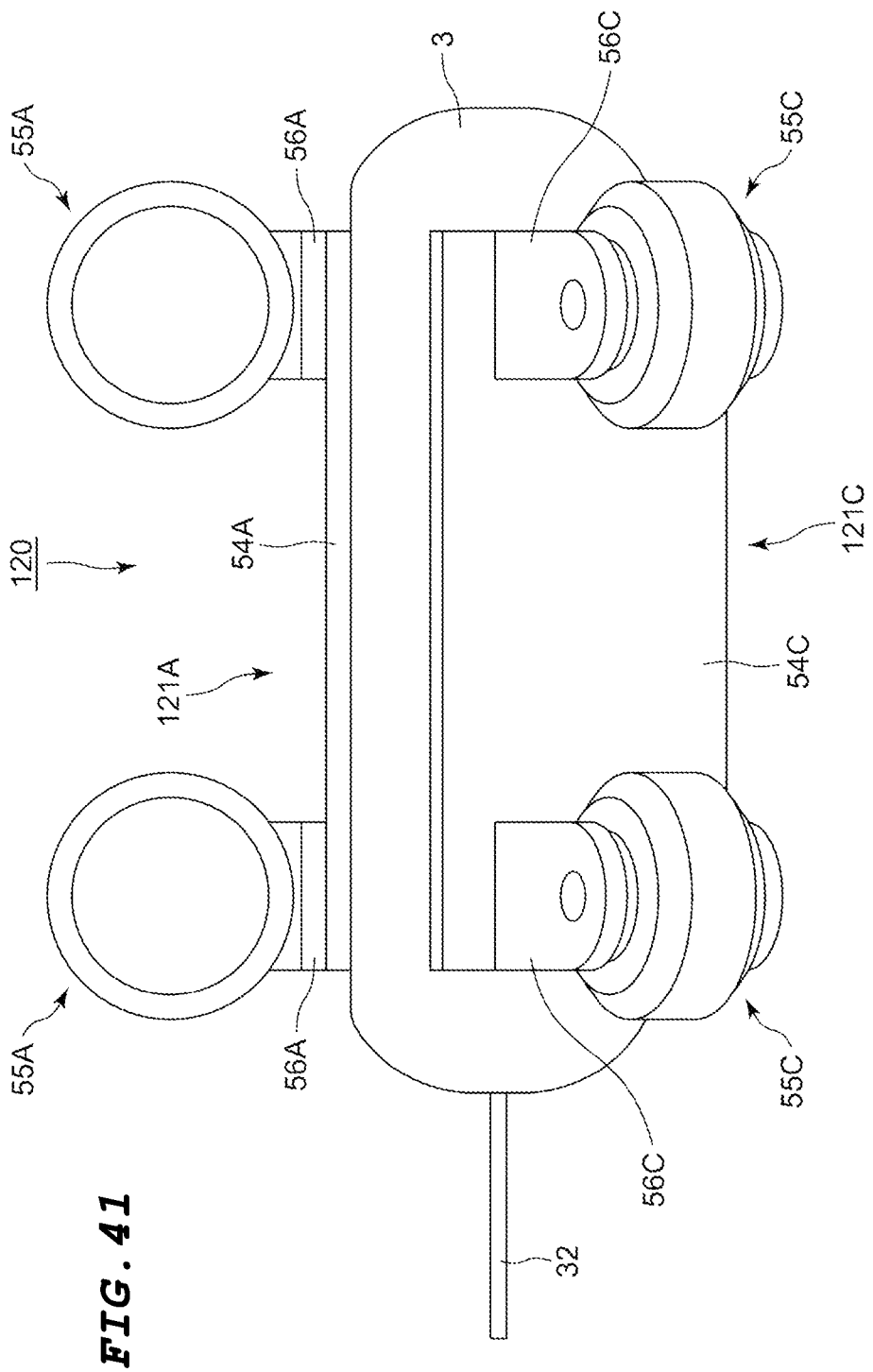
FIG. 41 is a side view of the in-pipe moving apparatus according to the eighth embodiment shown in FIG. 39.
Figure 42:
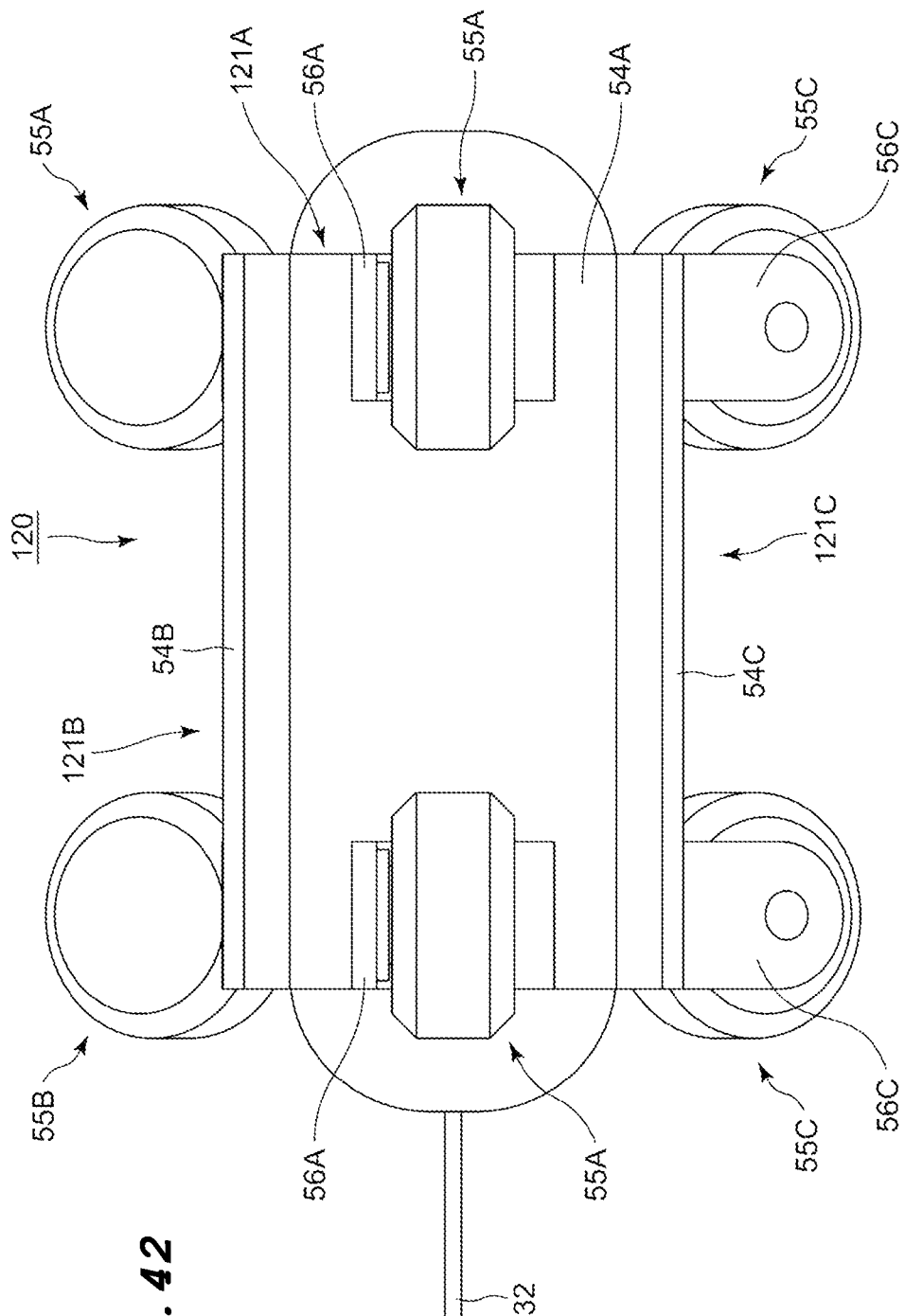
FIG. 42 is a plan view of the in-pipe moving apparatus according to the eighth embodiment shown in FIG. 39.
Figure 43:
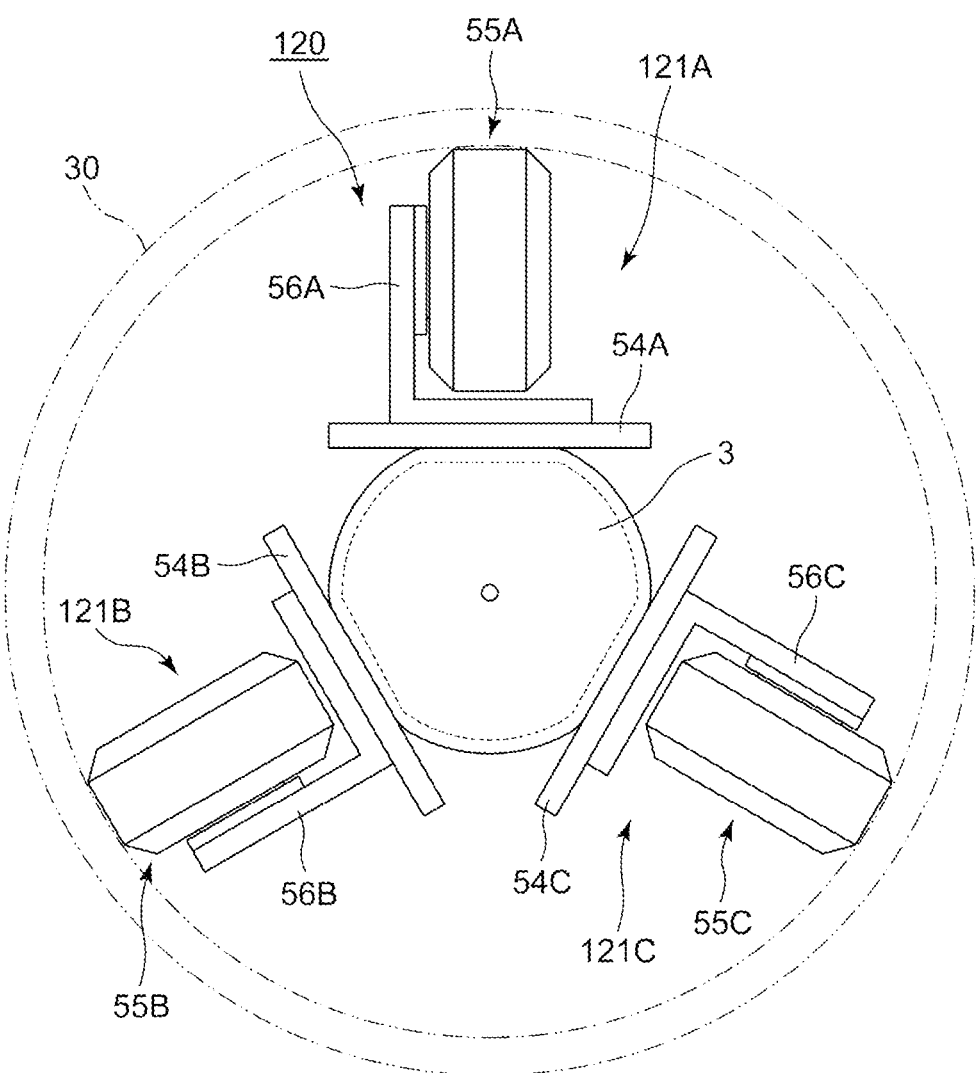
FIG. 43 is a front view of the in-pipe moving apparatus according to the eighth embodiment shown in FIG. 39.

An in-pipe moving apparatus 120 according to the eight embodiment of the present invention includes three sets of wheel-based traveling elements 121A, 121B, and 121C and one variable bag 3, as shown in FIGS. 39 and 40.

The three sets of wheel-based traveling elements 121A, 121B, and 121C are the same as the two sets of wheel-based traveling elements 51A and 51B shown in the third embodiment described above in terms of not only the exterior appearance but the configurations, functions, and other factors of the base members 54A and 54B, the driving wheels 55A and 55B, and the support brackets 56A and 56B, which are the basic configurations of the wheel-based traveling elements, as shown in FIGS. 39 to 43. The three sets of wheel-based traveling elements 121A, 121B, and 121C will not therefore be described in detail. Also in the eighth embodiment, two sets of crawler traveling elements, such as those described in the first embodiment, can, of course, be used in place of the three sets of wheel-based traveling elements 121A, 121B, and 121C.

The variable bag 3 is the same as that in the third embodiment described above and will not therefore be described. The three sets of wheel-based traveling elements 121A, 121B, and 121C are fixed to the outer circumferential surface of the variable bag 3 in positions thereon angularly displaced at equal intervals from each other by 120 degrees. As the fixation of the three sets of wheel-based traveling driving 121A, 121B, and 121C to the variable bag 3, it is typical to firmly fix the wheel-based traveling elements 121A, 121B, and 121C to the outer surface of the variable bag 3 with an adhesive. Instead, a double-sided adhesive tape may be used for the fixation. In the eight embodiment, since the three sets of wheel-based traveling elements 121A, 121B, and 121C are disposed on the outer circumferential surface of the variable bag 3, the cross-sectional shape of the variable bag 3 in the direction perpendicular to the longitudinal direction thereof is preferably a circular or triangular shape.

The in-pipe moving apparatus 120 having the configuration described above also can quickly and smoothly move forward and backward in a pipe by actuating the driving motors 14.

For example, in a case where any one or more of driving wheels 55A, 55B, and 55C of the three sets of wheel-based traveling elements 121A, 121B, and 121C of the in-pipe moving apparatus 120 fail and the in-pipe moving apparatus 120 is therefore unable to move, for example in a straight or curved portion of the pipe, the air pressure in the variable bag 3 is released to the outside, for example, by stopping the supply of the air pressure from the pneumatic apparatus and opening a check valve. When the interior of the variable bag 3 is depressurized so that the variable bag 3 contracts, as described above, one or more of the driving wheels 55A, 55B, and 55C of at least one of the wheel-based traveling element 121A to 121C out of the three sets of wheel-based traveling elements 121A, 121B, and 121C can be separate from the inner surface of the pipe.

As a result, the state in which the in-pipe moving apparatus 120 is stuck in the pipe is eliminated, whereby the force that holds the in-pipe moving apparatus 120 in the pipe is reduced or eliminated. The towing member, which is not shown, is then pulled via an opening of the pipe, whereby the in-pipe moving apparatus 120 stuck in the pipe can be readily taken out of the pipe Further, also in the case where scale is present on the inner surface of the pipe, the in-pipe moving apparatus 120 can pass over the scale as in the embodiments described above.

The same holds true for a case where the in-pipe moving apparatus 60 passes through a stepped portion of a pipe, a recessed portion of a joint between pipes, a portion where the diameter of a pipe changes to a larger or smaller value, or any other portion of a pipe.

The number of the wheel-based traveling elements in the in-pipe moving apparatus 120 may, of course, be four or greater. In this case, adjacent wheel-based traveling elements are preferably so placed as to be separate from each other by an equal distance but may instead be separate from each other by unequal distances.

Also in the eighth embodiment, three sets of crawler traveling elements, such as those described in the first embodiment, can, of course, be used in place of the three sets of wheel-based traveling elements 121A, 121B, and 121C, and the wheel-based traveling elements 121A, 121B, and 121C may, or course, be each formed of an omni-wheel.

The present invention has been described above but is not limited to the first to eighth embodiments described above, and a variety of variations are conceivable under the doctrine of equivalents. A person skilled in the art would easily understand that a variety of changes can be made to the embodiments within the scope of the present invention set forth in the claims.

REFERENCE SIGNS LIST

1, 40, 50, 60, 70, 90, 100, 120: In-pipe moving apparatus, 2A, 2B, 41A, 41B, 51A, 51B, 61A, 61B, 71A, 71B, 121A, 121B, 121C: Wheel-based traveling element, 3, 72A, 72B: Variable bag, 4: Linkage link, 5: Spring, 7A, 7B, 44A, 44B, 54A, 54B, 74A, 74B: Base member, 8A, 8B, 45A, 45B, 55A, 55B, 55C, 65A, 65B, 75A, 75B: Driving wheel, 9A, 9B, 46A, 46B, 56A, 56B, 56C, 76A, 76B, 104A, 104B: Support bracket, 13: Fixed tube, 14: Drive motor, 17: Exterior rotary element, 18: Holder, 30: Pipe, 32: Pipe, 42A, 42B: Support piece, 43A, 43B: Auxiliary wheel, 47: Pivotal shaft, 73, 98: Central member, 78: Branching pipe, 81A, 81B: Restrainer, 82: Fixed link, 83: Sliding support member, 84: Spring, 86: Pivotal shaft, 91: Pantograph mechanism (action restraint means), 92A, 92B: Interlocker, 93A, 93B: Long link, 94A, 94B: Short link, 95A, 95B, 95C, 95D, 95E, 95F: Interlocker, 96: Elongated groove, 101: Crank-link mechanism (action restraint means), 102A, 102B: Interlocker, 103A, 103B: Link section, 105A, 105B: Intersecting link, 106A, 106B: Pivotal link, 110A, 110B: Pivotal screw

The invention claimed is:

1. An in-pipe moving apparatus characterized in that the in-pipe moving apparatus comprises:
   two sets of wheel-based traveling elements each having a plurality of driving wheels linearly arranged or two sets of crawler traveling elements each having a traveling belt rollably bridged over a space between wheels disposed on upstream and downstream sides of the crawler traveling element; and
   a variable bag expanded and contracted in accordance with pressure of a fluid supplied to the variable bag, the two sets of wheel-based traveling elements or the two sets of crawler traveling elements are so disposed as to sandwich the variable bag and are fixed to an outer surface of the variable bag, and
   a pair of linkage links are so provided as to sandwich the two sets of wheel-based traveling elements or the two sets of crawler traveling elements, and one-side ends of the pair of linkage links are pivotably linked to one of the wheel-based traveling elements or the crawler traveling elements and another-side ends of the pair of linkage links are pivotably linked to another of the wheel-based traveling elements or the crawler traveling elements.

2. The in-pipe moving apparatus according to claim 1, characterized in that a plurality of springs are so bridged over a space between the two sets of wheel-based traveling elements or the two sets of crawler traveling elements as to exert spring force on the variable bag.

3. The in-pipe moving apparatus according to claim 1, characterized in that the two sets of wheel-based traveling elements or the two sets of crawler traveling elements are each provided with a plurality of support pieces that protrude from the wheel-based traveling element or the crawler traveling element toward another wheel-based traveling element or crawler traveling element, and
   the plurality of support pieces are each so sized as to protrude outward in a radial direction of a pipe beyond a portion where the other wheel-based traveling element or crawler traveling element is fixed to the variable bag.

4. The in-pipe moving apparatus according to claim 3, characterized in that a front end portion of each of the plurality of support pieces is provided with a rotatable auxiliary wheel that does not come into contact with an inner side of the pipe when the variable bag is expanded but comes into contact with an inner surface of the pipe when the variable bag is contracted to cause the driving wheels or the traveling belts to be separate from the inner surface of the pipe.

5. An in-pipe moving apparatus characterized in that the in-pipe moving apparatus comprises:
   two sets of wheel-based traveling elements each having a plurality of driving wheels linearly arranged or two sets of crawler traveling elements each having a traveling belt rollably bridged over a space between wheels disposed on upstream and downstream sides of the crawler traveling element;
   two variable bags expanded and contracted in accordance with pressure of a fluid supplied to the variable bags;
   a central member so disposed as to be sandwiched between the two variable bags; and
   action restraint means for restraining an action of the two sets of wheel-based traveling elements or the two sets of crawler traveling elements in such a way the two sets of wheel-based traveling elements or the two sets of crawler traveling elements linearly extend and contract in a radial direction of a pipe in which the in-pipe moving apparatus travels;
   wherein the action restraint means includes fixed links fixed to the central member and two sets of sliding support members that slidably support the fixed links and are pivotably supported by the two sets of wheel-based traveling elements or the two sets of crawler traveling elements.

* * * * *